(12) United States Patent
Yang et al.

(10) Patent No.: US 10,081,351 B2
(45) Date of Patent: Sep. 25, 2018

(54) METHOD FOR CONTROLLING ENGINE UNIT IN VEHICLE AND VEHICLE

(71) Applicant: BYD COMPANY LIMITED, Shenzhen, Guangdong (CN)

(72) Inventors: Dongsheng Yang, Shenzhen (CN); Yubo Lian, Shenzhen (CN); Jintao Zhang, Shenzhen (CN); Hongbin Luo, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 33 days.

(21) Appl. No.: 15/216,464

(22) Filed: Jul. 21, 2016

(65) Prior Publication Data

US 2016/0325725 A1 Nov. 10, 2016

Related U.S. Application Data

(63) Continuation of application No. PCT/CN2014/089837, filed on Oct. 29, 2014.

(30) Foreign Application Priority Data

Jan. 30, 2014 (CN) .......................... 2014 1 0044642
Mar. 10, 2014 (CN) .......................... 2014 1 0086389

(51) Int. Cl.
*B60W 20/10* (2016.01)
*B60K 1/02* (2006.01)
(Continued)

(52) U.S. Cl.
CPC ............... *B60W 20/10* (2013.01); *B60K 1/02* (2013.01); *B60K 6/26* (2013.01); *B60K 6/387* (2013.01);
(Continued)

(58) Field of Classification Search
CPC ......... B60W 20/10; B60W 20/11; B60K 1/02; B60K 6/26
See application file for complete search history.

(56) References Cited

U.S. PATENT DOCUMENTS

| 2003/0183467 A1 | 10/2003 | Thompson et al. |
| 2013/0005530 A1* | 1/2013 | Fujikawa .............. B60W 10/06 477/5 |
| 2016/0114787 A1* | 4/2016 | Yang .................... B60W 10/113 701/22 |

FOREIGN PATENT DOCUMENTS

| CN | 101219662 A | 7/2008 |
| CN | 101947915 A | 1/2011 |

(Continued)

OTHER PUBLICATIONS

International Search Report and Written Opinion for Application No. PCT/CN2014/089837, dated Jan. 21, 2015, 12 pages.

*Primary Examiner* — Michael D Lang

(57) ABSTRACT

The present invention provides a method for controlling an engine unit in a vehicle. The vehicle includes an engine unit, a transmission unit adapted to selectively couple with the engine unit and also configured to transmit the power generated by the engine unit, a first motor generator coupled with the transmission unit, an output unit, a power switching device, a second motor generator configured to drive at least one of front and rear wheels, and a power battery that is respectively connected to the first motor generator and the second motor generator. The method includes: acquiring an operating mode of a vehicle and an operating parameter of the vehicle; and controlling an engine unit according to an operating parameter and an operating mode to start or stop.

18 Claims, 29 Drawing Sheets

(51) Int. Cl.
  *B60K 6/445*   (2007.10)
  *B60W 20/11*   (2016.01)
  *B60K 6/26*    (2007.10)
  *B60K 6/52*    (2007.10)
  *B60W 10/06*   (2006.01)
  *B60W 10/08*   (2006.01)
  *B60W 10/10*   (2012.01)
  *B60W 30/182*  (2012.01)
  *B60K 6/387*   (2007.10)
  *B60K 6/442*   (2007.10)
  *B60W 50/08*   (2012.01)
  *B60W 10/02*   (2006.01)
  *B60W 10/26*   (2006.01)

(52) U.S. Cl.
  CPC .............. *B60K 6/442* (2013.01); *B60K 6/445* (2013.01); *B60K 6/52* (2013.01); *B60W 10/02* (2013.01); *B60W 10/06* (2013.01); *B60W 10/08* (2013.01); *B60W 10/10* (2013.01); *B60W 10/26* (2013.01); *B60W 20/11* (2016.01); *B60W 30/182* (2013.01); *B60W 50/082* (2013.01); *B60W 2510/1005* (2013.01); *B60W 2510/244* (2013.01); *B60W 2540/04* (2013.01); *B60W 2540/10* (2013.01); *B60W 2550/142* (2013.01); *B60W 2550/143* (2013.01); *B60W 2710/06* (2013.01); *B60W 2710/08* (2013.01); *B60W 2710/10* (2013.01); *B60Y 2200/92* (2013.01); *B60Y 2300/192* (2013.01); *B60Y 2300/43* (2013.01); *B60Y 2300/60* (2013.01); *B60Y 2300/70* (2013.01); *Y02T 10/6234* (2013.01); *Y02T 10/6239* (2013.01); *Y02T 10/6286* (2013.01); *Y02T 10/84* (2013.01); *Y10S 903/916* (2013.01); *Y10S 903/93* (2013.01)

(56) References Cited

FOREIGN PATENT DOCUMENTS

| | | |
|---|---|---|
| CN | 102069701 A | 5/2011 |
| CN | 102079241 A | 6/2011 |

* cited by examiner

METHOD FOR CONTROLLING ENGINE UNIT IN VEHICLE AND VEHICLE

CROSS-REFERENCE TO RELATED APPLICATIONS

This application is a continuation application of International Application No. PCT/CN2014/089837, filed on Oct. 29, 2014, which is based on and claims priority to and benefits of Chinese Patent Application No. 201410044642.1, filed with the State Intellectual Property Office of P. R. China on Jan. 30, 2014, and Chinese Patent Application No. 201410086389.6, filed with the State Intellectual Property Office of P. R. China on Mar. 10, 2014. The entire contents of the above-identified applications are incorporated herein by reference.

FIELD

The present disclosure relates to the technical field of vehicles, and more particularly to a cruise control method for a vehicle and a vehicle.

BACKGROUND

To reduce energy consumption, development and utilization of energy-efficient vehicles have become a trend. As an energy-efficient vehicle, a hybrid vehicle is driven by at least one of an engine and a motor and has various operation modes, and consequently may operate with improved transmission efficiency and fuel economic efficiency.

However, in the related art, the power transmission system in the hybrid vehicle is generally complex in structure, bulky, low in transmission efficiency, and complicated in control strategy. For example, a plurality of gear shift actuating components needs to be controlled simultaneously during the gear shifting or mode switching. An improvement needs to be made.

SUMMARY

The present invention seeks to solve at least one of the technical problems in the related art to at least some extent. For this, an objective of the present invention is to provide a method for controlling an engine unit in a vehicle. By means of the method, an engine unit is controlled according to an operating parameter and an operating mode to start or stop, thus reducing the energy consumption, reducing the frequency of using a starter motor, and extending the service life of the starter motor, such that user experience is improved.

A second objective of the present invention is to provide a vehicle.

To achieve the foregoing objectives, an embodiment of a first aspect of the present invention provides a method for controlling an engine unit in a vehicle. The vehicle includes an engine unit, a transmission unit adapted to selectively couple with the engine unit and also configured to transmit the power generated by the engine unit, a first motor generator coupled with the transmission unit, an output unit, a power switching device, a second motor generator configured to drive front wheels and/or rear wheels, and a power battery respectively connected to the first motor generator and the second motor generator. The output unit is configured to transmit the power transmitted by the transmission unit to at least one of the front and rear wheels of the vehicle. The power switching device is adapted to enable or interrupt power transmission between the transmission unit and the output unit. The method for controlling an engine unit in a vehicle includes: acquiring an operating mode of the vehicle and an operating parameter of the vehicle; and controlling the engine unit according to the operating parameter and the operating mode to start or stop.

According to the method for controlling an engine unit in a vehicle in embodiments of the present invention, an engine unit is controlled according to an operating parameter and an operating mode to start or stop, thus reducing the energy consumption, reducing the frequency of using a starter motor, and extending the service life of the starter motor, such that user experience is improved. Meanwhile, in embodiments of the present invention, power output by the engine unit and/or a first motor generator may be output to an output unit via a power switching device, and the output unit then outputs the power to at least one of front and rear wheels of the vehicle. Further, because of the provision of a second motor generator, the second motor generator may compensate for a torque for the front wheels or rear wheels, and may also cooperate with the engine unit and the first motor generator to drive the vehicle, thus increasing the number of operation modes of the vehicle, so that the vehicle may be better adapted to different operating conditions, thus achieving better fuel economic efficiency while reducing the emission of harmful gases.

To achieve the foregoing objectives, an embodiment of a second aspect of the present invention provides a vehicle, including: an engine unit; a transmission unit, where the transmission unit is adapted to selectively couple with the engine unit and also configured to transmit the power generated by the engine unit; a first motor generator, where the first motor generator is coupled with the transmission unit; an output unit, where the output unit is configured to transmit the power transmitted by the transmission unit to at least one of front and rear wheels of the vehicle; a power switching device, where the power switching device is adapted to enable or interrupt power transmission between the transmission unit and the output unit; and a second motor generator, where the second motor generator is configured to drive at least one of the front and rear wheels; a power battery, where the power battery is respectively connected to the first motor generator and the second motor generator; and a controller, where the controller acquires an operating mode of the vehicle and an operating parameter of the vehicle, and controls the engine unit according to the operating parameter and the operating mode to start or stop.

For the vehicle in embodiments of the present invention, an engine unit may be controlled according to an operating parameter and an operating mode to start or stop, thus reducing the energy consumption, reducing the frequency of using a starter motor, and extending the service life of the starter motor, such that user experience is improved. Meanwhile, in embodiments of the present invention, power output by the engine unit and/or a first motor generator may be output to an output unit via a power switching device, and the output unit then outputs the power to at least one of front and rear wheels of the vehicle. Further, because of the provision of a second motor generator, the second motor generator may compensate for a torque for the front wheels or rear wheels, and may also cooperate with the engine unit and the first motor generator to drive the vehicle, thus increasing the number of operation modes of the vehicle, so that the vehicle may be better adapted to different operating conditions, thus achieving better fuel economic efficiency while reducing the emission of harmful gases.

DETAILED DESCRIPTION

Figure 1:
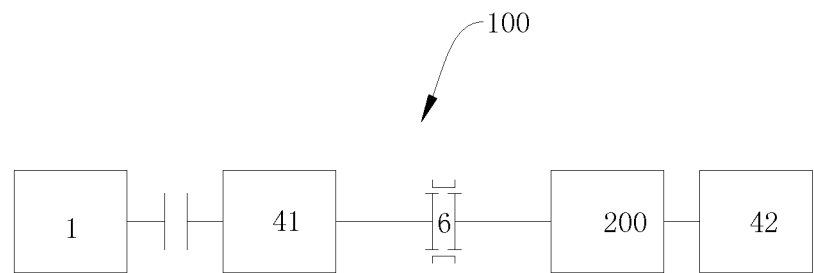
FIG. 1 is a principle diagram of a power transmission system according to an embodiment of the present invention.

Reference will be made in detail to embodiments of the present invention. The embodiments described herein with reference to drawings are explanatory, illustrative, and should be used to generally understand the present invention. The embodiments shall not be construed to limit the present invention. The same or similar elements and the elements having same or similar functions are denoted by like reference numerals throughout the descriptions.

A power transmission system 100 according to embodiments of the present invention will be described in detail below with reference to FIGS. 1-19. The power transmission system 100 is applicable to a vehicle, such as a hybrid vehicle with an engine unit 1 and a motor generator.

As shown in the figures, the power transmission system 100 according to embodiments of the present invention may include an engine unit 1, a transmission unit 2a, a first motor generator 41, a second motor generator 42, an output unit 5, and a power switching device (e.g., a synchronizer 6, and a clutch 9).

The transmission unit 2a is adapted to selectively be coupled with the engine unit 1. The engine unit 1 may selectively output a power generated by the engine unit 1 to the transmission unit 2a via the clutch 9 or the like. Alternatively, the transmission unit 2a may also output, for example, a starting torque from the first motor generator 41 to the engine unit 1, so as to start the engine unit 1. In the context of the present invention, the phrase "the transmission unit 2a is coupled with the engine unit 1" means that the power can be transferred between the engine unit 1 and the transmission unit 2a directly or via other components, and the coupling between the transmission unit 2a and the engine unit 1 is also referred to as a power coupling.

The engine unit 1 generates energy by mixing liquid or gaseous fuel and air and then combusting the mixed fuel and air therein, and the energy is converted into mechanical energy. The engine unit 1 of the vehicle may generally adopt a four-stroke gasoline or diesel engine. The engine unit 1 may generally include a block, a crank-connecting rod mechanism, a valve mechanism, a supply system, an ignition system, a cooling system, a lubrication system and the like.

The block is an assembled body of individual mechanisms and systems of the engine unit 1. The crank-connecting rod mechanism may convert the linear reciprocating motion of a piston into the rotary motion of a crankshaft, and output a drive force. The valve mechanism is configured to charge or discharge a gas at a predetermined time, so as to ensure the smooth performing of each cycle of the engine unit 1. The supply system may supply a mixture of oil and gas to a cylinder for combustion. The cooling system is configured to cool the engine unit 1, so as to ensure that the operating temperature of the engine unit 1 is within a suitable temperature range. The lubrication system is configured to lubricate individual motion pairs in the engine unit 1, so as to reduce the wear and energy loss.

It would be appreciated that the foregoing engine unit 1 as well as specific structures and operation principles of individual sub-systems and sub-mechanisms of the engine unit 1 are well known to those skilled in the art, so the detailed description thereof will be omitted here for clarity purpose.

The first motor generator 41 is coupled with the transmission unit 2a. In other words, the first motor generator 41 cooperates with the transmission unit 2a to transmit the power. That is, the first motor generator 41 may drive the transmission unit 2a, while the transmission unit 2a may drive the first motor generator 41.

For example, the engine unit 1 may output at least a part of the power generated thus to the first motor generator 41 via the transmission unit 2a, and the first motor generator 41 may generate electricity and convert mechanical energy into electric energy to be stored in an energy storage component such as a battery component. As another example, the first motor generator 41 may convert electric energy from the battery component into mechanical energy, and output the mechanical energy to the output unit 5 via the transmission unit 2a to drive the vehicle.

The first motor generator 41 is a motor having functions of both a motor and a generator. As used in the present invention, the term "motor generator" refers to a motor having functions of both a motor and a generator, unless specified otherwise.

The output unit 5 is configured to transmit a power transmitted by the transmission unit 2a to wheels 200 (e.g., one of front and rear wheels 210 and 220) of the vehicle. The output unit 5 is adapted to output the power from the transmission unit 2a.

The power switching device such as the synchronizer 6 is adapted to enable or interrupt a power transmitting between the output unit 5 and the transmission unit 2a. In other words, the power switching device may output the power output from the transmission unit 2a to at least one of front and rear wheels 210, 220 via the output unit 5, or the power switching device may also disconnect the transmission unit 2a from the output unit 5 and the transmission unit 2a may not output the power to the front and/or rear wheels 210, 220 via the output unit 5 directly.

As shown in FIGS. 1-13, the second motor generator 42 is configured to drive the front and/or rear wheels 210, 220.

Therefore, when the output unit 5 is configured to drive the front wheels 210 and the second motor generator 42 is also configured to drive the front wheels 210, the vehicle having the power transmission system 100 may be operable as a two-wheel drive vehicle. When the output unit 5 is configured to drive the front wheels 210 and the second motor generator 42 is configured to drive the rear wheels 220, the vehicle having the power transmission system 100 may be operable as a four-wheel drive vehicle, and may switch between a two-wheel drive mode and a four-wheel drive mode. When the output unit 5 is configured to drive the front wheels 210 and the rear wheels 220 and the second motor generator 42 is configured to drive the front wheels 210 or the rear wheels 220, the vehicle having the power transmission system 100 may be operable as a four-wheel drive vehicle.

With the power transmission system 100 according to embodiments of the present invention, the power output by at least one of the engine unit 1 and the first motor generator 41 may be output to the output unit 5 via the power switching device, and then output by the output unit 5 to the front and/or rear wheels 210, 220 of the vehicle.

Meanwhile, because of the provision of the second motor generator 42, the second motor generator 42 may compensate for the torque of the front wheels 210 or the rear wheels 220, and may also cooperate with the engine unit 1 and the first motor generator 41 to drive the vehicle, thus increasing the number of operation modes of the vehicle. Therefore, the vehicle may be adapted to different operating conditions, thus achieving better fuel economic efficiency while reducing the emission of harmful gases.

In some embodiments of the present invention, as shown in FIGS. 1-16, the power switching device is configured as a synchronizer 6, and the synchronizer 6 is adapted to selectively synchronize between the output unit 5 and the transmission unit 2a, so as to output the power via the output unit 5 to drive the wheels 200 of the vehicle.

Here, the function of the synchronizer 6 may be to eventually synchronize the output unit 5 and the transmission unit 2a, i.e., under the action of the synchronizer 6, the output unit 5 and the transmission unit 2a may operate synchronously, such that the power from the transmission unit 2a may be output with the output unit 5 as a power output terminal. However, when the transmission unit 2a and the output unit 5 are not synchronized by the synchronizer 6, the power from the transmission unit 2a may not be output to the wheels 200 via the output unit 5 directly.

The synchronizer 6 functions to switch the power. That is, when the synchronizer 6 is in an engaged state, the power from the transmission unit 2a may be output via the output unit 5 to drive the wheels 200; and when the synchronizer 6 is in a disengaged state, the transmission unit 2a may not transmit the power to the wheels 200 via the output unit 5. In this way, by controlling the synchronizer 6 to switch between the engaged state and the disengaged state, the switching of the drive mode of the vehicle may be realized.

Because of special application scenarios, the synchronizer 6 has the following advantages.

a. When the synchronizer 6 is in a disengaged state, the power transmitting between the engine unit 1, the transmission unit 2a, the first motor generator 41 and the wheels 200 can be severed, such that operations such as electricity generation, driving, and power/torque transmission may not influence each other, which is very important in reducing the energy consumption of the vehicle. The synchronizer 6 may meet this requirement well, while incomplete separation of friction plates usually occurs in the clutch, thus increasing the friction loss and energy consumption.

b. When the synchronizer 6 is in an engaged state, the synthesized (coupled) driving force of the engine unit 1 and the first motor generator 41 can be transferred to the wheels 200 after the torque multiplication of the transmission unit 2a, or the driving force of the wheels 200 can be transferred to the first motor generator 41 to generate electricity, both of which require that the power coupling device transmit a large torque and have high stability. The synchronizer 6 may meet this requirement well. However, if a clutch is used, an oversize clutch which does not match with the entire system (including an engine, a transmission, a motor, etc.) needs to be designed, thus increasing the arrangement difficulty, the weight and the cost, and having the risk of slipping under the action of an impact torque.

Moreover, the first motor generator 41 may adjust the speed of the transmission unit 2a, for example, the first motor generator 41 may adjust the speed of the transmission unit 2a with the rotating speed of the output unit 5 as a target value, so as to match the speed of the transmission unit 2a with the speed of the output unit 5 in a time efficient manner, thus reducing the time required by the synchronization of the synchronizer 6 and reducing the energy loss. Meanwhile, no torque engagement of the synchronizer 6 may be achieved, thus greatly improving the transmission efficiency, synchronization controllability and real-time synchronization of the vehicle. In addition, the life of the synchronizer 6 may be further extended, thus reducing the maintenance cost of the vehicle. Furthermore, the power transmission system 100 according to embodiments of the present invention is compact in structure and easy to control.

In some embodiments of the present invention, as shown in FIGS. 2-7, the transmission unit 2a includes a transmission power input part 21a and a transmission power output part 22a. The transmission power input part 21a is selectively engaged with the engine unit 1 to transmit the power generated by the engine unit 1. The transmission power output part 22a is configured to output the power from the transmission power input part 21a to the output unit 5 via the synchronizer 6.

As shown in FIGS. 2-7, the transmission power input part 21a further includes an input shaft (e.g., a first input shaft 21, a second input shaft 22) and a driving gear 25 mounted on the input shaft. The input shaft is selectively engaged with the engine unit 1 to transmit the power generated by the engine unit 1. In other words, when the engine unit 1 needs to output the power to the input shaft, the engine unit 1 may be engaged with the input shaft, such that the power output by the engine unit 1 may be transferred to the input shaft. The engagement between the engine unit 1 and the input shaft may be achieved by means of a clutch (e.g., a dual clutch 31), which will be described in detail below, and is no longer elaborated herein.

As shown in FIGS. 2-7, the transmission power output part 22a includes an output shaft 24, and a driven gear 26 mounted on the output shaft 24 and configured to mesh with the driving gear 25 on the input shaft.

As shown in FIGS. 2-5, the output shaft 24 is configured to output at least a part of the power transmitted by the input shaft. The output shaft 24 and the input shaft cooperate with each other to transmit the power. For example, preferably, the power transmission between the output shaft 24 and the input shaft may be realized by means of the driving gear 25 and the driven gear 26.

It would be appreciated that the power transmission between the output shaft 24 and the input shaft is not limited to this. For example, the power transmission between the output shaft 24 and the input shaft may also be realized by means of a belt transmission mechanism, a rack and pinion transmission mechanism or the like. For example, a suitable structure and manner of may be specifically selected according to practical applications by a person skilled in the art.

The output shaft 24 is configured to transmit at least a part of the power on the input shaft. For example, when the power transmission system 100 is in a certain transmission mode where for example, the first motor generator 41 generates electricity, a part of the power on the input shaft may be used for the electricity generating of the first motor generator 41, and the other part of the power on the input shaft may be used to drive the vehicle to run. All power on the input shaft may be used for the electricity generation of the first motor generator 41.

In some embodiments of the present invention, the power transmitting between the first motor generator 41 and one of the input shaft and the output shaft 24 may be direct or indirect. As used herein, the term "direct power transmission" means that the first motor generator 41 is directly coupled with a corresponding one of the input shaft and the output shaft 24 for power transmission, without using any intermediate transmission components such as a speed changing device, a clutch device, or a transmission device. For example, an output terminal of the first motor generator 41 can be directly and rigidly connected with one of the input shaft and the output shaft 24. The direct power transmission has the advantages of eliminating the intermediate transmission components and reducing the energy loss during the power transmission.

As used herein, the term "indirect power transmission" refers to any other power transmission manners other than the direct power transmission, for example, the power transmission by means of intermediate transmission components such as a speed changing device, a clutch device, or a transmission device. The indirect power transmission has the advantages of enabling convenient arrangement and achieving the desired transmission ratio by providing a speed changing device and the like.

The output unit 5 may be used as a power output terminal of the output shaft 24 for outputting the power on the output shaft 24. The output unit 5 and the output shaft 24 may rotate differentially and not synchronously. In other words, there can be a rotating speed difference between the output unit 5 and the output shaft 24, and the output unit 5 and the output shaft 24 are not rigidly fixed with each other.

The synchronizer 6 is disposed on the output shaft 24. As shown in FIGS. 1-6, the synchronizer 6 may include a splined hub 61 and a synchronizing sleeve 62. The splined hub 61 may be fixed on the output shaft 24 such that the splined hub 61 can rotate synchronously with the output shaft 24, while the synchronizing sleeve 62 may move in an axial direction of the output shaft 24 relative to the splined hub 61 so as to selectively engage with the output unit 5, such that the output unit 5 can rotate synchronously with the output shaft 24. In this way, the power may be transferred from the output unit 5 to the front and/or rear wheels 210, 220, thus driving the wheels 200. However, it would be appreciated that the structure of the synchronizer 6 is not limited to this.

With the power transmission system 100 according to embodiments of the present invention, the power output by at least one of the engine unit 1 and the first motor generator 41 may be output from the output unit 5 by the engagement of the synchronizer 6, such that the power transmission system 100 is compact in structure and easy to control. Moreover, during the switching of the operating modes of the vehicle, it is possible for the synchronizer 6 to switch from a disengaged state to an engaged state, and the first motor generator 41 may adjust the rotating speed of the output shaft 24 with the rotating speed of the output unit 5 as a target value, so as to match the rotating speed of the output shaft 24 with the rotating speed of the output unit 5 in a short time, thus facilitating the engagement of the synchronizer 6, greatly improving the transmission efficiency and reducing the energy loss, and realizing no torque engagement of the synchronizer 6. Furthermore, the radial frictional force is much smaller than the average value in the related art or even there is no radial frictional force during the engagement of the synchronizer 6.

In some embodiments of the present invention, the output unit 5 is configured to drive a first pair of wheels of the vehicle, and there is a pair of second motor generators 42 configured to drive the first pair of wheels. Further, there may be a plurality of second motor generators. For example, the power transmission system 100 further includes a third motor generator 43 configured to drive a second pair of wheels of the vehicle. For example, as shown in FIGS. 2-8, the first pair of wheels refers to the front wheels 210 of the vehicle, and the second pair of wheels refers to the rear wheels 220 of the vehicle. It is understood that in other embodiments, the first pair of wheels can refer to the rear wheels 220 and the second pair of wheels can refer to the front wheels 210.

Therefore, the power transmission system 100 according to embodiments of the present invention has four types of power output sources, i.e. the engine unit 1, the first motor generator 41, the second motor generator 42 and the third motor generator 43, in which the engine unit 1, the first motor generator 41 and the second motor generator 42 may be configured to drive one pair of wheels of the vehicle, and the third motor generator 43 may be configured to drive the other pair of wheels of the vehicle. Therefore, the vehicle having the power transmission system 100 is operable as a four-wheel drive vehicle.

Moreover, during the switching of operating modes of the vehicle, it is possible for the synchronizer 6 to switch from the disengaged state to the engaged state, and the first motor generator 41 may adjust the rotating speed of the output shaft 24 with the rotating speed of the output unit 5 as a target value, so as to match the rotating speed of the output shaft 24 with the rotating speed of the output unit 5 in a short time, thus facilitating the engagement of the synchronizer 6, greatly improving the transmission efficiency and reducing the energy loss.

Meanwhile, by the provision of the second motor generator 42 and the third motor generator 43, the second motor generator 42 and the third motor generator 43 may compensate for the torque of the wheels 200, which is indirectly reflected in the output of the output unit 5. That is, the second motor generator 42 and the third motor generator 43 may indirectly adjust the rotating speed of the output unit 5. For example, when the synchronizer 6 switches from the disengaged state to the engaged state, the second motor generator 42 and the third motor generator 43 may indirectly adjust the rotating speed of the output unit 5 according to requirements, so as to match the rotating speed of the output shaft 24 with the rotating speed of the output unit 5 in a short time, thus facilitating the engagement of the synchronizer 6.

Furthermore, the second motor generator 42 and the third motor generator 43 may cooperate with the first motor generator 41 to adjust the rotating speed of the output unit 5 simultaneously, so as to synchronize the rotating speed of the output shaft 24 and the rotating speed of the output unit 5 in a shorter time, thus facilitating the engagement of the synchronizer 6 and greatly improving the transmission efficiency.

Optionally, the first motor generator 41 may adjust the rotating speed of the output unit 5 separately. Alternatively, optionally, at least one of the second motor generator 42 and the third motor generator 43 may adjust the rotating speed of the output unit 5 separately. Furthermore, optionally, the first motor generator 41, the second motor generator 42 and the third motor generator 43 may adjust the rotating speed of the output unit 5 simultaneously.

In this way, the output of the power from the transmission unit 2a may be controlled by the engagement/disengagement of the synchronizer 6, and when the synchronizer 6 switches from the disengaged state to the engaged state, at least one of the first motor generator 41, the second motor generator 42 and the third motor generator 43 may compensate for the speeds of the output shaft 24 and the output unit 5, so as to match the rotating speed of the output shaft 24 with the rotating speed of the output unit 5 rapidly, thus realizing no torque engagement of the synchronizer 6 rapidly.

In some embodiments of the present invention, as shown in FIGS. 2-9, there is a plurality of the input shafts, i.e. two or more input shafts. The input shafts are coaxially nested sequentially. For example, if there are N input shafts, the $K^{th}$ input shaft is fitted over the $(K-1)^{th}$ input shaft, where $N \geq K \geq 2$, and central axes of the N input shafts coincide with each other.

For example, as shown in FIGS. 2-7 and 9-19, when there are two input shafts, e.g. the first input shaft 21 and the second input shaft 22, the second input shaft 22 is fitted over the first input shaft 21 and central axes of the two input shafts coincide with each other. As another example, as shown in FIG. 8, when there are three input shafts, e.g. the first input shaft 21, the second input shaft 22 and a third input shaft 23, the third input shaft 23 is fitted over the second input shaft 22, the second input shaft 22 is fitted over the first input shaft 21, and central axes of the three input shafts coincide with each other.

When the engine unit 1 transmits the power to the input shaft or is coupled with the input shaft for power transmitting, the engine unit 1 may be selectively engaged with one of the input shafts. In other words, when the power from the engine unit 1 needs to be output, the output terminal of the engine unit 1 may be engaged with one of the input shafts, so as to rotate synchronously with the one of the input shafts. When the engine unit 1 does not need to operate or the engine unit 1 is idle, the engine unit 1 may be disconnected from individual input shafts respectively, i.e. the engine unit 1 is not coupled with any input shaft, so as to interrupt the power transmission between the engine unit 1 and individual input shafts.

Further, as shown in FIG. 2-6, one driving gear 25 is fixed on each input shaft, and the driving gear 25 rotates synchronously with the input shaft. The fixing between the driving gear 25 and the corresponding input shaft is not limited here, for example, the driving gear 25 and the corresponding input shaft may be fixed by, for example, key fit or hot pressing, or may be formed integrally, as long as the synchronous rotation of the driving gear 25 and the corresponding input shaft is ensured.

A plurality of driven gears 26 is fixed on the output shaft 24, and the driven gears 26 rotate synchronously with the output shaft 24. By way of example and without limitation, the fixing between the driven gear 26 and the output shaft 24 may be realized by key fit or hot pressing, or may be formed integrally.

However, the present invention is not limited to this. For example, the number of the driving gears 25 on each input shaft is not limited to one, and accordingly a plurality of driven gears 26 is fixed on the output shaft 24 to form a plurality of gears, which is implementable to a person skilled in the art.

As shown in FIG. 2-6, the driven gears 26 are configured to mesh with the driving gears 25 on the input shafts respectively. In one embodiment of the present invention, the number of the driven gears 26 may be the same as that of the input shafts. For example, when there are two driven gears 26, there are two input shafts, such that the two driven gears 26 may be configured to mesh with the driving gears 25 on the two input shafts to transmit the power, so as to make the two pairs of gears form two gears for power transmitting.

In an embodiment of the present invention, three or more input shafts may be provided according to the power transmitting requirements, and each input shaft may be provided with one driving gear 25. Therefore, the larger the number of the input shafts, the larger the number of the gears is, and the wider range of the transmission ratio of the power transmission system 100 is, so as to adapt to the power transmitting requirements of various vehicles.

In some specific embodiments of the present invention, as shown in FIGS. 2-7, the input shafts include the first input shaft 21 and the second input shaft 22. The second input shaft 22 is fitted over the first input shaft 21. The second input shaft 22 is a hollow shaft, and the first input shaft 21 is preferably a solid shaft. Alternatively, the first input shaft 21 may also be a hollow shaft.

The first input shaft 21 may be supported by bearings. For example, a plurality of bearings can be preferably disposed in an axial direction of the first input shaft 21 at a position not influencing the assembly of other components. Similarly, the second input shaft 22 may also be supported by bearings.

Further, as shown in FIGS. 2-7, a dual clutch 31 is disposed between the engine unit 1 and the first and second input shafts 21, 22. The dual clutch 31 may be a dry dual clutch 31 or a wet dual clutch 31.

The dual clutch 31 has an input terminal 313, a first output terminal 311 and a second output terminal 312. The engine unit 1 is connected to the input terminal 313 of the dual clutch 31. The engine unit 1 may be connected to the input terminal 313 of the dual clutch 31 via for example, a flywheel, a damper, or a torsion plate.

The first output terminal 311 of the dual clutch 31 is connected to and rotates synchronously with the first input shaft 21. The second output terminal 312 of the dual clutch 31 is connected to and rotates synchronously with the second input shaft 22.

The input terminal 313 of the dual clutch 31 may be a shell of the dual clutch 31, and the first output terminal 311 and the second output terminal 312 of the dual clutch 31 may be two driven discs. Generally, the shell may be disconnected from the two driven discs, such that the input terminal 313 is disconnected from the first output terminal 311 and the second output terminal 312. When one driven disc needs to be engaged, the shell can be controlled to engage with the corresponding driven disc to rotate synchronously with the driven disc, e.g. the input terminal 313 is engaged with one of the first output terminal 311 and the second output terminal 312, such that the power transmitted from the input terminal 313 may be output via one of the first output terminal 311 and the second output terminal 312. Generally, the shell is engaged with one driven disc at a time.

It would be appreciated that the specific engagement of the dual clutch 31 is influenced by a control strategy. For a person skilled in the art, the control strategy may be adaptively set according to the desired power transmission mode, e.g. switching between a mode in which the input terminal 313 is disconnected from the first output terminal 311 and the second output terminal 312 and a mode in which the input terminal 313 is engaged with one of the first output terminal 311 and the second output terminal 312.

For example, as shown in FIGS. 2-7, since the input shaft has a concentric dual-shaft structure and each input shaft is provided with only one driving gear 25, the transmission unit 2a has two different gears, and the engine unit 1 may output the power to the output unit 5 via the two gears, while the synchronizer 6 is always in an engaged state to engage the output shaft 24 with the output unit 5.

During the gear shift, unlike the synchronizer in the related art, the synchronizer 6 does not need to be first disengaged and then move axially to engage with other gears. Only the engagement/disengagement of the dual clutch 31 needs to be controlled, while the synchronizer 6 can remain in the engaged state. In this way, when the engine unit 1 outputs the power to the output unit 5, only one gear shift actuating component, e.g. the dual clutch 31, needs to be controlled, while the synchronizer 6 does not need to be controlled, thus simplifying the control strategy greatly, reducing the number of engagement/disengagement times of, e.g. synchronizer 6, and extending the life of the synchronizer 6.

In some embodiments of the present invention, the first motor generator 41 is configured to cooperate with one of the driving gear 25 and the driven gear 26 for power transmission. In other words, indirect power transmission between the first motor generator 41 and one of the input shaft and the output shaft 24 is performed.

Further, as an optional solution, an intermediate transmission mechanism may be disposed between the first motor generator 41 and the corresponding gear, and by way of example and without limitation, the intermediate transmission mechanism may be a worm and worm gear transmission mechanism, a one-stage or multi-stage gear pair transmission mechanism, or a chain wheel transmission mechanism, or may be a combination of the above transmission mechanisms in the case of no conflicting. In this way, the first motor generator 41 may be provided in different locations as needed, thus reducing the arrangement difficulty of the first motor generator 41.

Figure 2:
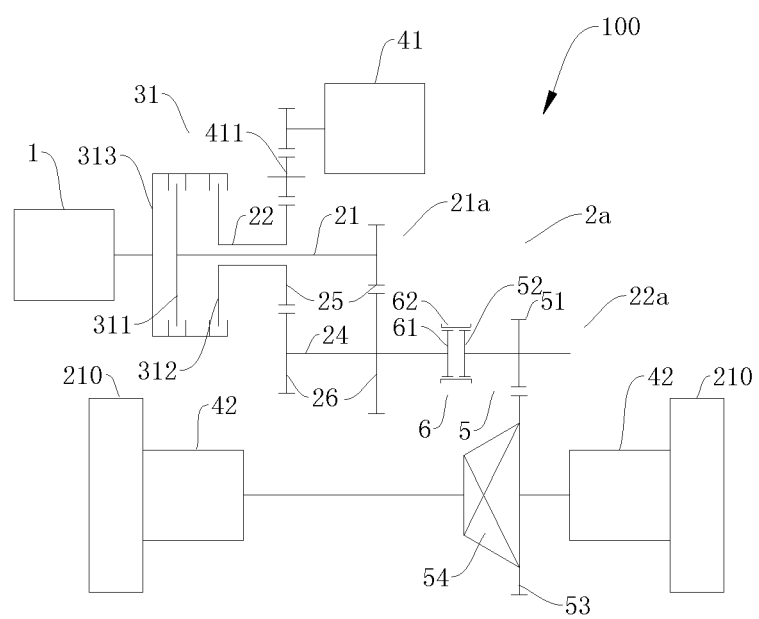
FIG. 2 is a schematic view of a power transmission system according to an embodiment of the present invention.
Figure 3:
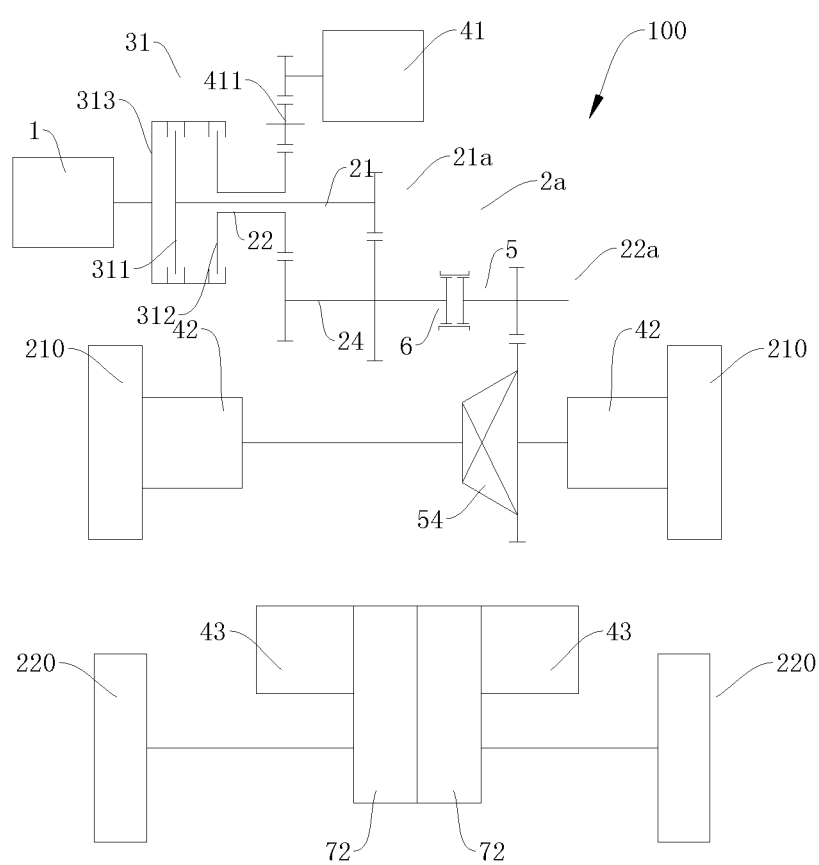
FIG. 3 is a schematic view of a power transmission system according to another embodiment of the present invention.

In order to facilitate the spatial arrangement, in an embodiment of the present invention, the first motor generator 41 may transmit the power via an intermediate gear 411. For example, as shown in FIG. 3 (with reference to FIG. 2), indirect power transmission between the first motor generator 41 and the driving gear 25 on the first input shaft 21 via the intermediate gear 411 can be performed. As another example, as shown in FIG. 2, indirect power transmission between the first motor generator 41 and the driving gear 25 on the second input shaft 22 via the intermediate gear 411 can be performed However, the present invention is not limited to this. In another embodiment of invention, the first motor generator 41 may be configured to connect with one of the first input shaft 21 and the output shaft 24. For example, the first motor generator 41 may be configured to directly connect with the first input shaft 21. As another example, the first motor generator 41 may be configured to directly connect with the output shaft 24. Direct connection between the first motor generator 41 and the corresponding shaft may make the structure of the power transmission system 100 more compact, and decrease the circumferential dimension of the power transmission system 100, such that the power transmission system 100 may be easily disposed in a compartment of the vehicle.

Figure 4:
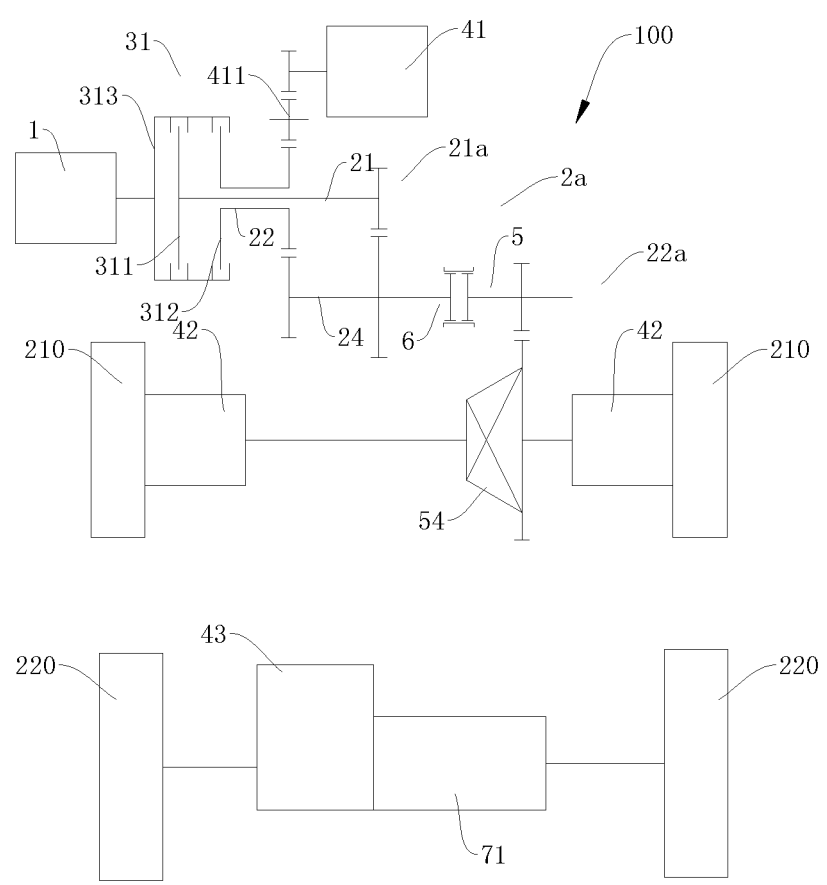
FIG. 4 is a schematic view of a power transmission system according to still another embodiment of the present invention.

In an embodiment of the present invention, as shown in FIG. 4, the first motor generator 41 is arranged coaxially with the first input shaft 21, and the first motor generator 41 is arranged coaxially with the engine unit 1. "The first motor generator 41 is arranged coaxially with the engine unit 1" would be appreciated as that a rotation axis of a rotor of the first motor generator 41 substantially coincides with a rotation axis of a crankshaft of the engine unit 1. Therefore, the power transmission system 100 becomes more compact in structure.

In some embodiments of the present invention, as shown in FIGS. 2-6, the output unit 5 may include an output gear 51 and an engagement gear ring 52. The output gear 51 may rotate relative to the output shaft 24, i.e. rotate differentially relative to the output shaft 24, and the engagement gear ring 52 is fixedly connected with the output gear 51, i.e. the engagement gear ring 52 rotates synchronously with the output gear 51.

Therefore, when the synchronizer 6 needs to engage the output unit 5 with the output shaft 24, the synchronizing sleeve 62 of the synchronizer 6 may axially move toward the engagement gear ring 52, and after the rotating speed of the output unit 5 is synchronized with the rotating speed of the output shaft 24, the synchronizing sleeve 62 may be engaged with the engagement gear ring 52 to form a rigid connection between the output shaft 24, the synchronizer 6 and the output unit 5, so as to rotate the output shaft 24, the synchronizer 6 and the output unit 5 synchronously.

In order to reduce the number of intermediate transmission components, to reduce the energy loss, and to enhance the transmission efficiency of the power transmission system 100, in a preferred manner, as shown in FIGS. 2-6, the output gear 51 may be a driving gear of a final drive and is configured to directly mesh with a driven gear 53 of the final drive to output the power, so as to drive the wheels 200. However, the present invention is not limited to this, and other intermediate transmission components may also be disposed between the output gear 51 and the final drive.

As shown in FIGS. 2-10, a differential 54 is disposed between the first pair of wheels such as the front wheels 210. The differential 54 cooperates with the output unit 5 for power transmitting. In some embodiments, the differential 54 is provided with the driven gear 53 thereon, and the output gear 51 becomes the driving gear of the final drive configured to mesh with the driven gear 53 of the final drive, such that the power may be transferred to the two front wheels 210 via the driving gear of the final drive, the driven gear 53 of the final drive and the differential 54 sequentially.

The function of the differential 54 is to properly distribute the power to the two front wheels 210. The differential 54 may be a gear differential, a mandatory locking differential, or the Torsen differential, which may be selected by a person skilled in the art according to different vehicles.

Figure 5:
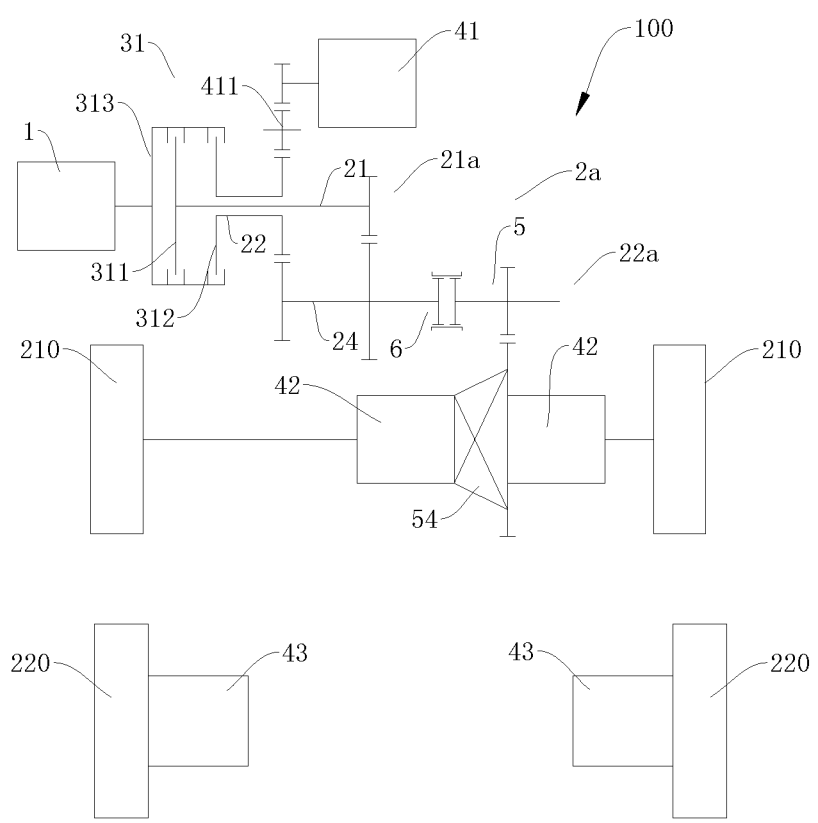
FIG. 5 is a schematic view of a power transmission system according to yet another embodiment of the present invention.
Figure 6:
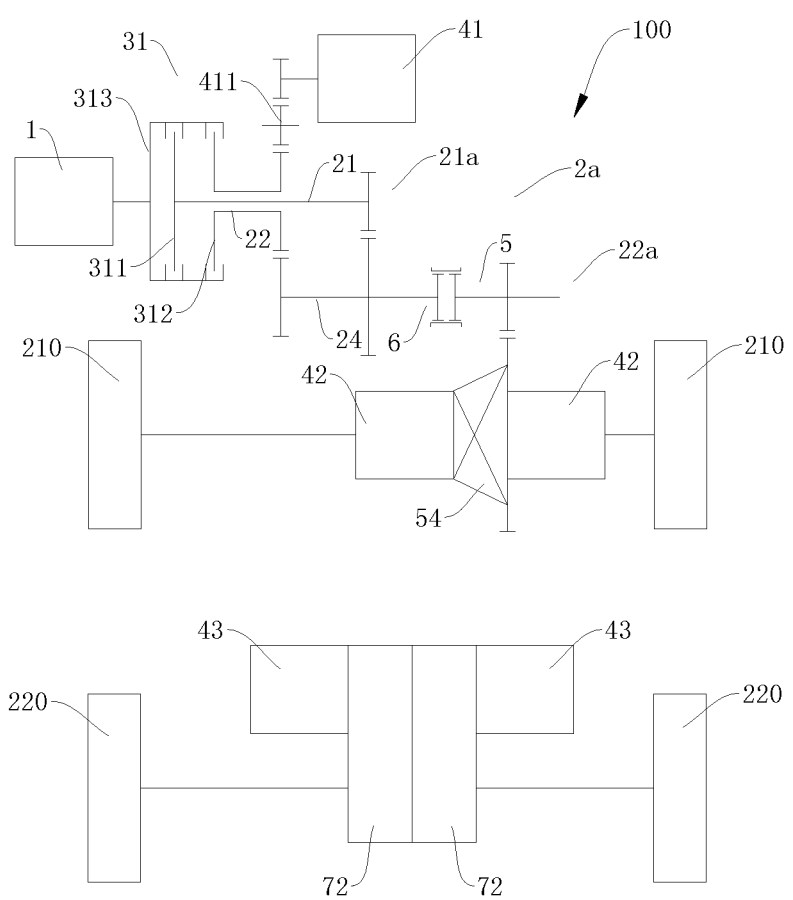
FIG. 6 is a schematic view of a power transmission system according to yet another embodiment of the present invention.
Figure 7:
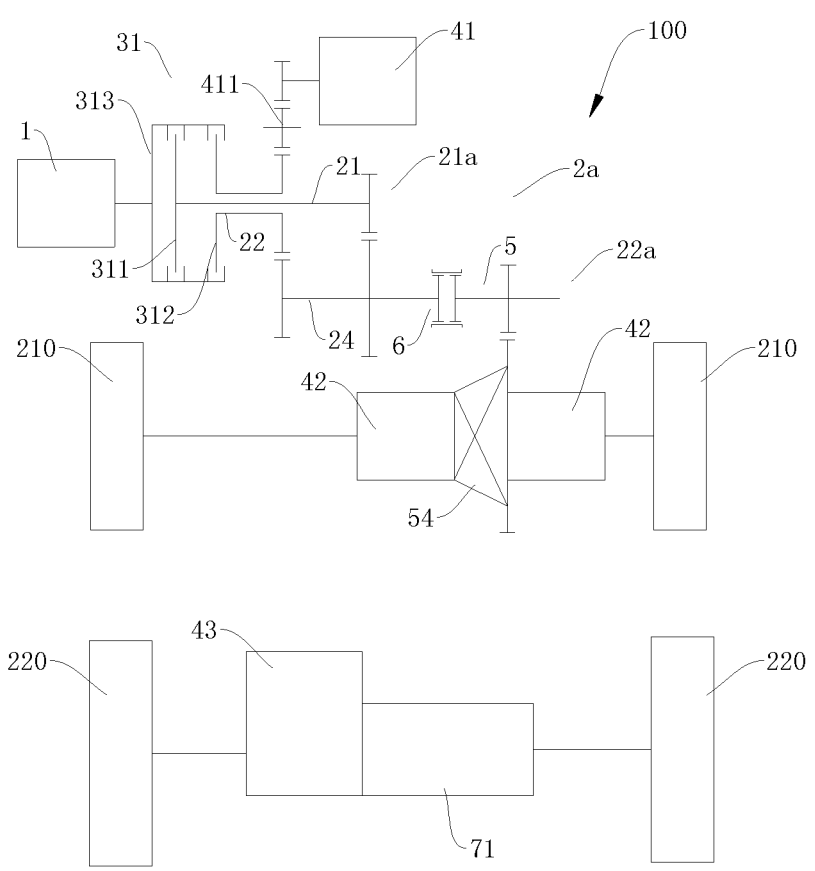
FIG. 7 is a schematic view of a power transmission system according to yet another embodiment of the present invention.
Figure 8:
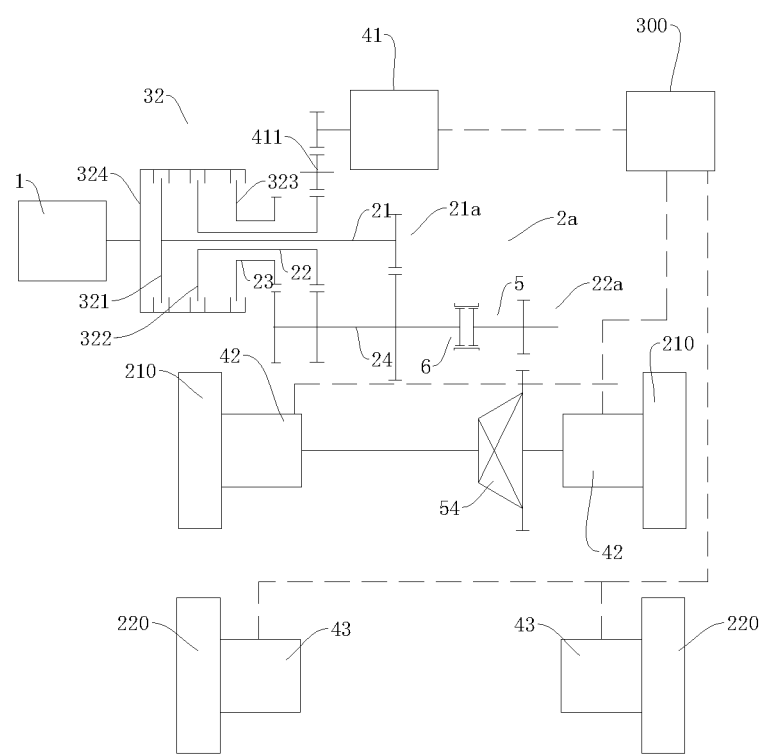
FIG. 8 is a schematic view of a power transmission system according to yet another embodiment of the present invention.
Figure 10:
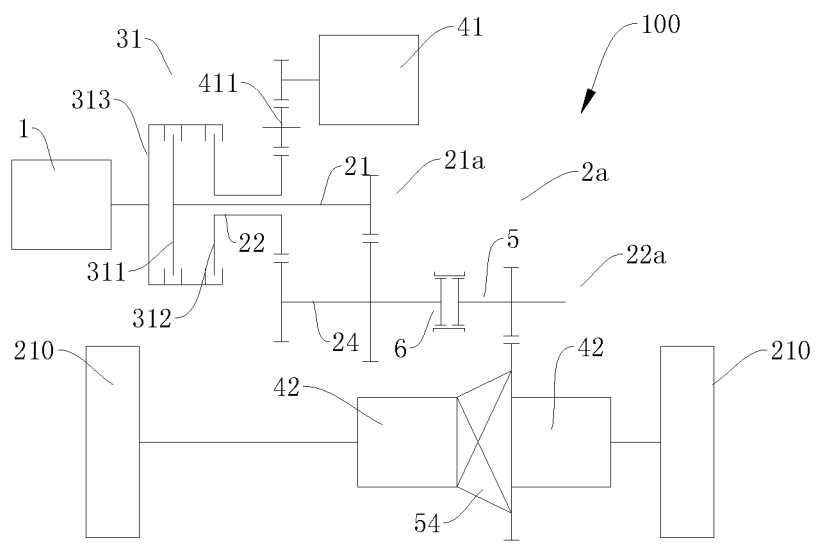
FIG. 10 is a schematic view of a power transmission system according to yet another embodiment of the present invention.

In some embodiments of the present invention, as shown in FIGS. 5-7 and 10, a pair of second motor generators 42 is disposed on two sides of the differential 54 back to back. For example, a pair of second motor generators 42 is disposed on two sides of the differential 54 and integrally formed with the differential 54. For example, the left second motor generator 42 can be disposed between a left half shaft and the left side of the differential 54, and the right second motor generator 42 can be disposed between a right half shaft and the right side of the differential 54. The power transmission system 100 in FIGS. 5-7 is operable in a four-wheel drive mode, and the power transmission system 100 in FIG. 10 is operable in a two-wheel drive mode. It should be noted that in the following, when referring to "motor generators are disposed on two sides of the differential 54 back to back," it means that the motor generators are disposed on two sides of the differential 54 respectively and integrally formed with the differential 54.

Figure 9:
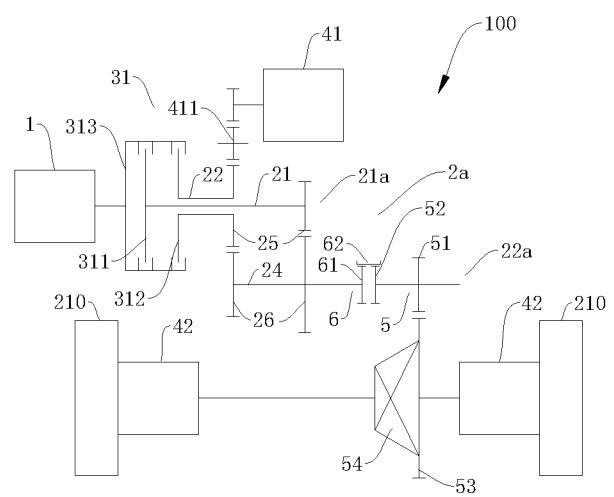
FIG. 9 is a schematic view of a power transmission system according to yet another embodiment of the present invention.

In some other embodiments of the present invention, as shown in FIGS. 2-4 and 9, the second motor generator 42 is a wheel-side motor. In other words, one of the second motor generators 42 is disposed at an inner side of the left front wheel, and the other of the second motor generators 42 is disposed at an inner side of the right front wheel, and the second motor generator 42 may transfer the power to a hub of a corresponding wheel via a gear mechanism. The power transmission system 100 in FIGS. 2-4 is operable in a four-wheel drive mode, and the power transmission system 100 in FIG. 9 is operable in a two-wheel drive mode.

In some embodiments of the present invention, two third motor generators 43 are provided, and the third motor generators 43 are a wheel-side motor, as shown in FIGS. 2 and 5. In other words, in the examples shown in FIGS. 2 and 5, one of the third motor generators 43 is disposed at an inner side of the left rear wheel, the other of the third motor generators 43 is disposed at an inner side of the right rear wheel, and the third motor generator 43 may transfer the power to a corresponding rear wheel via a gear mechanism.

In some other embodiments of the present invention, one third motor generator 43 is provided, and the third motor generator 43 drives the second pair of wheels via a first speed changing mechanism 71. The first speed changing mechanism 71 is preferably a reducing mechanism, and the reducing mechanism may be a one-stage or multi-stage reducing mechanism. The reducing mechanism may include, but is not limited to, a gear reducing mechanism, or a worm and worm gear reducing mechanism.

In these embodiments, the second pair of wheels may be connected with each other via an axle which may have an integral structure. The third motor generator 43 may directly drive the integral axle via the first speed changing mechanism 71, to drive the two wheels to rotate synchronously.

In some more embodiments of the present invention, two third motor generators 43 are provided, and each third motor generator 43 drives one of the second pair of wheels via a second speed changing mechanism 72. The second speed changing mechanism 72 is preferably a reducing mechanism, and the reducing mechanism may be a one-stage or multi-stage reducing mechanism. The reducing mechanism may include, but is not limited to, a gear reducing mechanism, or a worm and worm gear reducing mechanism.

In these embodiments, the two wheels in the second pair may be connected with the corresponding third motor generators 43 and the corresponding second speed changing mechanisms 72 via two half axles respectively. In other words, one of the third motor generators 43 may drive a corresponding half axle via one of the second speed changing mechanisms 72, so as to drive the wheel at an outer side of the half axle to rotate.

Figure 11:
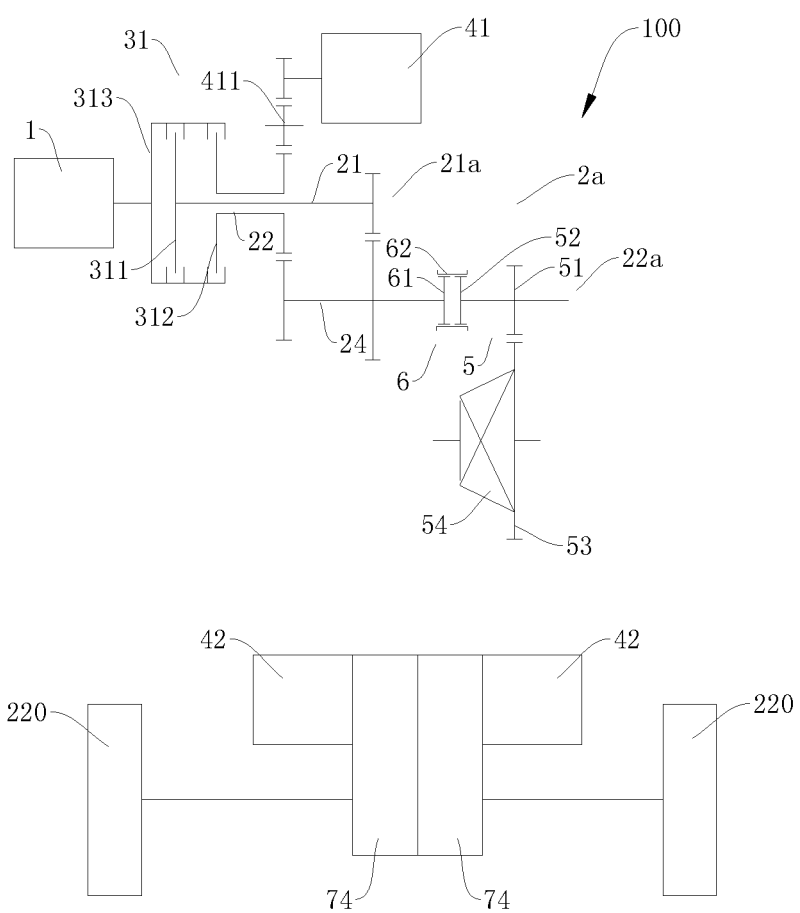
FIG. 11 is a schematic view of a power transmission system according to yet another embodiment of the present invention.
Figure 12:
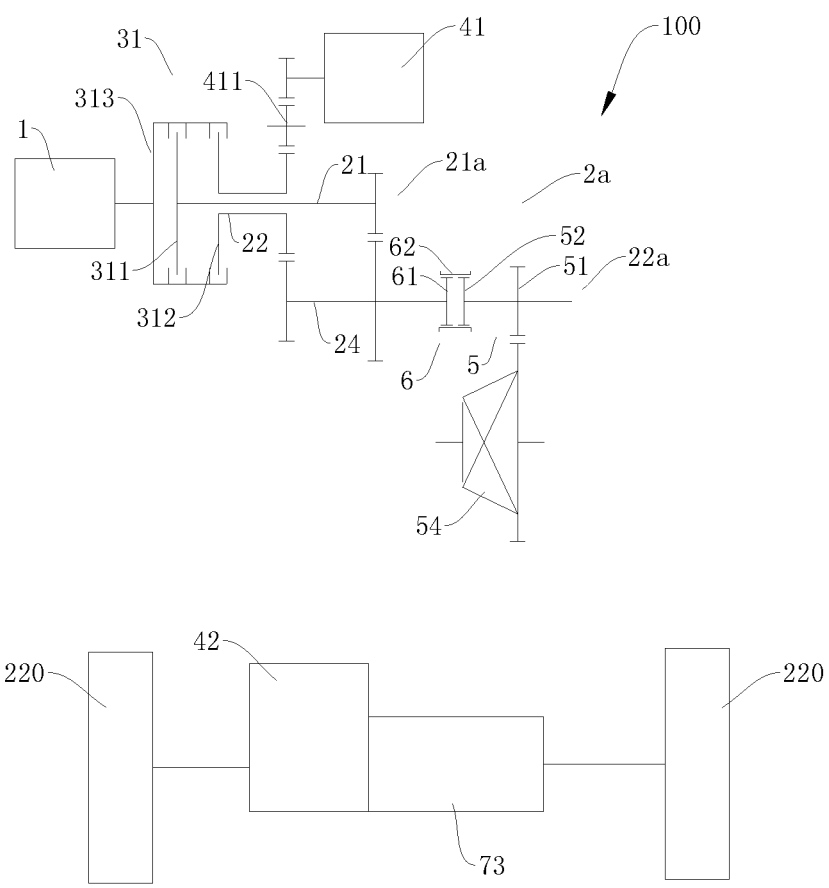
FIG. 12 is a schematic view of a power transmission system according to yet another embodiment of the present invention.
Figure 13:
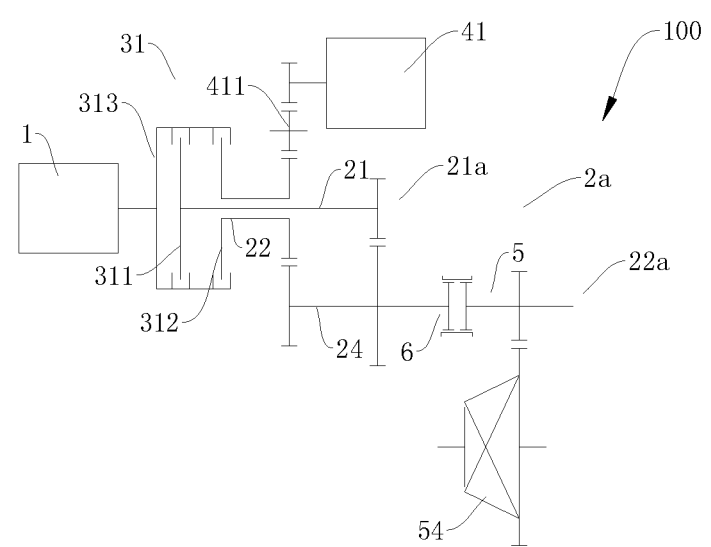
FIG. 13 is a schematic view of a power transmission system according to yet another embodiment of the present invention.
Figure 13:
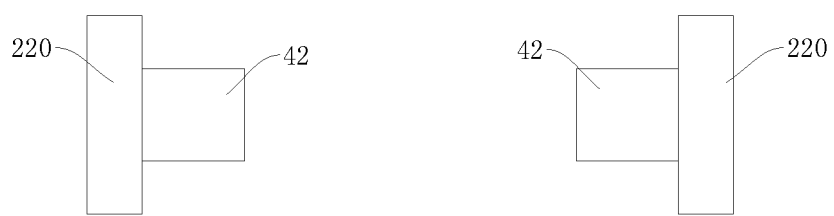

In some other embodiments of the present invention, as shown in FIGS. 9-10, the power transmission system 100 is operable in a two-wheel drive mode. In an example shown in FIG. 9, the output unit 5 drives the front wheels 210, and the second motor generator 42 is a wheel-side motor and is configured to drive the front wheels 210. In an example shown in FIG. 10, the output unit 5 drives the front wheels 210, and the second motor generators 42 are disposed at two sides of the differential 54 back to back, for example, the second motor generators 42 are disposed at two sides of the differential 54 respectively and integrally formed with the differential 54. As shown in FIGS. 11-13, the power transmission system 100 is operable in a four-wheel drive mode. In an example shown in FIG. 11, the output unit 5 drives the front wheels 210, two second motor generators 42 are provided, and each second motor generator 42 drives one rear wheel 220 via one fourth speed changing mechanism 74. In an example shown in FIG. 12, the output unit 5 drives the front wheels 210, one second motor generator 42 is provided, and the second motor generator 42 drives the rear wheels 220 via one third speed changing mechanism 73. In an example shown in FIG. 13, the output unit 5 drives the front wheels 210, two second motor generators 42 are provided and are wheel-side motors, which are configured to drive the rear wheels 220.

The third speed changing mechanism 73 may be the same as the first speed changing mechanism 71. Similarly, the fourth speed changing mechanism 74 may be the same as the second speed changing mechanism 72. Therefore, the third speed changing mechanism 73 and the fourth speed changing mechanism 74 will not be described in detail here.

In some embodiments of the present invention, the power transmission system 100 may also include a battery component 300. The battery component 300 is preferably connected with the first motor generator 41, the second motor generator 42 and the third motor generator 43 respectively. Therefore, the first motor generator 41 is driven by the engine unit 1 to generate electricity or electric energy recovered by the first motor generator 41 during the braking may be supplied to and stored in the battery component 300, and electric energy recovered by the second motor generator 42 and the third motor generator 43 during the braking may also be supplied to and stored in the battery component 300.

When the vehicle is operated in an EV mode, the battery component 300 may supply electric energy to at least one of the first motor generator 41, the second motor generator 42 and the third motor generator 43. It would be appreciated that the dot lines shown in FIG. 8 indicate that the battery component 300 may be electrically connected with the first motor generator 41, the second motor generator 42 and the third motor generator 43 respectively.

As an alternative embodiment of the power transmission system 100 described in the foregoing embodiment, as shown in FIG. 8, the power transmission system 100 includes input shafts, which include three shafts, e.g. the first input shaft 21, the second input shaft 22 and the third input shaft 23, with the second input shaft 22 being fitted over the first input shaft 21, and the third input shaft 23 being fitted over the second input shaft 22.

In the alternative embodiment, the power transmission system 100 further includes a triple clutch 32. The triple clutch 32 has an input terminal 324, a first output terminal 321, a second output terminal 322 and a third output terminal 323. The engine unit 1 is coupled with the input terminal 324 of the triple clutch 32, the first output terminal 321 of the triple clutch 32 is coupled with the first input shaft 21, the second output terminal 322 of the triple clutch 32 is coupled with the second input shaft 22, and the third output terminal 323 of the triple clutch 32 is coupled with the third input shaft 23.

Similarly, the input terminal 324 of the triple clutch 32 may be a shell thereof, and the first, second and third output terminals 321, 322, 323 of the triple clutch 32 may be three driven discs. The input terminal 324 may be engaged with one of the first, second and third output terminals 321, 322, and 323, or may be disconnected with the first, second and third output terminals 321, 322, and 323. It would be appreciated that the operation principle of the triple clutch 32 is similar to that of the dual clutch 31, so the detailed description thereof will be omitted here.

It should be noted that in the alternative embodiment, other parts such as the power transmitting manner between the first motor generator 41 and the first input shaft 21 or the output shaft 24 as well as the position and drive mode of the second motor generator 42 and the third motor generator 43, are also similar to those described in the technical solutions of the dual clutch 31, so the detailed description thereof will be omitted here.

Figure 14:
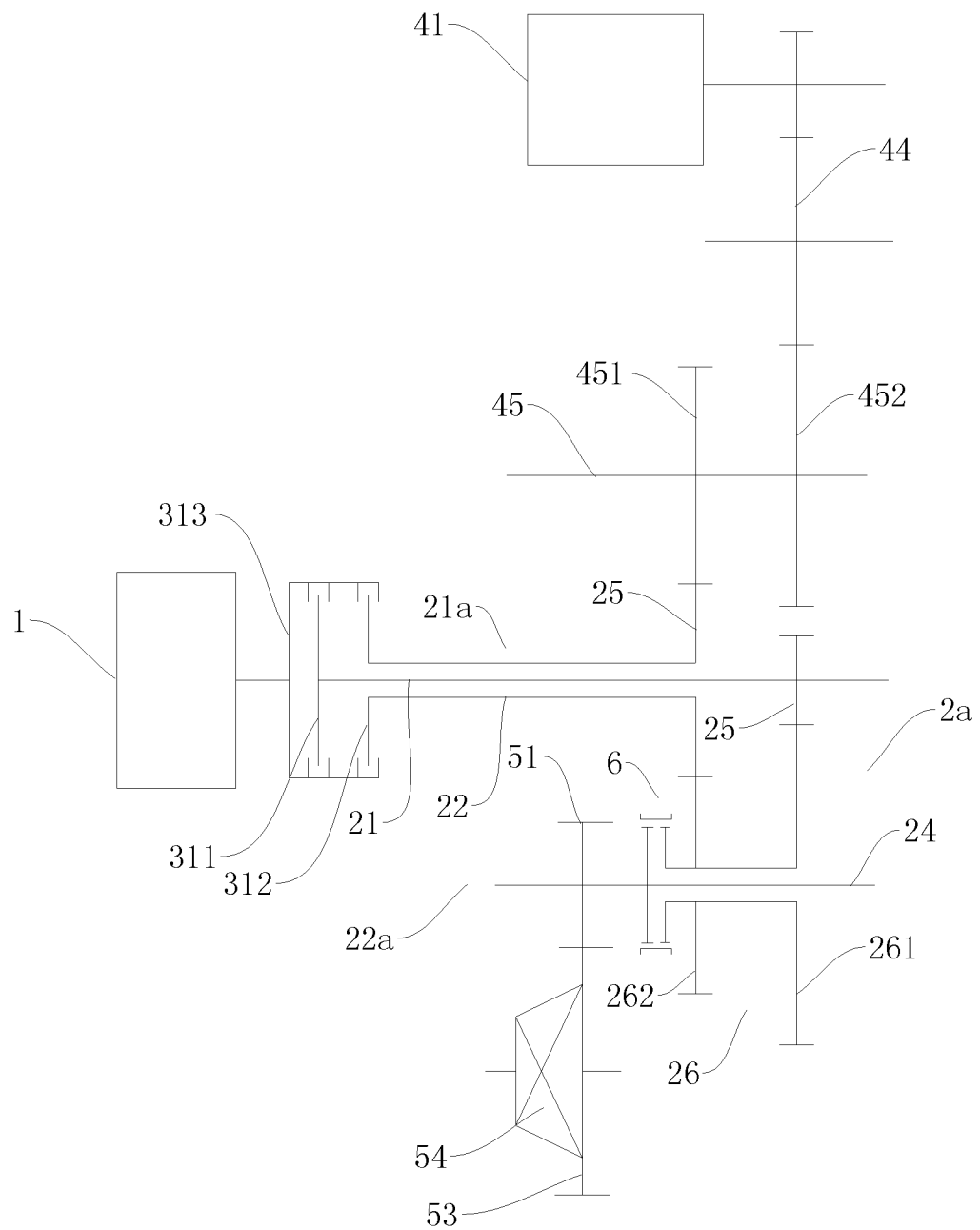
FIG. 14 is a schematic view of a power transmission system according to yet another embodiment of the present invention.
Figure 15:
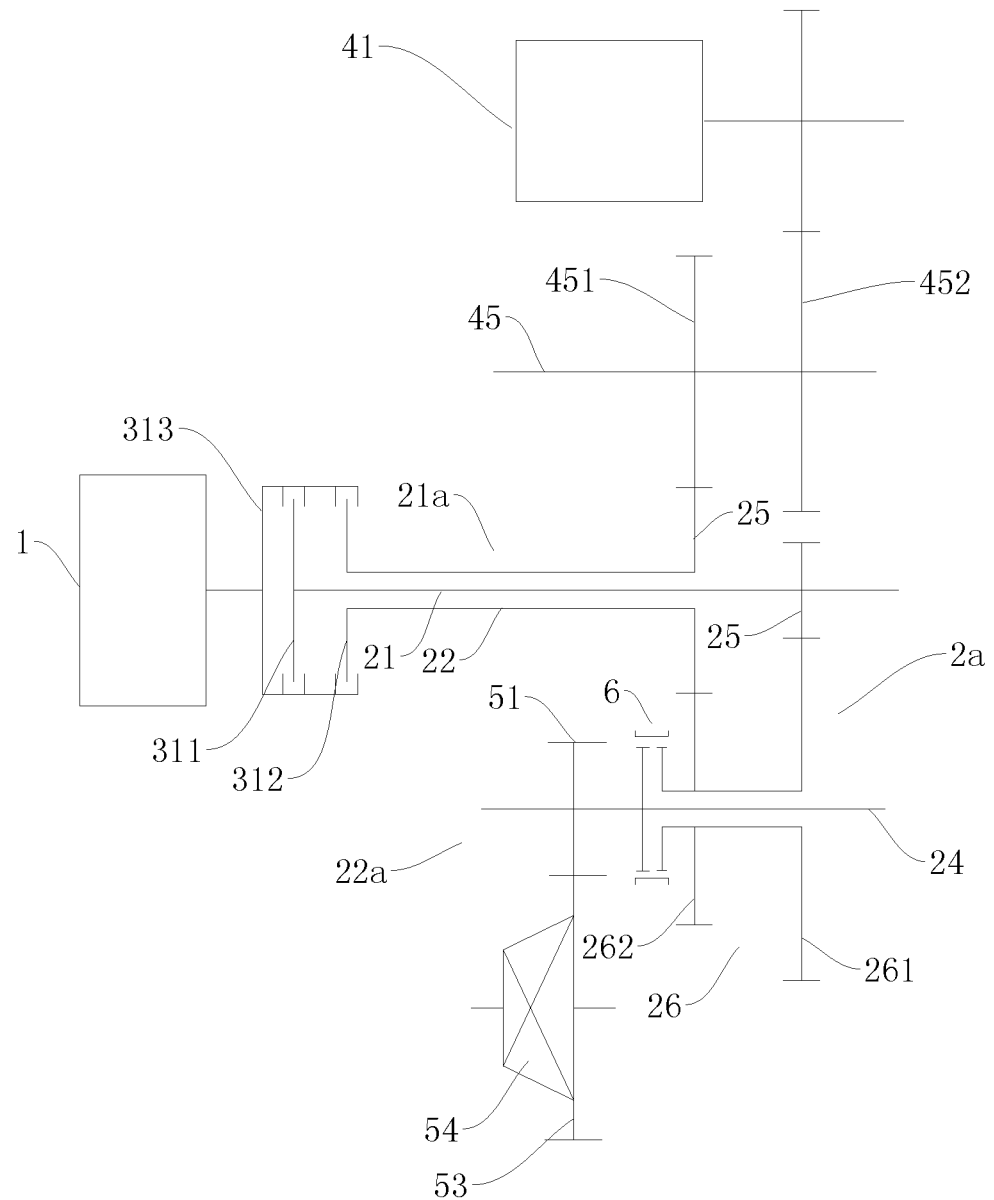
FIG. 15 is a schematic view of a power transmission system according to yet another embodiment of the present invention.
Figure 16:
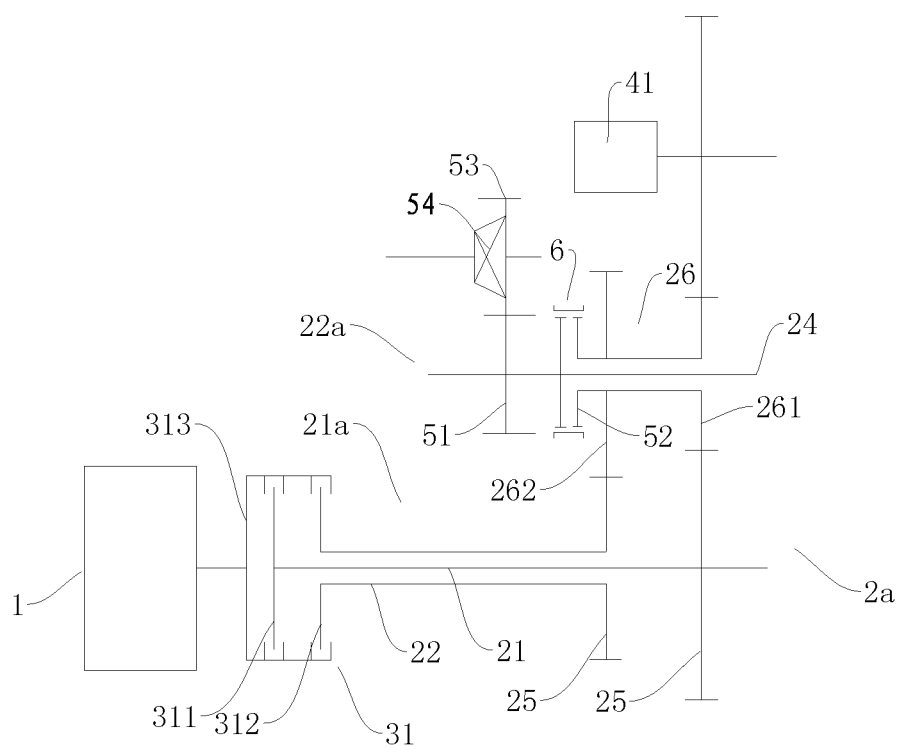
FIG. 16 is a schematic view of a power transmission system according to yet another embodiment of the present invention.

As another alternative embodiment of the power transmission system 100 described in the foregoing embodiment, as shown in FIGS. 14-16, the power transmission system 100 includes a driven gear 26 which is configured as a linked gear, and the linked gear structure 26 is freely fitted over the output shaft 24 and rotates differentially relative to the output shaft 24. The synchronizer 6 is disposed on the output shaft 24 and may be selectively engaged with the linked gear structure 26.

In the embodiment, two input shafts are provided, e.g. the first input shaft 21 and the second input shaft 22, and each input shaft is provided with one driving gear 25. The linked gear structure 26 can be a double-linked gear. The double-linked gear structure 26 has a first gear part 261 and a second gear part 262, and the first gear part 261 and the second gear part 262 are configured to mesh with two driving gears 25 respectively.

When the power transmission system 100 in this embodiment transmits the power, the synchronizer 6 may be engaged with the double-linked gear structure 26, such that the power output by at least one of the engine unit 1 and the first motor generator 41 may be output via the output unit 5 and, e.g., the driving gear 51 of the final drive.

In these embodiments, the power transmitting between the first motor generator 41 and the output shaft or one of the output shafts may be direct or indirect, and is similar to that described in the above embodiments, so the detailed description thereof will be omitted here. The arrangement of other components such as the clutch (e.g., the dual clutch 31 or the triple clutch 32) between the engine unit 1 and the input shaft is similar to that described in the above embodiments, so the detailed description thereof will also be omitted here.

In these embodiments, as shown in FIGS. 14-16, the power transmission system 100 may include an engine unit 1, a plurality of input shafts, an output shaft 24, an output unit 5 (e.g., the driving gear 51 of the final drive), a synchronizer 6 and a first motor generator 41.

A main difference of these alternative embodiments from the power transmission system 100 shown in FIGS. 2-13 is that a driven gear 26 which is a linked gear and can be freely fitted over the output shaft 24. With the output unit 5 fixed on the output shaft 24, the synchronizer 6 can be configured to engage with the linked gear. In these embodiments, the arrangement of the first motor generator 41 may slightly differ from that of the first motor generator 41 in the power transmission system 100 shown in FIGS. 2-13.

In some embodiments, as shown in FIGS. 14-16, a plurality of input shafts is provided, the input shafts are provided with the driving gears 25 thereon. The linked gear structure 26 is freely fitted over the output shaft 24. The linked gear structure 26 has a plurality of gear parts (for example, the first gear part 261, and the second gear part 262), and the gear parts are configured to mesh with the driving gears 25 on the input shafts respectively.

As shown in FIGS. 14-16, the output unit 5 is configured to output the power from the output shaft 24. For example, preferably, the output unit 5 is fixed on the output shaft 24. In an embodiment of the present invention, by way of example and without limitation, the output unit 5 may include the driving gear 51 of the final drive.

The synchronizer 6 is disposed on the output shaft 24. The synchronizer 6 is configured to selectively engage with the linked gear structure 26, so as to output the power via the output unit 5 to drive the wheels of the vehicle. The power transmission between the first motor generator 41 and one of the input shaft and the output shaft 24 may be direct or indirect.

In these embodiments, the function of the synchronizer 6 is substantially the same as that of the synchronizer 6 shown in FIGS. 2-13. The synchronizer 6 in these embodiments are configured to engage the linked gear structure 26 with the output shaft 24, while the synchronizer 6 shown in the embodiments in FIGS. 2-13 is configured to engage the output unit 5 with the output shaft 24.

In these embodiments, the function of the synchronizer 6 is to eventually synchronize the linked gear structure 26 with the output shaft 24, so that the linked gear structure 26 and the output shaft 24 can operate synchronously to output the power from at least one of the engine unit 1 and the first motor generator 41 with the output unit 5 as a power output terminal. When the linked gear structure 26 and the output shaft 24 are not synchronized by the synchronizer 6, the power from at least one of the engine unit 1 and the first motor generator 41 may not be directly output to the wheels 200 via the output unit 5.

The synchronizer 6 functions to switch the power. That is, when the synchronizer 6 is in an engaged state, the power from at least one of the engine unit 1 and the first motor generator 41 may be output via the output unit 5 to drive the wheels 200; and when the synchronizer 6 is in a disengaged state, the power from at least one of the engine unit 1 and the first motor generator 41 may not be transmitted to the wheels 200 via the output unit 5. In this way, by controlling the synchronizer 6 to switch between the engaged state and the disengaged state, the switching of the drive mode of the vehicle may be realized.

Moreover, the first motor generator 41 may adjust the speed of the linked gear structure 26 with the rotating speed of the output shaft 24 as a target value, so as to match the speed of the linked gear structure 26 with the speed of the output shaft 24 in a time efficient manner, thus reducing the time required by the synchronization of the synchronizer 6 and reducing the energy loss. Meanwhile, no torque engagement of the synchronizer 6 may be achieved, thus greatly improving the transmission efficiency, synchronization controllability and real-time synchronization of the vehicle. In addition, the life of the synchronizer 6 may be further extended, thus reducing the maintenance cost of the vehicle.

In addition, by using the linked gear structure 26, the power transmission system 100 is more compact in structure and easy to arrange, and the number of the driven gears may be decreased so as to reduce the axial dimension of the power transmission system 100, thus reducing the cost and the arrangement difficulty.

Furthermore, the synchronizer 6 may be controlled by one separate fork, such that the control steps are simple and the reliability is high.

In some embodiments of the present invention, the input shafts are coaxially nested, and each input shaft is provided with one driving gear 25. In an embodiment, the input shafts include a first input shaft 21 and a second input shaft 22, and each input shaft is provided with one driving gear 25. The linked gear structure 26 is a double-linked gear, the double-linked gear structure 26 has a first gear part 261 and a second gear part 262, and the first gear part 261 and the second gear part 262 are configured to mesh with two driving gears 25 respectively.

A dual clutch 31 may be disposed between the engine unit 1 and the first and second input shafts 21 and 22. For this part, reference may be made to the dual clutch 31 in the power transmission system 100 shown in FIGS. 2 to 13. Optionally, the dual clutch 31 may be provided with a damping structure thereon. For example, the damping structure may be arranged between a first output terminal and an input terminal of the dual clutch 31, to adapt to start the vehicle at a low gear.

As shown in FIGS. 14-16, indirect power transmitting between an output terminal of the first motor generator 41 and one driving gear can be performed.

For example, the power transmission system 100 in these embodiments further includes an intermediate shaft 45. A first intermediate shaft gear 451 and a second intermediate shaft gear 452 are fixed on the intermediate shaft 45. One of the first and second intermediate shaft gears 451 and 452 is configured to mesh with one driving gear 25. For example, as shown in FIGS. 14-15, the first intermediate shaft gear 451 is configured to mesh with the driving gear 25 on the second input shaft 22. Of course, the present invention is not limited to these examples.

In some embodiments of the present invention, direct power transmission between the output terminal of the first motor generator 41 and one of the first and second intermediate shaft gears 451 and 452, or indirect power transmission between the output terminal of the first motor generator 41 and one of the first and second intermediate shaft gears 451 and 452 via an intermediate idler 44, can be performed. For example, as shown in FIG. 14, indirect power transmitting between the output terminal of the first motor generator 41 and the second intermediate shaft gear 452 via an intermediate idler 44 is performed. As another example, as shown in FIG. 15, the output terminal of the first motor generator 41 is configured to directly mesh with the second intermediate shaft gear 452 for power transmission.

As shown in FIG. 16, the output terminal of the first motor generator 41 is configured to directly mesh with one gear part of the linked gear structure 26. For example, the output terminal of the first motor generator 41 can be configured to directly mesh with the first gear part 261 for power transmission.

However, it would be appreciated that, the present invention is not limited to this. The position of the first motor generator 41 may be designed according to practical requirements. For example, the position of the first motor generator 41 may be the same as that described above, or may be as shown in FIGS. 2-13, which will not be described in detail here.

As shown in FIGS. 14-15, the first gear part 261 inputs a torque to the engine unit 1 separately, and the second gear part 262 may input a torque to the engine unit 1 and the first motor generator 41 simultaneously.

As shown in FIGS. 14-16, an engagement gear ring 52 is fixed on a side of the linked gear structure 26 facing the synchronizer 6, and the synchronizer 6 is adapted to engage with the engagement gear ring 52, such that the linked gear structure 26 is rigidly fixed with the output shaft 24 to rotate synchronously with the output shaft 24.

Figure 17:
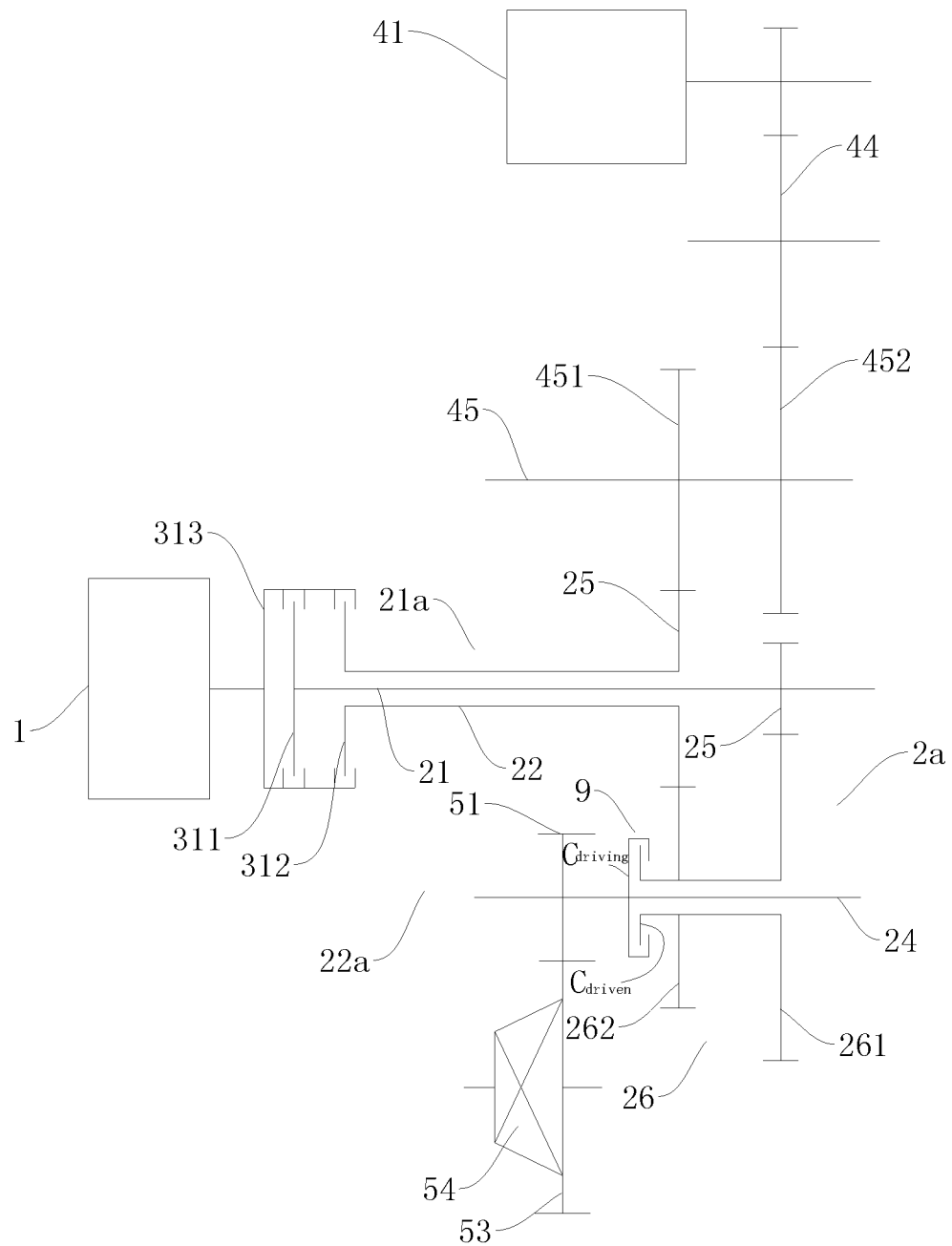
FIG. 17 is a schematic view of a power transmission system according to yet another embodiment of the present invention.
Figure 18:
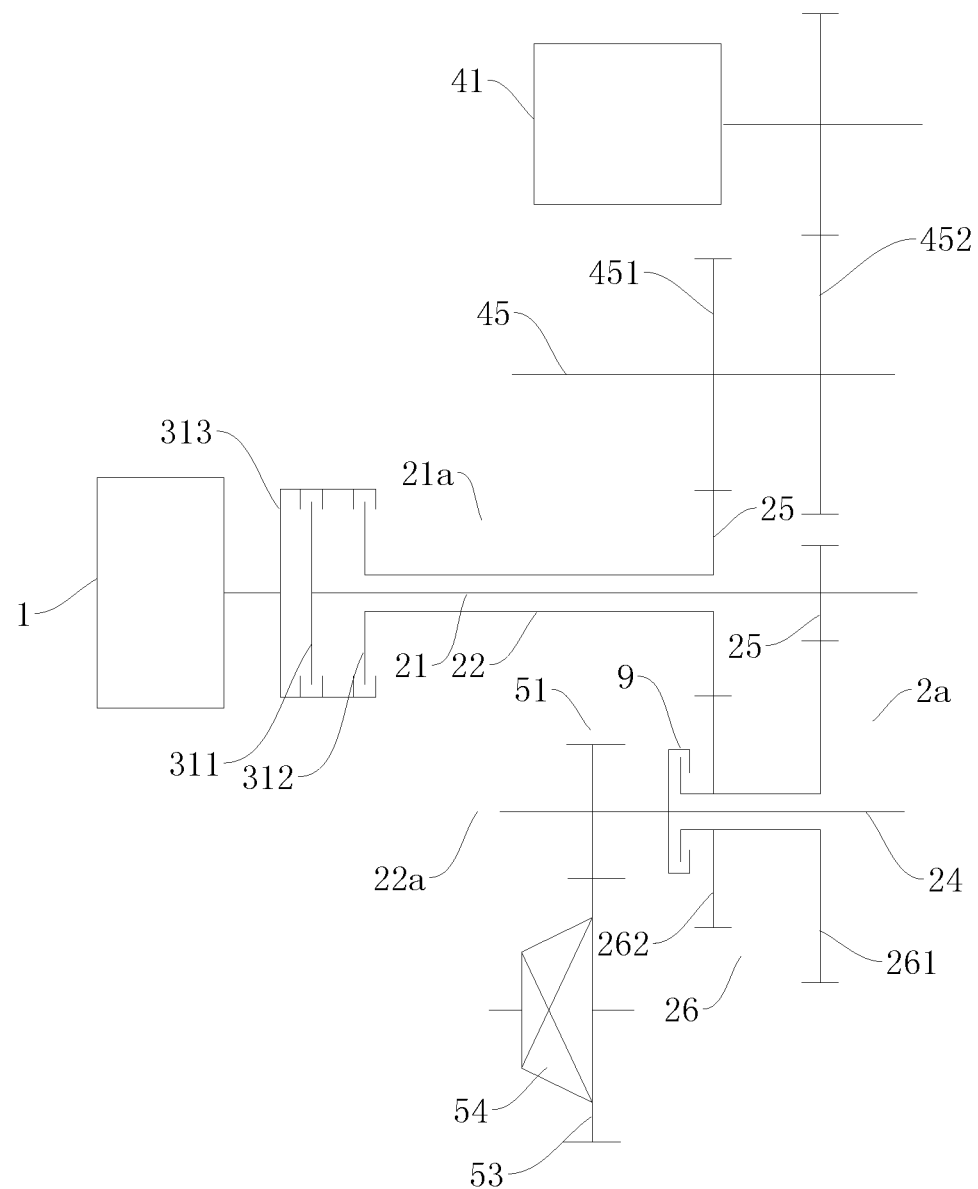
FIG. 18 is a schematic view of a power transmission system according to yet another embodiment of the present invention.
Figure 19:
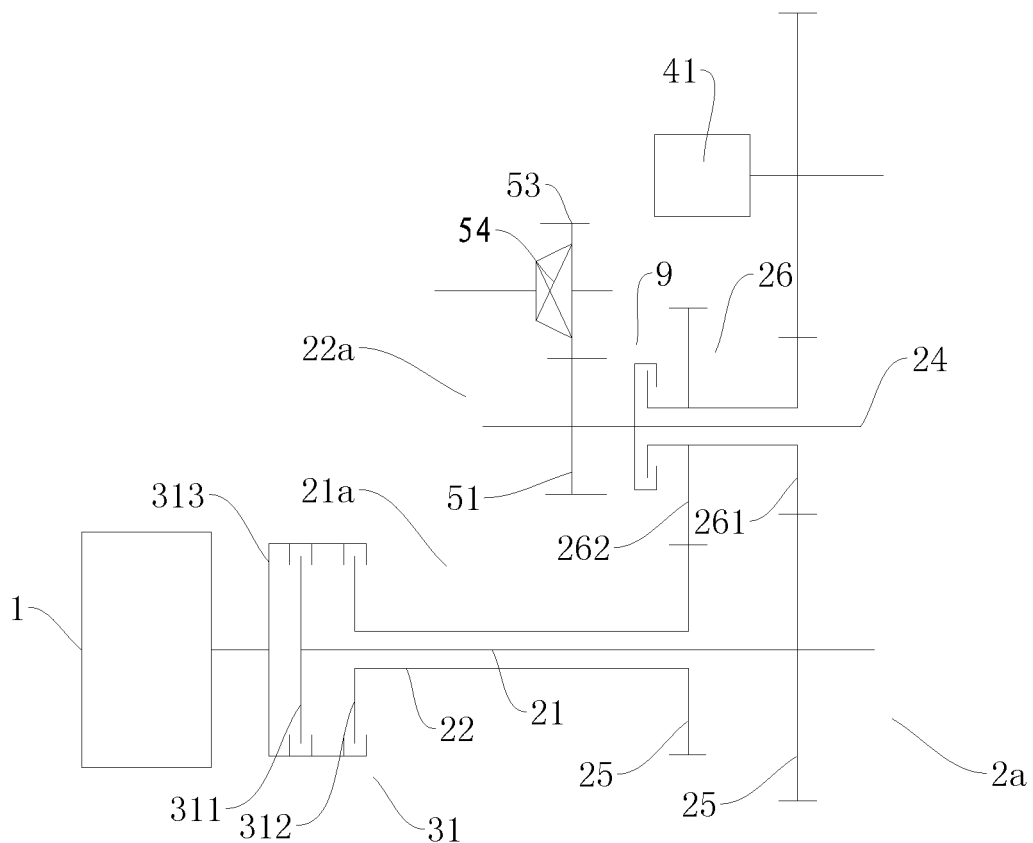
FIG. 19 is a schematic view of a power transmission system according to yet another embodiment of the present invention.

In another embodiment of the power transmission system 100 described in the foregoing linked gear embodiment, as shown in FIGS. 17-19, in the power transmission system 100, the synchronizer 6 in the above embodiments can be replaced with a clutch 9.

In these embodiments, as shown in FIGS. 17-19, the power switching device is a clutch 9. The clutch 9 is adapted to enable or interrupt a power transmission between the transmission unit 2a and the output unit 5. In other words, by the engagement of the clutch 9, the transmission unit 2a and the output unit 5 may operate synchronously, and the output unit 5 may output the power from the transmission unit 2a to the wheels 200. When the clutch 9 is in a disengaged state, the power output by the transmission unit 2a may not be directly output via the output unit 5.

In these embodiments, the double-linked gear structure 26 is freely fitted over the output shaft 24, and the output unit 5 is fixed on the output shaft 24. The clutch 9 has a driving part ($C_{driving}$ in FIG. 17) and a driven part ($C_{driven}$ in FIG. 17). One of the driving part and the driven part of the clutch 9 is disposed on a linked gear structure such as a double-linked gear 26, and the other of the driving part and the driven part of the clutch 9 is disposed on the output shaft 24. The driving part and the driven part of the clutch 9 may be disengaged from or engaged with each other. For example, as shown in FIG. 17, the driving part may be disposed on the output shaft 24, and the driven part may be disposed on the linked gear structure 26, but the present invention is not limited to this.

Therefore, after the driving part and the driven part of the clutch 9 are engaged with each other, the output shaft 24 is engaged with the double-linked gear structure 26 freely fitted over the output shaft 24, so as to output the power via the output unit 5. After the driving part and the driven part of the clutch 9 are disengaged from each other, the linked gear structure 26 is freely fitted over the output shaft 24, and the output unit 5 does not transfer the power from the transmission unit 2a.

Generally speaking, for the power transmission system 100 according to embodiments of the present invention, since the synchronizer 6 is used for power switching and has advantages of small volume, simple structure, large torque transmission and high transmission efficiency, the power transmission system 100 according to embodiments of the present invention has a reduced volume, a more compact structure and high transmission efficiency, and may meet the large-torque transmission requirements.

Meanwhile, by the speed compensation of at least one of the first motor generator 41, the second motor generator 42 and the third motor generator 43, no torque engagement of the synchronizer 6 may be realized, the ride comfort is better, the engagement speed is higher, and the dynamic response is faster. Compared to a clutch transmission in the related art, larger torque may be withstood without failure, thus greatly improving the stability and reliability of the transmission.

In some embodiments of the present invention, as shown in FIGS. 2-3, 5, 6 and 8, to achieve torque distribution of the wheels, in the five embodiments, four motor generators are used, and each motor generator is configured to drive one wheel. An advantage of four independent motors driving the vehicle lies in that: In the related art, a mechanical four-wheel drive vehicle may only achieve the torque distribution of front and rear wheels, and a full-time four-wheel drive vehicle may only achieve small difference in instantaneous torque of left and right wheels. However, in the foregoing five embodiments, since four motors are used for driving the vehicle, +100% to −100% torque difference adjustment of the left and right wheel motors may be realized, thus greatly enhancing the steering stability during the high-speed turning, and solving the problems of understeer and oversteer. Furthermore, the turning radius of the vehicle may be greatly reduced by the rotation of the left and right wheels in opposite directions when the vehicle runs at a low speed, such that the vehicle is easy to operate.

The structure of the power transmission system 100 in various specific embodiments will be described below with reference to FIGS. 2-19.

Embodiment 1

As shown in FIG. 2, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is fixedly provided with one driving gear 25, and indirect power transmission between the first motor generator 41 and the driving gear 25 on the second input shaft 22 is performed via one intermediate gear 411. The output shaft 24 is fixedly provided with two driven gears 26, and the two driven gears 26 are configured to mesh with the driving gears 25 on the first input shaft 21 and the second input shaft 22, to form two gears.

The synchronizer 6 is disposed on the output shaft 24, the driving gear (e.g. the output gear 51) of the final drive may rotate differentially relative to the output shaft 24, while the engagement gear ring 52 adapted to the synchronizer 6 is fixed on a left side of the driving gear of the final drive by using a connecting rod. The driving gear of the final drive is configured to externally mesh with the driven gear 53 of the final drive, and the driven gear 53 of the final drive may be fixed on the differential 54, to transfer the power to the differential 54. The differential 54 distributes the power and adaptively transfers the distributed power to half axles on two sides of the vehicle, to drive the wheels 200.

Two second motor generators 42 constitute wheel-side motors configured to drive two front wheels 210 respectively, and two third motor generators 43 constitute wheel-side motors configured to drive two rear wheels 220 respectively. That is, in the solution, each of the four wheels is provided with one wheel-side motor.

With the power transmission system 100 in this embodiment, by the engagement or disengagement of the dual clutch 31, the power from the engine unit 1 may be transferred to the output shaft 24 with two different transmission ratios respectively. The first motor generator 41 may transfer the power to the output shaft 24 with a constant transmission ratio via a shift gear set. When the synchronizer 6 is in an engaged state, the power from the output shaft 24 may be transferred to the front wheels 210 via the final drive and the differential 54. When the synchronizer 6 is in a disengaged state, the power from the output shaft 24 may not be transferred to the front wheels 210. The two second motor generators 42 are wheel-side motors, and may directly drive two front wheels 210 respectively. The two third motor generators 43 are wheel-side motors, and may directly drive two rear wheels 220 respectively.

The power transmission system 100 in this embodiment may have at least the following operating conditions: a pure electric vehicle (EV) operating condition of the third motor generator 43, a pure EV four-wheel drive operating condition, a parallel operating condition, a series operating condition, and a braking/decelerating feedback operating condition.

First Operating Condition

This operating condition is a pure EV operating condition of the third motor generator 43. The dual clutch 31 is in a disengaged state, the synchronizer 6 is in a disengaged state, the engine unit 1, the first motor generator 41 and the second motor generator 42 do not operate, and two third motor generators 43 drive two rear wheels 220 respectively. This operating condition is mainly applicable to a situation where a load is small and an electric quantity of a battery is large, for example, during uniform motions or under urban operating conditions.

This operating condition has the advantages that since the third motor generators 43 directly drive the rear wheels 220, compared to a front-wheel drive vehicle, the vehicle in this embodiment has better acceleration performance, gradeability and steering capability. Moreover, since the third motor generators 43 independently drive the left rear wheel and the right rear wheel respectively, an electronic differential function may be achieved, thus increasing the operating stability and reducing the amount of tire wear. In a front-wheel drive part, since the association between the output gear 51 and the front wheels 210 is interrupted by the synchronizer 6, there is no mechanical loss in the front-wheel drive part, thus reducing the energy consumption of the vehicle.

Second Operating Condition

This operating condition is a pure EV four-wheel drive operating condition. The dual clutch 31 is in a disengaged state, the synchronizer 6 is in a disengaged state, the first motor generator 41 does not operate, two second motor generators 42 are configured to drive two front wheels 210 respectively, and two third motor generators 43 are configured to drive two rear wheels 220 respectively. This operating condition is mainly applicable to a situation where a load is large and an electric quantity of a battery is large, for example, during acceleration, climbing, overtaking, or high-speed running.

This operating condition has the advantages of having better dynamic performance than a single-motor drive, and having better economic efficiency and lower noise than a hybrid drive. A typical application highlighting the advantages of this operating condition is traffic congestion at a steep slope (mountain road).

Moreover, compared to a front-wheel drive vehicle and a rear-wheel drive vehicle, a pure EV four-wheel drive vehicle has better acceleration performance, gradeability, handling performance and off-road capability. Since two second motor generators 42 and two third motor generators 43 drive four wheels independently, the wheels may obtain different torques and rotating speeds, to achieve the individual control on the four wheels, thus maximizing the dynamic performance, operating stability and off-road performance. Furthermore, when torques in different directions are applied to the left and right wheels by corresponding motor generators, the in-situ steering of the vehicle may be realized.

Third Operating Condition

This operating condition is a parallel operating condition. The dual clutch 31 is in an engaged state, the synchronizer 6 is in an engaged state, and the engine unit 1 and the first motor generator 41 transfer the power to the driving gear 51 of the final drive via the shift gear set and the synchronizer 6, and the driving gear 51 of the final drive transfers the power to the front wheels 210 via the differential 54, while two second motor generators 42 transfer the power to the corresponding front wheels 210 and two third motor generators 43 transfer the power to the corresponding rear wheels 220. This operating condition is mainly applicable to a situation where a load is the largest, for example, during quick acceleration, or climbing steep slopes.

This operating condition has the advantages that the five motor generators and the engine unit 1 drive the vehicle simultaneously, thus maximizing the dynamic performance. Compared to a front-wheel drive vehicle and a rear-wheel drive vehicle, an HEV four-wheel drive vehicle has better acceleration performance, gradeability, handling performance and off-road capability. Moreover, since the third motor generators 43 independently drive the left rear wheel and the right rear wheel respectively, an electronic differential function may be achieved, and a mechanical differential in the related art is avoided, thus reducing parts while increasing the handling stability and reducing the amount of tire wear.

Fourth Operating Condition

This operating condition is a series operating condition. The dual clutch 31 is in an engaged state, the synchronizer 6 is in a disengaged state, the engine unit 1 drives the first motor generator 41 via the dual clutch 31 and the shift gear set to generate electricity, the second motor generators 42 are configured to drive the front wheels 210 respectively, and the third motor generators 43 are configured to drive the rear wheels 220 respectively. This operating condition is mainly applicable to a situation where a load is medium and an electric quantity of a battery is small.

This operating condition has the advantages that, when compared to a front-wheel drive vehicle and a rear-wheel drive vehicle, the vehicle under the series (e.g. four-wheel drive series) operating condition has better acceleration performance, gradeability, handling performance and off-road capability. Since two second motor generators 42 and two third motor generators 43 drive four wheels independently, the wheels may obtain different torques and rotating speeds, so as to achieve the individual control on the four wheels, thus maximizing the dynamic performance, handling stability and off-road performance. Furthermore, when torques in different directions are applied to the left and right wheels by corresponding motor generators, the in-situ steering of the vehicle may be realized. Moreover, the first motor generator 41 may keep the engine unit 1 running in an optimal economic region through torque and rotating speed adjustment, thus reducing fuel consumption during the electricity generation.

Fifth Operating Condition

This operating condition is a braking/decelerating feedback operating condition. The dual clutch 31 is in an engaged state, the synchronizer 6 is in a disengaged state, the engine unit 1 drives the first motor generator 41 to generate electricity, the second motor generators 42 brake the front wheels 210 and generate electricity, and the third motor generators 43 brake the rear wheels 220 and generate electricity. This operating condition is mainly used for braking or decelerating the vehicle.

This operating condition has the advantages that, since the second motor generator 42 and the third motor generator 43 brake four wheels respectively during the decelerating or braking, whether the vehicle is turning or moving straightly, the power of each wheel may be fully absorbed, in the premise of ensuring the braking force and stability of the vehicle, thus maximizing the energy feedback. Moreover, because of the disengagement of the synchronizer 6, while the four motor generators brake the four wheels respectively, the engine unit 1 and the first motor generator 41 may continue generating electricity, so as to enable a stable electricity generation state, avoid frequent switching, and extend the life of components.

Sixth Operating Condition

This operating condition is a series-parallel operating condition. The dual clutch 31 is in an engaged state, the synchronizer 6 is in an engaged state, a part of the power from the engine unit 1 drives the first motor generator 41 via the dual clutch 31 and the shift gear set to generate electricity, the other part of the power from the engine unit 1 is transferred to the driving gear 51 of the final drive via the shift gear set and the synchronizer 6, the second motor generators 42 drive the front wheels 210 directly via the driving gear 51 of the final drive, and the third motor generators 43 drive the rear wheels 220 respectively. This operating condition is mainly applicable to a situation where a load is large and an electric quantity of a battery is small, for example, during acceleration or climbing. This operating condition has the advantages of exploiting all the power from the engine unit 1, ensuring the dynamic performance of the vehicle while generating electricity, and maintaining the electric quantity of the battery.

The above six operating conditions may be switched, and typical switching between operating conditions is switching from the fourth operating condition to the third operating condition, or switching from the fourth operating condition to the fifth operating condition.

The switching from the fourth operating condition to the third operating condition will be described as follows. For example, when it is necessary to quickly accelerate for overtaking or avoiding obstacles, according to the accelerator demand of a driver, the power transmission system 100 may switch from the fourth operating condition to the third operating condition. At this time, the first motor generator 41 may adjust the rotating speed of the output shaft 24 with the rotating speed of the driving gear of the final drive as a target value through the rotating speed control, so as to match the rotating speed of the output shaft 24 with the rotating speed of the driving gear of the final drive as far as possible, thus facilitating the engagement of the synchronizer 6.

During the matching, the second motor generators 42 and the third motor generators 43 may respond to the needs of the driver to increase the torque, such that the vehicle is accelerated, unlike a vehicle in the related art, the vehicle needs not to be accelerated only when the synchronizer 6 is in an engaged state. The torque compensation in advance may greatly shorten the torque response time and improve the instantaneous acceleration performance of the vehicle.

As another example, the switching from the fourth operating condition to the fifth operating condition will be described as follows. When the vehicle needs to be braked or decelerated, according to the throttle demand or the brake pedal operation of the driver, the power transmission system 100 may switch from the fourth operating condition to the fifth operating condition. The second motor generators 42 and the third motor generators 43 may meet the braking feedback requirements, and the feedback of the first motor generator 41 is not needed. At this time, the second motor generators 42 and the third motor generators 43 may instantly respond to the needs of the driver to brake the wheels and feedback the electric quantity, which need not be like a vehicle in the related art which feeds back the electric quantity only when the synchronizer 6 is in an engaged state.

Meanwhile, the engine unit 1 and the first motor generator 41 may be kept generating electricity, under the braking operating condition and the series operating condition. The torque compensation in advance may greatly shorten the motor braking response time and increase the feedback electric quantity.

Under complex road conditions, for example, when the vehicle runs uphill, downhill, on a bumpy road, or under a low adhesion condition, the engagement of the synchronizer 6 can be difficult due to the changing speed of the vehicle. Even if the first motor generator 41 may adjust the rotating speed of the output shaft 24 through the rotating speed control, since the rotating speed of the driving gear of the final drive along with the speed of the vehicle may not be controllable, the speed adjusting accuracy and rate of the first motor generator 41 may be reduced. Under such road conditions, since the second motor generators 42 and the third motor generators 43 may compensate for the torque of the vehicle, the speed of the vehicle may be stabilized effectively, thus improving the driving experience of the vehicle and simplifying the engagement of the synchronizer 6.

Embodiment 2

As shown in FIG. 3, the power transmission system 100 in this embodiment differs from the power transmission system 100 shown in FIG. 2 in the arrangement of the third motor generators 43. In this embodiment, each third motor generator 43 drives a corresponding rear wheel 220 via one second speed changing mechanism 72. Other parts in this embodiment are substantially the same as those in the power transmission system 100 in the embodiment shown in FIG. 2, so the detailed description thereof will be omitted here. The specific operating conditions of the power transmission system 100 in this embodiment are substantially the same as those of the power transmission system 100 in the embodiment shown in FIG. 2, except that the power transfer between the third motor generators 43 and the corresponding rear wheels 220 is performed via the second speed changing mechanism 72, which will not be detailed here.

Embodiment 3

As shown in FIG. 4, the power transmission system 100 in this embodiment differs from the power transmission system 100 shown in FIG. 2 in the arrangement of the third motor generators 43. In this embodiment, one third motor generator 43 is provided and drives the rear wheels 220 via one first speed changing mechanism 71. Other parts in this embodiment are substantially the same as those in the power transmission system 100 in the embodiment shown in FIG. 2, so the detailed description thereof will be omitted here. The specific operating conditions of the power transmission system 100 in this embodiment are substantially the same as those of the power transmission system 100 in the embodiment shown in FIG. 2, except that since two rear wheels 220 are driven by one third motor generator 43 and one first speed changing mechanism 71, in the premise of no new components, the differential function of the rear wheels 220 may not be realized by means of only one motor and one speed changing mechanism, however, it would be appreciated that a differential integrally formed with the first speed changing mechanism 71 may be added to realize the differential rotation of the two rear wheels 220.

Embodiment 4

As shown in FIG. 5, the power transmission system 100 in this embodiment differs from the power transmission system 100 shown in FIG. 2 in the arrangement of the second motor generators 42. In this embodiment, the second motor generators 42 are disposed at two sides of the differential 54 back to back respectively. Other parts in this embodiment are substantially the same as those in the power transmission system 100 in the embodiment shown in FIG. 2, so the detailed description thereof will be omitted here. The specific operating conditions of the power transmission system 100 in this embodiment are substantially the same as those of the power transmission system 100 in the embodiment shown in FIG. 2, which will not be detailed here.

Embodiment 5

As shown in FIG. 6, the power transmission system 100 in this embodiment differs from the power transmission system 100 shown in FIG. 5 in the arrangement of the third motor generators 43. In this embodiment, each third motor generator 43 drives a corresponding rear wheel 220 via one second speed changing mechanism 72. Other parts in this embodiment are substantially the same as those in the power transmission system 100 in the embodiment shown in FIG. 2, so the detailed description thereof will be omitted here. The specific operating conditions of the power transmission system 100 in this embodiment are substantially the same as those of the power transmission system 100 in the embodiment shown in FIG. 2, which will not be detailed here.

Embodiment 6

As shown in FIG. 7, the power transmission system 100 in this embodiment differs from the power transmission system 100 shown in FIG. 5 in the arrangement of the third motor generators 43. In this embodiment, one third motor generator 43 is provided and drives the rear wheels 220 via one first speed changing mechanism 71. Other parts in this embodiment are substantially the same as those in the power transmission system 100 in the embodiment shown in FIG. 5, so the detailed description thereof will be omitted here. The specific operating conditions of the power transmission system 100 in this embodiment are substantially the same as those of the power transmission system 100 in the embodiment shown in FIG. 5, except that since two rear wheels 220 are driven by one third motor generator 43 and one first speed changing mechanism 71, in the premise of no new components, the differential function of the rear wheels 220 may not be realized by means of only one motor and one speed changing mechanism, however, it would be appreciated that a differential integrally formed with the first speed changing mechanism 71 may be added to realize the differential rotation of the two rear wheels 220.

Embodiment 7

As shown in FIG. 8, the power transmission system 100 in this embodiment differs from the power transmission system 100 shown in FIG. 2 in the type of the clutch as well as the number of the input shafts, the driving gears 25 and the driven gears 26. In this embodiment, the clutch is a triple clutch 32, three input shafts are provided, and correspondingly three pairs of driving gears 25 and driven gears 26 are provided. Other parts in this embodiment are substantially the same as those in the power transmission system 100 in the embodiment shown in FIG. 2, so the detailed description thereof will be omitted here.

Embodiment 8

As shown in FIG. 9, the power transmission system 100 in this embodiment differs from the power transmission system 100 shown in FIG. 2 in that the third motor generators 43 in the embodiment shown in FIG. 2 are eliminated, and the power transmission system 100 in this embodiment is operable in a two-wheel drive mode.

The power transmission system 100 in this embodiment may have at least the following operating conditions.

First Operating Condition

This operating condition is a pure EV operating condition of the second motor generator 42. The dual clutch 31 is in a disengaged state, the synchronizer 6 is in a disengaged state, the engine unit 1 and the first motor generator 41 do not operate, and the second motor generators 42 drive the front wheels 210 directly. This operating condition is mainly applicable to a situation where a load is small and an electric quantity of a battery is large, for example, during uniform motions or under urban operating conditions.

This operating condition has the advantages that, since the second motor generators 42 directly drive the front wheels 210, the transmission chain is the shortest, and operating components are the fewest, thus achieving maximum transmission efficiency and minimum noise. Moreover, since the second motor generators 42 independently drive the left front wheel 210 and the right front wheel 210 respectively, an electronic differential function may be achieved, thus increasing the handling stability and reducing the amount of tire wear.

Second Operating Condition

This operating condition is a pure EV operating condition of three motors. The dual clutch 31 is in a disengaged state, the synchronizer 6 is in an engaged state, the engine unit 1 does not operate, the first motor generator 41 transfers the power to the driving gear 51 of the final drive via the shift gear set and the synchronizer 6, and the driving gear 51 of the final drive evenly distributes the power to the left and right front wheels 210 via the differential 54, while the second motor generators 42 directly drive the left and right front wheels 210.

This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road).

Third Operating Condition

This operating condition is a parallel operating condition. The dual clutch 31 is in a disengaged state, the synchronizer 6 is in an engaged state, the engine unit 1 and the first motor generator 41 transfer the power to the driving gear 51 of the final drive via the shift gear set and the synchronizer 6, the driving gear 51 of the final drive evenly distributes the power to the left and right front wheels via the differential 54, and the second motor generators 42 directly drive the left and right front wheels. This operating condition is mainly applicable to a situation where a load is the largest, for example, during quick acceleration, or climbing steep slopes.

This operating condition has the advantages that three motors and the engine unit 1 drive the vehicle simultaneously, thus maximizing the dynamic performance.

Fourth Operating Condition

This operating condition is a series operating condition. The dual clutch 31 is in an engaged state, the synchronizer 6 is in a disengaged state, the engine unit 1 drives the first motor generator 41 via the dual clutch 31 and the shift gear set to generate electricity, the second motor generators 42 directly drive the wheels. This operating condition is mainly applicable to a situation where a load is medium and an electric quantity of a battery is small.

This operating condition has the advantages that, since the second motor generators 42 directly drive the wheels, the transmission chain is the shortest, and operating components are the fewest, thus achieving maximum transmission efficiency and minimum noise.

Meanwhile, the first motor generator 41 may keep the engine unit 1 running in an optimal economic region through torque and rotating speed adjustment, thus reducing fuel consumption during the electricity generation. Moreover, since the second motor generators 42 independently drive the left front wheel and the right front wheel respectively, an electronic differential function may be achieved, thus increasing the handling stability and reducing the amount of tire wear.

Fifth Operating Condition

This operating condition is a braking/decelerating feedback operating condition. The dual clutch 31 is in an engaged state, the synchronizer 6 is in a disengaged state, the engine unit 1 drives the first motor generator 41 to generate electricity, and the second motor generator 42 directly brakes the wheels and generates electricity. This operating condition is mainly used for braking or decelerating the vehicle. This operating condition has the advantages that, since the second motor generator 42 brake two wheels respectively during the decelerating or braking of the vehicle, the braking energy may be absorbed to the largest extent and converted into electric energy, and the engine unit 1 and the first motor generator 41 may continue generating electricity, to enable a stable electricity generation state and avoid frequent switching.

The above five operating conditions may be switched, and typical switching between operating conditions is switching from the fourth operating condition to the third operating condition, or switching from the fourth operating condition to the fifth operating condition.

The switching from the fourth operating condition to the third operating condition will be described as follows. For example, when it is necessary to quickly accelerate for overtaking or avoiding obstacles, according to the accelerator demand of a driver, the power transmission system may switch from the fourth operating condition to the third operating condition. At this time, the first motor generator 41 may adjust the rotating speed of the output shaft 24 with the rotating speed of the driving gear 51 of the final drive as a target value through the rotating speed control, so as to match the rotating speed of the output shaft 24 with the rotating speed of the driving gear 51 of the final drive as far as possible, thus facilitating the engagement of the synchronizer 6. During the matching, the second motor generators 42 may respond to the needs of the driver to increase the torque, such that the vehicle is accelerated, unlike a vehicle in the related art, the vehicle does not require the synchronizer 6 to be in an engaged state in order to be accelerated. The torque compensation in advance may greatly shorten the torque response time and improve the instantaneous acceleration performance of the vehicle.

For example, the switching from the fourth operating condition to the fifth operating condition will be described as follows. When the vehicle needs to be braked or decelerated, according to the accelerator demand or the brake pedal operation of the driver, the power transmission system 100 may switch from the fourth operating condition to the fifth operating condition. The second motor generators 42 may meet the braking feedback requirements, and the feedback of the first motor generator 41 is not needed. At this time, the second motor generators 42 may instantly respond to the needs of the driver to brake the wheels and feedback the electric quantity, unlike a vehicle in the related art, the vehicle does not require the synchronizer 6 to be in an engaged state to feedback the electric quantity.

Meanwhile, the engine unit 1 and the first motor generator 41 may be kept generating electricity, under the braking operating condition and the series operating condition. The torque compensation in advance may greatly shorten the motor braking response time and increase the feedback electric quantity.

Under complex road conditions, for example, when the vehicle runs uphill, downhill, on a bumpy road, or under a low adhesion condition, the engagement of the synchronizer 6 is difficult due to the changing speed of the vehicle. Even if the first motor generator 41 may adjust the rotating speed of the output shaft 24 through the rotating speed control, since the rotating speed of the driving gear of the final drive along with the speed of the vehicle is not controllable, the speed adjusting accuracy and rate of the first motor generator 41 may be reduced. Under these road conditions, since the second motor generators 42 may compensate for the torque of the vehicle, the speed of the vehicle may be stabilized effectively, thus improving the driving experience of the vehicle and simplifying the engagement of the synchronizer 6.

Embodiment 9

As shown in FIG. 10, the power transmission system 100 in this embodiment differs from the power transmission system 100 shown in FIG. 9 in the arrangement of the second motor generators 42. In this embodiment, the second motor generators 42 are disposed at two sides of the differential 54 back to back respectively. Other parts in this embodiment are substantially the same as those in the power transmission system 100 in the embodiment shown in FIG. 9, so the detailed description thereof will be omitted here.

Embodiment 10

As shown in FIG. 11, the power transmission system 100 in this embodiment differs from the power transmission system 100 shown in FIG. 9 in the arrangement of the second motor generators 42. In this embodiment, two second motor generators 42 are provided, and each second motor generator 42 drives a corresponding rear wheel 220 via one fourth speed changing mechanism 74. Other parts in this embodiment are substantially the same as those in the power transmission system 100 in the embodiment shown in FIG. 9, so the detailed description thereof will be omitted here.

The power transmission system 100 in this embodiment may have at least the following operating conditions.

First Operating Condition

This operating condition is a pure EV operating condition of the second motor generator 42. The dual clutch 31 is in a disengaged state, the synchronizer 6 is in a disengaged state, the engine unit 1 and the first motor generator 41 do not operate, and each second motor generator 42 drives one rear wheel via a corresponding fourth speed changing mechanism 74. This operating condition is mainly applicable to a situation where a load is small and an electric quantity of a battery is large, for example, during uniform motions or under urban operating conditions. This operating condition has the advantages that, since the second motor generators 42 drive the rear wheels, compared to a front-wheel drive vehicle, the vehicle in this embodiment has better acceleration performance, gradeability and steering capability. Moreover, since the second motor generators 42 independently drive the left rear wheel and the right rear wheel respectively, an electronic differential function may be achieved, thus increasing the handling stability and reducing the amount of tire wear. In a front-wheel drive part, since the association between the gear set and the front wheels is interrupted by the synchronizer 6, there is no mechanical loss in the front-wheel drive part, thus reducing the energy consumption of the vehicle.

Second Operating Condition

This operating condition is a pure EV four-wheel drive operating condition. The dual clutch 31 is in a disengaged state, the synchronizer 6 is in an engaged state, the engine unit 1 does not operate, the first motor generator 41 drives the front wheels respectively, and the second motor generators 42 drive the rear wheels respectively. This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road). Moreover, compared to a front-wheel drive vehicle and a rear-wheel drive vehicle, a pure EV four-wheel drive vehicle has better acceleration performance, gradeability, handling performance and off-road capability. Moreover, since the second motor generators 42 independently drive the left rear wheel and the right rear wheel respectively, an electronic differential function may be achieved, thus increasing the handling stability and reducing the amount of tire wear.

Third Operating Condition

This operating condition is a parallel operating condition. The dual clutch 31 is in a disengaged state, the synchronizer 6 is in an engaged state, the engine unit 1 and the first motor generator 41 drive the front wheels 210 simultaneously, and the second motor generators 42 drive the rear wheels respectively. This operating condition is mainly applicable to a situation where a load is the largest, for example, during quick acceleration, or climbing steep slopes. This operating condition has the advantages that two motor generators and the engine unit drive the vehicle simultaneously, thus maximizing the dynamic performance. Compared to a front-wheel drive vehicle and a rear-wheel drive vehicle, an HEV four-wheel drive vehicle has better acceleration performance, gradeability, handling performance and off-road capability. Moreover, since the second motor generators 42 independently drive the left rear wheel and the right rear wheel respectively, an electronic differential function may be achieved, thus increasing the handling stability and reducing the amount of tire wear.

Fourth Operating Condition

This operating condition is a series operating condition. The dual clutch 31 is in an engaged state, the synchronizer 6 is in a disengaged state, the engine unit 1 drives the first motor generator 41 to generate electricity, and the second motor generators 42 drive the rear wheels respectively. This operating condition is mainly applicable to a situation where a load is medium and an electric quantity of a battery is small. This operating condition has the advantages that, since the two second motor generators independently drive the left rear wheel and the right rear wheel respectively, an electronic differential function may be achieved, thus increasing the handling stability and reducing the amount of tire wear. Compared to a front-wheel drive vehicle, the vehicle under the series operating condition has better acceleration performance, gradeability, and steering capability. Moreover, the first motor generator 41 may keep the engine unit 1 running in an optimal economic region through torque and rotating speed adjustment, thus reducing fuel consumption during the electricity generation.

Fifth Operating Condition

This operating condition is a braking/decelerating feedback operating condition. The dual clutch 31 is in a disengaged state, the synchronizer 6 is in an engaged state, the engine unit does not operate, and the first motor generator and the second motor generators brake the vehicle and generate electricity simultaneously. This operating condition has the advantages that, since three motors brake the vehicle simultaneously during the decelerating or braking of the vehicle, the braking energy may be absorbed to the largest extent and converted into electric energy. By the disengagement of the dual clutch, the braking of the vehicle by the friction torque of the engine unit may be eliminated, so that more power is left to be absorbed by the motor. Because of the braking feedback of the front-wheel drive and the rear-wheel drive, the braking force may be distributed to front and rear motors in the premise of ensuring the braking force of the vehicle, and more electric energy may be fed back compared to a front-wheel drive vehicle or a rear-wheel drive vehicle. Moreover, two second motor generators may control the braking force independently, thus improving the handling stability of the vehicle during braking when turning, and further increasing the feedback energy.

Similarly, the operating conditions of the power transmission system 100 in this embodiment may be switched, and typical switching between operating conditions is switching from the fourth operating condition to the third operating condition, or switching from the fourth operating condition to the fifth operating condition. The switching between the operating conditions of the power transmission system 100 in this embodiment is similar to that in the above embodiments, so the detailed description thereof will be omitted here.

Embodiment 11

As shown in FIG. 12, the power transmission system 100 in this embodiment differs from the power transmission system 100 shown in FIG. 9 in the arrangement of the second motor generators 42. In this embodiment, one second motor generators 42 is provided, and the second motor generator 42 drives the rear wheels 220 via one third speed changing mechanism 73. Other parts in this embodiment are substantially the same as those in the power transmission system 100 in the embodiment shown in FIG. 9, so the detailed description thereof will be omitted here.

In this embodiment, the second motor generator 42 may be used to drive the vehicle separately. At this time, the dual clutch 31 and the synchronizer 6 are in a disengaged state. This operating condition is mainly applicable to a situation where a load is small and an electric quantity of a battery is large, for example, during uniform motions or under urban operating conditions. This operating condition has the advantages that, since the second motor generators 42 directly drive the rear wheels 220 via the third speed changing mechanism 73, compared to a front-wheel drive vehicle, the vehicle in this embodiment has better acceleration performance, gradeability and steering capability. In a front-wheel drive part, the synchronizer 6 is in a disengaged state, so there is no mechanical loss in the front-wheel drive part, thus reducing the energy consumption of the vehicle. In a rear-wheel drive part, a differential integrally formed with the third speed changing mechanism 73 may also be added.

In this embodiment, the power transmission system 100 may also have a pure EV four-wheel drive operating condition. At this time, the dual clutch 31 is in a disengaged state, the synchronizer 6 is in an engaged state, the engine unit 1 does not operate, the first motor generator 41 drives the front wheels 210 respectively, and the second motor generator 42 drives the rear wheels 220 respectively. This operating condition is mainly applicable to a situation where a load is large and an electric quantity of a battery is large, for example, during acceleration, climbing, overtaking, or high-speed running. This operating condition has better dynamic performance than a single-motor drive, and has better economic efficiency and lower noise than a hybrid drive. A typical application highlighting the advantages of this operating condition is traffic congestion at a steep slope (mountain road). Moreover, compared to a front-wheel drive vehicle and a rear-wheel drive vehicle, a pure EV four-wheel drive vehicle has better acceleration performance, gradeability, handling performance and off-road capability.

In this embodiment, the power transmission system may also have a parallel operating condition. The dual clutch 31 is in an engaged state, the synchronizer 6 is in an engaged state, the engine unit 1 and the first motor generator 41 drive the front wheels 210 simultaneously, and the second motor generator 42 drives the rear wheels 220. This operating condition is mainly applicable to a situation where a load is the largest, for example, during quick acceleration, or climbing steep slopes. This operating condition has the advantages that two motors and the engine unit 1 drive the vehicle simultaneously, thus maximizing the dynamic performance. Compared to a front-wheel drive vehicle and a rear-wheel drive vehicle, an HEV four-wheel drive vehicle has better acceleration performance, gradeability, handling performance and off-road capability.

In this embodiment, the power transmission system may also have a series operating condition. The dual clutch 31 is in an engaged state, the synchronizer 6 is in a disengaged state, the engine unit 1 drives the first motor generator 41 to generate electricity, and the second motor generator drives the rear wheels. This operating condition is mainly applicable to a situation where a load is medium and an electric quantity of a battery is small. This operating condition has the advantages that the second motor generator 42 drives the rear wheels, and compared to a front-wheel drive vehicle, the vehicle under the series operating condition has better acceleration performance, gradeability and steering capability. Moreover, the first motor generator 41 may keep the engine unit 1 running in an optimal economic region through torque and rotating speed adjustment, thus reducing fuel consumption during the electricity generation.

In this embodiment, the power transmission system may also have a braking/decelerating feedback operating condition. The dual clutch 31 is in a disengaged state, the synchronizer 6 is in an engaged state, the engine unit 1 does not operate, and the first motor generator 41 and the second motor generator 42 brake the vehicle and generate electricity simultaneously. This operating condition has the advantages that, since two motors brake the vehicle simultaneously during the decelerating or braking of the vehicle, the braking energy may be absorbed to the largest extent and converted into electric energy. By the disengagement of the dual clutch 31, the braking of the vehicle by the friction torque of the engine unit may be eliminated, so that more power is left to be absorbed by the motor. Because of the braking feedback of the front-wheel drive and the rear-wheel drive, the braking force may be distributed to front and rear motors in the premise of ensuring the braking force of the vehicle, and more electric energy may be fed back compared to a front-wheel drive vehicle or a rear-wheel drive vehicle.

Similarly, the operating conditions of the power transmission system 100 in this embodiment may be switched, and typical switching between operating conditions is switching from the fourth operating condition to the third operating condition, or switching from the fourth operating condition to the fifth operating condition. The switching between the operating conditions of the power transmission system 100 in this embodiment is similar to that in the above embodiments, so the detailed description thereof will be omitted here.

Embodiment 12

As shown in FIG. 13, the power transmission system 100 in this embodiment differs from the power transmission system 100 shown in FIG. 9 in the arrangement of the second motor generators 42. In this embodiment, two second motor generators 42 are provided and are wheel-side motors, and each second motor generator 42 drives a corresponding rear wheel 220. Other parts in this embodiment are substantially the same as those in the power transmission system 100 in the embodiment shown in FIG. 9, so the detailed description thereof will be omitted here.

Embodiment 13

As shown in FIG. 14, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25 by fixing, the double-linked gear structure 26 (i.e. a driven gear) is freely fitted over the output shaft 24, the first gear part 261 of the double-linked gear structure 26 is configured to mesh with the driving gear 25 on the first input shaft 21, and the second gear part 262 of the double-linked gear structure 26 is configured to mesh with the driving gear 25 on the second input shaft 22.

A first intermediate shaft gear 451 and a second intermediate shaft gear 452 are fixed on the intermediate shaft 45. The first intermediate shaft gear 451 is configured to mesh with the driving gear 25 on the second input shaft 22. Indirect power transmitting between the output terminal of the first motor generator 41 and the second intermediate shaft gear 452 via an intermediate idler 44 is performed.

The synchronizer 6 is disposed on the output shaft 24 and configured to engage with the double-linked gear structure 26. The driving gear 51 of the final drive is fixed on the output shaft 24. The driving gear 51 of the final drive is configured to externally mesh with the driven gear 53 of the final drive, and the driven gear 53 of the final drive may be fixed on a shell of the differential 54, so as to transfer the power to the differential 54. The differential 54 distributes the power and adaptively transfers the distributed power to half axles at two sides of the vehicle, so as to drive the wheels 200.

Embodiment 14

As shown in FIG. 15, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear structure 26 (i.e. a driven gear) is freely fitted over the output shaft 24, the first gear part 261 of the double-linked gear structure 26 is configured to mesh with the driving gear 25 on the first input shaft 21, and the second gear part 262 of the double-linked gear structure 26 is configured to mesh with the driving gear 25 on the second input shaft 22.

A first intermediate shaft gear 451 and a second intermediate shaft gear 452 are fixed on the intermediate shaft 45. The first intermediate shaft gear 451 is configured to mesh with the driving gear 25 on the second input shaft 22. The output terminal of the first motor generator 41 is configured to directly mesh with the second intermediate shaft gear 452 for power transmitting.

The synchronizer 6 is disposed on the output shaft 24 and is configured to engage with the double-linked gear structure 26. The driving gear 51 of the final drive is fixed on the output shaft 24. The driving gear 51 of the final drive is configured to externally mesh with the driven gear 53 of the final drive, and the driven gear 53 of the final drive may be fixed on a shell of the differential 54, so as to transfer the power to the differential 54. The differential 54 distributes the power and adaptively transfers the distributed power to half axles at two sides of the vehicle, so as to drive the wheels 200.

Embodiment 15

As shown in FIG. 16, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear structure 26 (i.e. a driven gear) is freely fitted over the output shaft 24, the first gear part 261 of the double-linked gear 26 is configured to mesh with the driving gear 25 on the first input shaft 21, and the second gear part 262 of the double-linked gear 26 is configured to mesh with the driving gear 25 on the second input shaft 22. The output terminal of the first motor generator 41 is configured to directly mesh with the first gear part 261 for power transmitting.

The synchronizer 6 is disposed on the output shaft 24 and configured to engage with the double-linked gear 26. The driving gear 51 of the final drive is fixed on the output shaft 24. The driving gear 51 of the final drive is configured to externally mesh with the driven gear 53 of the final drive, and the driven gear 53 of the final drive may be fixed on a shell of the differential 54, so as to transfer the power to the differential 54. The differential 54 distributes the power and adaptively transfers the distributed power to half axles at two sides of the vehicle, so as to drive the wheels 200.

Embodiment 16

As shown in FIG. 17, the power transmission system 100 in this embodiment differs from the power transmission system 100 shown in FIG. 14 in that the clutch 9 is provided instead of the synchronizer 6 of the power transmission system 100 in FIG. 14, and the driving gear 51 of the final drive is fixed on the output shaft 24.

Embodiment 17

As shown in FIG. 18, the power transmission system 100 in this embodiment differs from the power transmission system 100 shown in FIG. 15 in that the clutch 9 is provided instead of the synchronizer 6 of the power transmission system 100 in FIG. 15, and the driving gear 51 of the final drive is fixed on the output shaft 24.

Embodiment 18

As shown in FIG. 19, the power transmission system 100 in this embodiment differs from the power transmission system 100 shown in FIG. 16 in that the clutch 9 is provided instead of the synchronizer 6 of the power transmission system 100 in FIG. 16, and the driving gear 51 of the final drive is fixed on the output shaft 24.

It should be noted that, as shown in FIGS. 14-19, in an alternative embodiment of the linked gear structure 26, the power transmission system 100 may further include the second motor generator 42 and the third motor generator 43 or only include the third motor generator 43 (not shown in FIGS. 14-19), and the arrangement of the second motor generator 42 and the third motor generator 43 may be the same as that in FIGS. 2-13, for example, being in a wheel-side form, or being disposed at two sides of the differential back to back. For example, as an optional embodiment, the driving gear 51 of the final drive of the power transmission system 100 shown in FIGS. 14-19 may be configured to drive the front wheels 210, and the rear-wheel drive may be the same as that shown in FIG. 12, i.e. the rear wheels 220 are driven by one second motor generator 42 and one reducing mechanism.

In addition, embodiments of the present invention further provide a vehicle including the abovementioned power transmission system 100. It would be appreciated that, other components (e.g., a driving system, a steering system, and a braking system) of the vehicle according to embodiments of the present invention are well known to those skilled in the art, so the detailed description thereof will be omitted here.

Based on the power transmission system and the vehicle having the power transmission system that are described in the above embodiments, the present invention provides a method for controlling an engine unit in a vehicle, where the method for controlling an engine unit in a vehicle in embodiments of the present invention is executed based on the power transmission system and the vehicle having the power transmission system that are described in the above embodiments.

The method for controlling an engine unit in a vehicle and the vehicle in embodiments of the present invention are described below with reference to the accompanying drawings.

Figure 20:
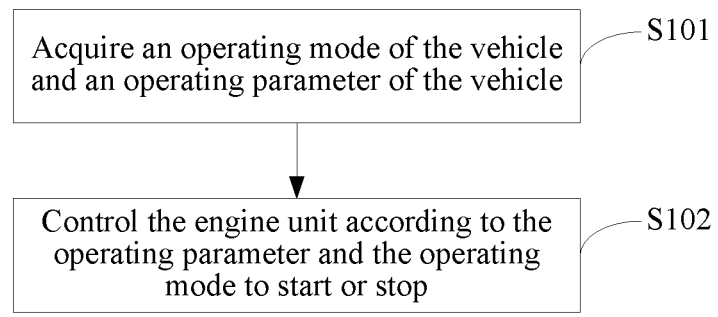
FIG. 20 is a flowchart of a method for controlling an engine unit in a vehicle according to an embodiment of the present invention.

FIG. 20 is a flowchart of a method for controlling an engine unit in a vehicle according to an embodiment of the present invention. The vehicle includes an engine unit, a transmission unit adapted to selectively couple with the engine unit and also configured to transmit the power generated by the engine unit, a first motor generator coupled with the transmission unit, an output unit, a power switching device, a second motor generator configured to drive at least one of front and rear wheels, and a power battery that is respectively connected to the first motor generator and the second motor generator, where the output unit is configured to transmit the power transmitted by the transmission unit to at least one of the front and rear wheels of the vehicle, and the power switching device is adapted to enable or interrupt power transmission between the transmission unit and the output unit.

As shown in FIG. 20, the method for controlling an engine unit in a vehicle in embodiments of the present invention includes:

S101: Acquire an operating mode of the vehicle and an operating parameter of the vehicle.

For example, the operating mode of the vehicle includes an electric vehicle economy mode, an electric vehicle sport mode, a hybrid electric vehicle economy mode, and a hybrid electric vehicle sport mode.

The electric vehicle economy (EV_ECO) mode represents that when the vehicle is running, only a motor generator runs and is engaged in driving, and it is ensured that the motor generator works in an economical region. The electric vehicle sport (EV_S) mode represents that when the vehicle is running, only a motor generator runs and is engaged in driving, and the motor generator is enabled to meet dynamic performance as much as possible. The hybrid electric vehicle economy (HEV_ECO) mode represents that when the vehicle is running, at least one of the engine unit and the motor generator is running and is engaged in driving, and it is ensured that the engine unit and/or the motor generator works in an economical region. The hybrid electric vehicle sport (HEV_S) mode represents that when the vehicle is running, at least one of the engine unit and the motor generator is running and is engaged in driving, and the engine unit and/or the motor generator is enabled to meet dynamic performance as much as possible.

For example, the operating parameter of the vehicle includes one or more of an electric quantity of the power battery, a discharge power of the power battery, the speed of the vehicle, the slope of a road where the vehicle is located, an accelerator depth of the vehicle, and gear information of the vehicle.

S102: Control the engine unit according to the operating parameter and the operating mode to start or stop.

When the vehicle is running, the engine unit is controlled at any time according to the operating parameter and the operating mode of the vehicle to start or stop, so as to reduce the energy consumption, and a specific control manner is described in detail in the following embodiments.

For the method for controlling an engine unit in a vehicle in embodiments of the present invention, an engine unit is controlled according to an operating parameter and an operating mode to start or stop, thus reducing the energy consumption, extending the service life of the starter motor, reducing the frequency of using a starter motor, such that user experience is improved. Meanwhile, in embodiments of the present invention, power output by the engine unit and/or a first motor generator may be output to an output unit via a power switching device, and the output unit then outputs the power to at least one of front and rear wheels of the vehicle. Further, because of the provision of a second motor generator, the second motor generator may compensate for a torque for the front wheels or rear wheels, and may also cooperate with the engine unit and the first motor generator to drive the vehicle, thus increasing the number of operation modes of the vehicle, so that the vehicle may be better adapted to different operating conditions, thus achieving better fuel economic efficiency while reducing the emission of harmful gases.

In embodiments of the present invention, the power switching device is configured as a synchronizer, and the synchronizer is adapted to selectively synchronize between the output unit and the transmission unit.

In embodiments of the present invention, the operating mode of the vehicle includes an electric vehicle economy mode, an electric vehicle sport mode, a hybrid electric vehicle economy mode and a hybrid electric vehicle sport mode.

For the electric vehicle economy mode and the electric vehicle sport mode, switching between rear-wheel drive and four-wheel drive is performed according to a current requirement. A difference between the electric vehicle economy mode and the electric vehicle sport mode lies in a different response strategy of a throttle torque, where the sport mode has a fast torque response while the economical mode has a slow throttle response, thus reducing a load in common throttle ranges. In the hybrid electric vehicle economy mode and the hybrid electric vehicle sport mode, when an electric quantity is low, series rear-wheel drive is used, and when an electric quantity is high, switching between rear-wheel drive and four-wheel drive is performed according to a requirement, and a parallel manner is used in front-wheel drive.

In embodiments of the present invention, the operating parameter of the vehicle includes one or more of an electric quantity of the power battery, a discharge power of the power battery, the speed of the vehicle, the slope of a road where the vehicle is located, an accelerator depth of the vehicle, and gear information of the vehicle.

In embodiments of the present invention, when the vehicle is in the hybrid electric vehicle economy mode, if a discharge power of a battery management system (BMS) of the vehicle is greater than a discharge power threshold value, the speed of the vehicle is greater than or equal to a first speed threshold value and is less than a second speed threshold value, the slope of the road where the vehicle is located is less than a first slope threshold value, and an accelerator depth of the vehicle is less than a depth threshold value, the engine unit is controlled to stop.

In addition, in embodiments of the present invention, before the engine unit is controlled to stop, the method further includes: determining whether the number of times that the engine unit stops within a first time period is greater than a number of times threshold value; and if it is determined that the number of times that the engine unit stops within the first time period is not greater than the number of times threshold value, further controlling the engine unit to stop; or if it is determined that the number of times that the engine unit stops within a first time period is greater than the number of times threshold value, exiting and pausing for a second time period.

Figure 21:
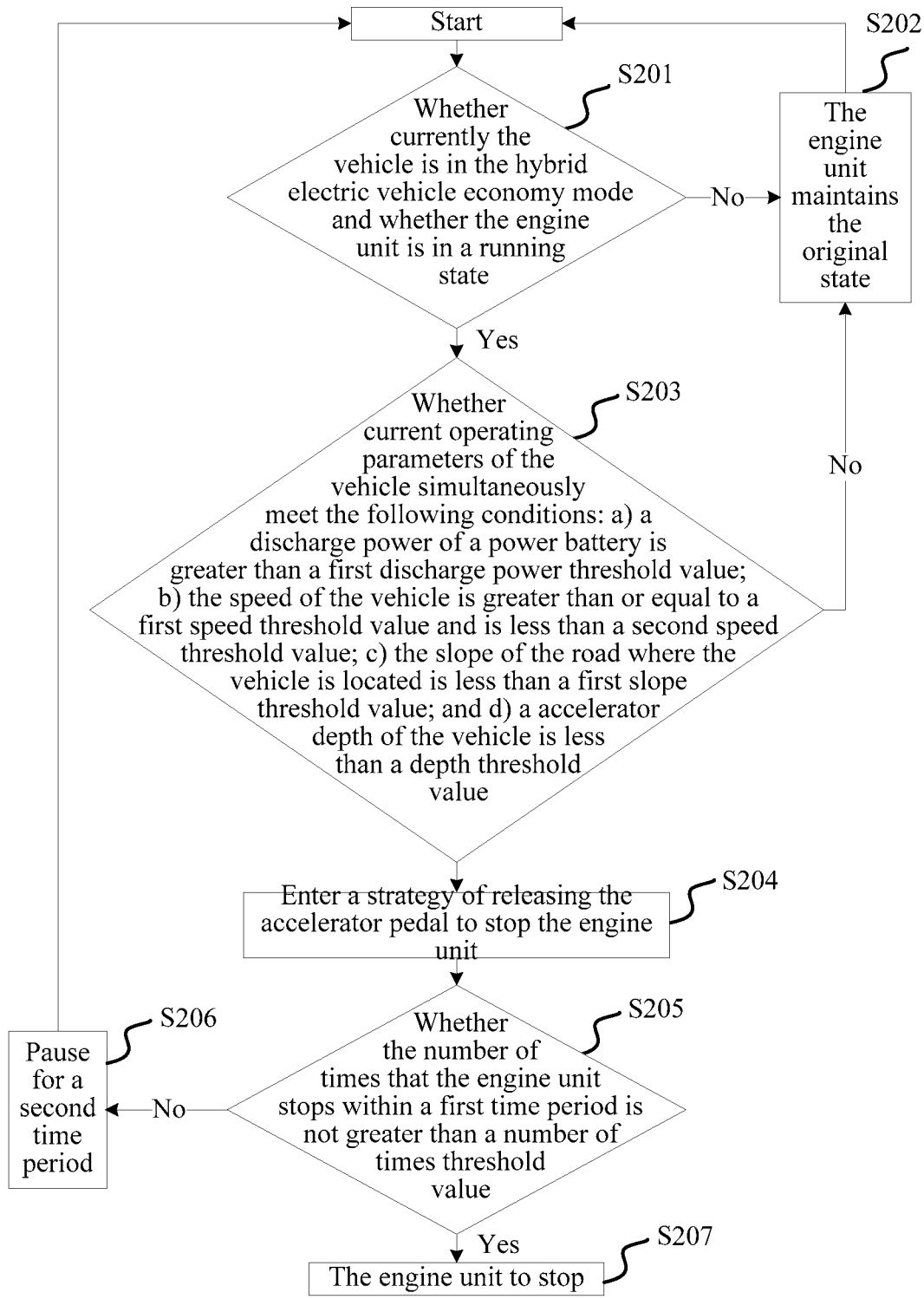
FIG. 21 is a flowchart of controlling an engine unit to stop when an accelerator pedal is released according to another embodiment of the present invention.

FIG. 21 is a flowchart of controlling an engine unit to stop when an accelerator pedal is released according to an embodiment of the present invention.

As shown in FIG. 21, the controlling an engine unit to stop when an accelerator pedal is released includes:

S201: Determine whether currently the vehicle is in the hybrid electric vehicle economy mode and whether the engine unit is in a running state.

Because the hybrid electric vehicle sport mode requires high dynamic performance and a fast response speed, the engine unit needs to stay running. When the vehicle is in the hybrid electric vehicle economy mode, vehicle speed start-stop exists, and it needs to be determined simultaneously whether the engine unit is in a started (working) state at a previous moment.

S202: If not, the engine unit maintains the original state.

If the vehicle is in the hybrid electric vehicle economy mode and the engine unit is in a stopped state, or when the vehicle is in the hybrid electric vehicle sport mode, the engine unit maintains the previous state (that is, stays stopped or stays running).

S203: If yes, determine whether current operating parameters of the vehicle simultaneously meet the following conditions: a) a discharge power of a power battery is greater than a first discharge power threshold value; b) the speed of the vehicle is greater than or equal to a first speed threshold value and is less than a second speed threshold value; c) the slope of the road where the vehicle is located is less than a first slope threshold value; and d) an accelerator depth of the vehicle is less than a depth threshold value.

For example, the foregoing conditions may be: a) the discharge power of the power battery >p1, where p1 is the first discharge power threshold value, and the condition is to ensure that after the engine unit stops, dual-clutch transmission (DCT) reverse drive is preferentially used to start the engine unit, and at the same time to drive the motor generator, so the motor generator can provide a sufficient reverse drive torque; b) $V_a \le$ the speed of the vehicle $\le V_b$, c) the slope $\le$i, where i is the first slope threshold value; and d) the accelerator depth of the vehicle is 0.

S204: Enter a strategy of releasing the accelerator pedal to stop the engine unit.

S205: Determine whether the number of times that the engine unit stops within a first time period is not greater than a number of times threshold value.

S206: If it is determined that the number of times that the engine unit stops within a first time period is greater than the number of times threshold value, pause for a second time period, and then perform S201.

S207: If it is determined that the number of times that the engine unit stops within a first time period is not greater than the number of times threshold value, control the engine unit to stop.

When the vehicle is coasting with the accelerator pedal released, by applying the foregoing method, the engine unit may be controlled to stop when the operating parameter of the vehicle meets a particular condition, thus reducing fuel consumption.

In embodiments of the present invention, after the engine unit is controlled according to the operating parameter and the operating mode to stop, the method further includes: determining whether a preset reverse drive condition is met; and if it is determined that the preset reverse drive condition is met, reversely driving the engine unit by preferentially using the first motor generator to start the engine unit; or if it is determined that the preset reverse drive condition is not met, starting the engine unit by using the starter motor.

In embodiments of the present invention, the meeting the preset reverse drive condition includes meeting the following conditions: the speed of the vehicle is greater than a third speed threshold value; and, an engine control module (ECM) of the vehicle receives a command of allowing reverse drive start; the first motor generator has no failure; and the discharge power of the power battery is greater than a second discharge power threshold value.

Figure 22:
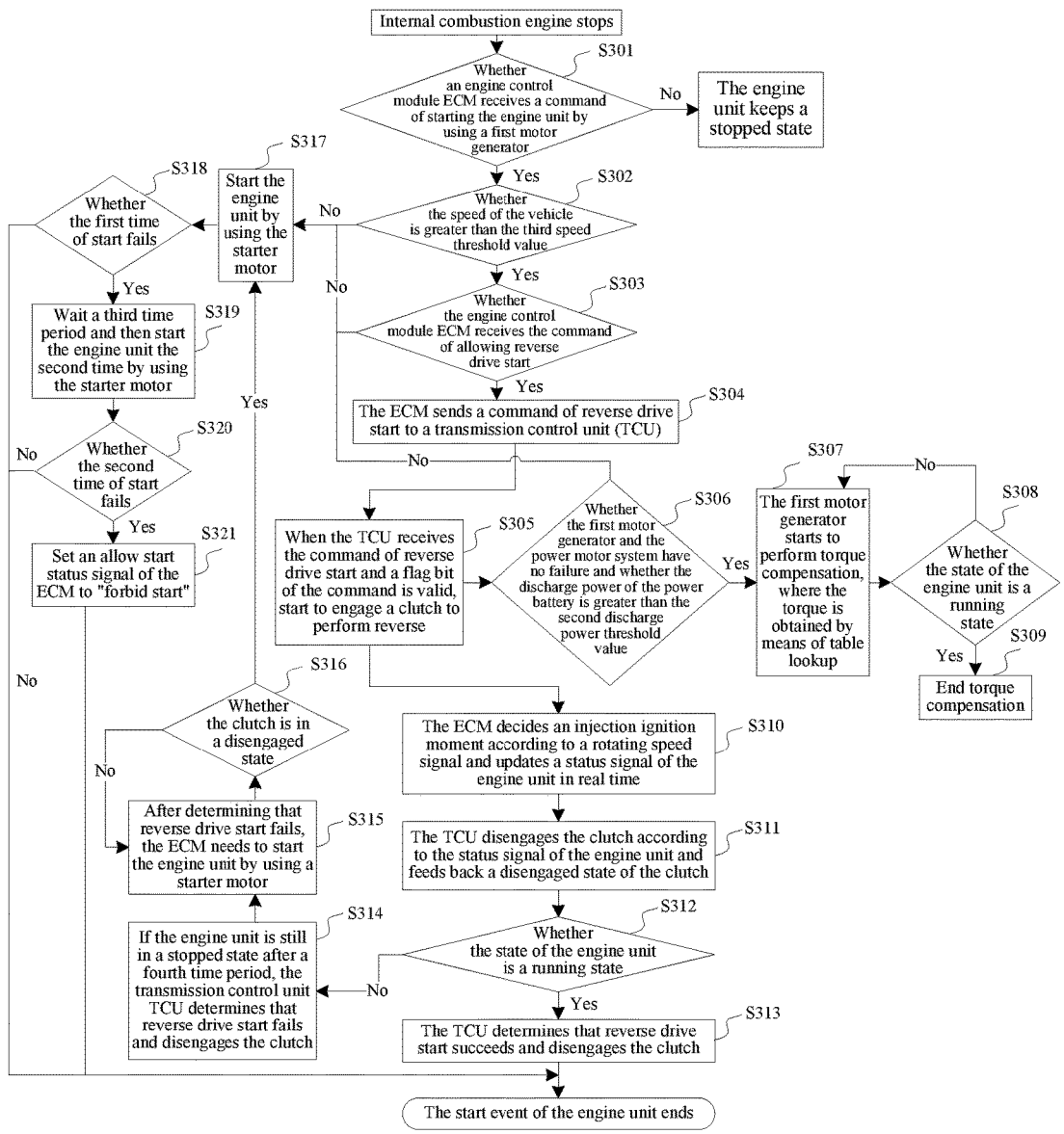
FIG. 22 is a flowchart of stopping an engine unit and then starting the engine unit again according to an embodiment of the present invention.

FIG. 22 is a flowchart of stopping an engine unit and then starting the engine unit again according to an embodiment of the present invention.

As shown in FIG. 22, the stopping an engine unit and then starting the engine unit again includes:

S301: Determine whether an ECM receives a command of starting the engine unit by using a first motor generator.

If yes, perform S302; or if not, control the engine unit to keep a stopped state.

S302: Determine whether the speed of the vehicle is greater than the third speed threshold value.

If yes, perform S303; or if not, the process turns to S317.

S303: Determine whether the ECM receives the command of allowing reverse drive start.

If yes, perform S304; or if not, the process turns to S317.

S304: The ECM sends a command of reverse drive start to a transmission control unit (TCU).

S305: When the TCU receives the command of reverse drive start and a flag bit of the command is valid, start to engage a clutch to perform reverse drive (S305 and S310 are performed at the same time).

S306: Determine whether the first motor generator and the power motor system have no failure and whether the discharge power of the power battery is greater than the second discharge power threshold value.

If the first motor generator and the power motor system have no failure and the discharge power of the power battery >p2 (the second discharge power threshold value), perform S307; or if not, the process turns to S317.

S307: The first motor generator starts to perform torque compensation, where the torque is obtained by means of table lookup.

S308: Determine whether the state of the engine unit is a running state.

If yes, perform S309; or if not, perform S307.

S309: End torque compensation.

S310: The TCU receives the command of reverse drive start and a flag bit of the command is valid, and starts to engage the clutch to perform reverse drive, and the ECM decides an injection ignition moment according to a rotating speed signal and updates a status signal of the engine unit in real time (S305 and S310 are performed at the same time).

S311: The TCU disengages the clutch according to the status signal of the engine unit and feeds back a disengaged state of the clutch.

S312: Determine whether the state of the engine unit is a running state.

If yes, perform S313; or if not, perform S314.

S313: The TCU determines that reverse drive start succeeds and disengages the clutch.

The TCU determines that reverse drive start succeeds and disengages the clutch, so that a start event of the engine unit ends.

S314: If the engine unit is still in a stopped state after a fourth time period, the TCU determines that reverse drive start fails and disengages the clutch.

S315: After determining that reverse drive start fails, the ECM needs to start the engine unit by using a starter motor.

S316: Determine whether the clutch is in a disengaged state.

If yes, perform S317; or if not, perform S315.

S317: When the clutch is in a disengaged state, start the engine unit by using the starter motor.

S318: Determine whether the first time of start fails.

If yes, perform S319; or if not, the start event of the engine unit ends.

S319: Wait a third time period and then start the engine unit the second time by using the starter motor.

S320: Determine whether the second time of start fails.

If yes, perform S321; or if not, the start event of the engine unit ends.

S321: Set an allow start status signal of the ECM to "forbid start", and the start event of the engine unit ends.

When the engine unit is stopped and is then started again, when a particular condition is met, the engine unit is reversely driven by using the first motor generator to start the engine unit, thus reducing the frequency of using the starter motor, and extending the service life of the starter motor, such that the cost of the vehicle is reduced to a certain extent.

In embodiments of the present invention, when the vehicle is in the hybrid electric vehicle sport mode, if the slope of the road where the vehicle is located is less than or equal to the second slope threshold value, the electric quantity of the power battery is greater than the first electric quantity threshold value, and the vehicle is in gear R, the engine unit is controlled to stop, and the vehicle is controlled to enter the electric vehicle economy mode or the electric vehicle sport mode.

Figure 23:
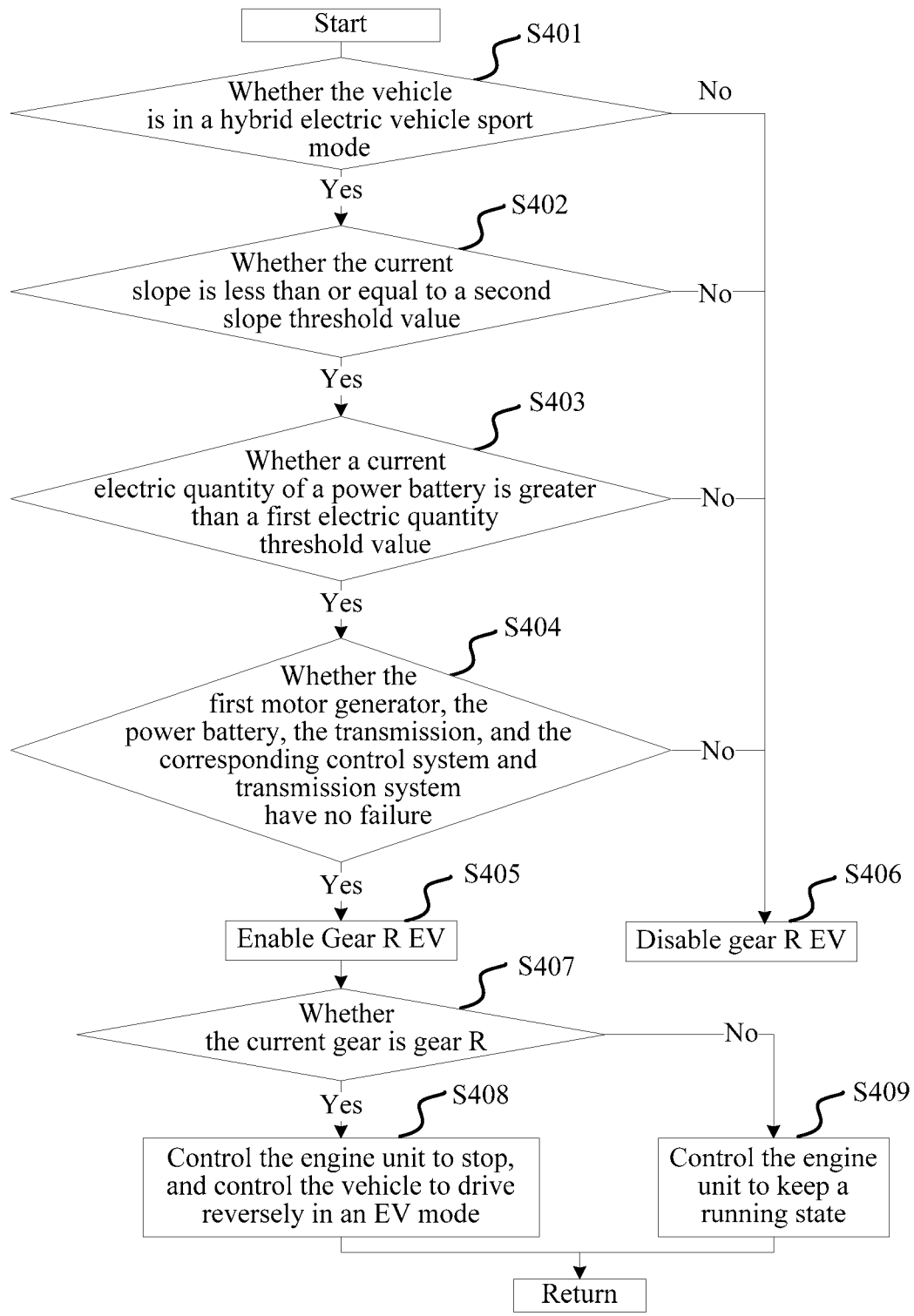
FIG. 23 is a flowchart of controlling an engine unit to stop when a vehicle is in gear R in an EV mode according to an embodiment of the present invention.

FIG. 23 is a flowchart of controlling an engine unit to stop when the vehicle is in gear R in an EV mode according to an embodiment of the present invention.

As shown in FIG. 23, the controlling an engine unit to stop when the vehicle is in gear R in an EV mode includes:

S401: Determine whether the vehicle is in the hybrid electric vehicle sport mode.

If yes, perform S402; or if not, perform S406.

S402: Determine whether the current slope is less than or equal to the second slope threshold value.

Determine whether the slope of a road where the vehicle is located ≤i1 (the second slope threshold value). If yes, perform S403; or if not, perform S406.

S403: Determine whether a current electric quantity of a power battery is greater than the first electric quantity threshold value.

Determine whether the current electric quantity of the power battery ≥b %. If yes, perform S404; or if not, perform S406.

S404: Determine whether the first motor generator, the power battery, the transmission, and the corresponding control system and transmission system have no failure.

If yes, perform S405; or if not, perform S406.

S405: Enable Gear REV.

The enabling gear R EV refers to that when the vehicle is in gear R, the vehicle may work in an EV mode. When gear R EV is not enabled, the vehicle cannot be controlled to work in an EV mode in gear R. The gear R EV refers to that the vehicle works in an EV mode at this time.

S406: Disable gear REV.

S407: Determine whether the current gear is gear R.

If yes, perform S408; or if not, perform S409.

S408: Control the engine unit to stop, and control the vehicle to drive reversely in an EV mode.

That is, after the engine unit is controlled to stop, the vehicle is controlled to drive reversely in an electric vehicle economy mode or an electric vehicle sport mode.

S409: Control the engine unit to keep a running state.

The method of controlling the engine unit to be started again after the engine unit is stopped in the foregoing embodiment is described below.

In embodiments of the present invention, when the vehicle is in an electric vehicle economy mode or an electric vehicle sport mode, if the vehicle is switched from gear R to gear D or gear N, or when the number of times that the engine unit is started within the third time period is greater than a number of times threshold value, start the engine unit by using the starter motor.

Figure 24:
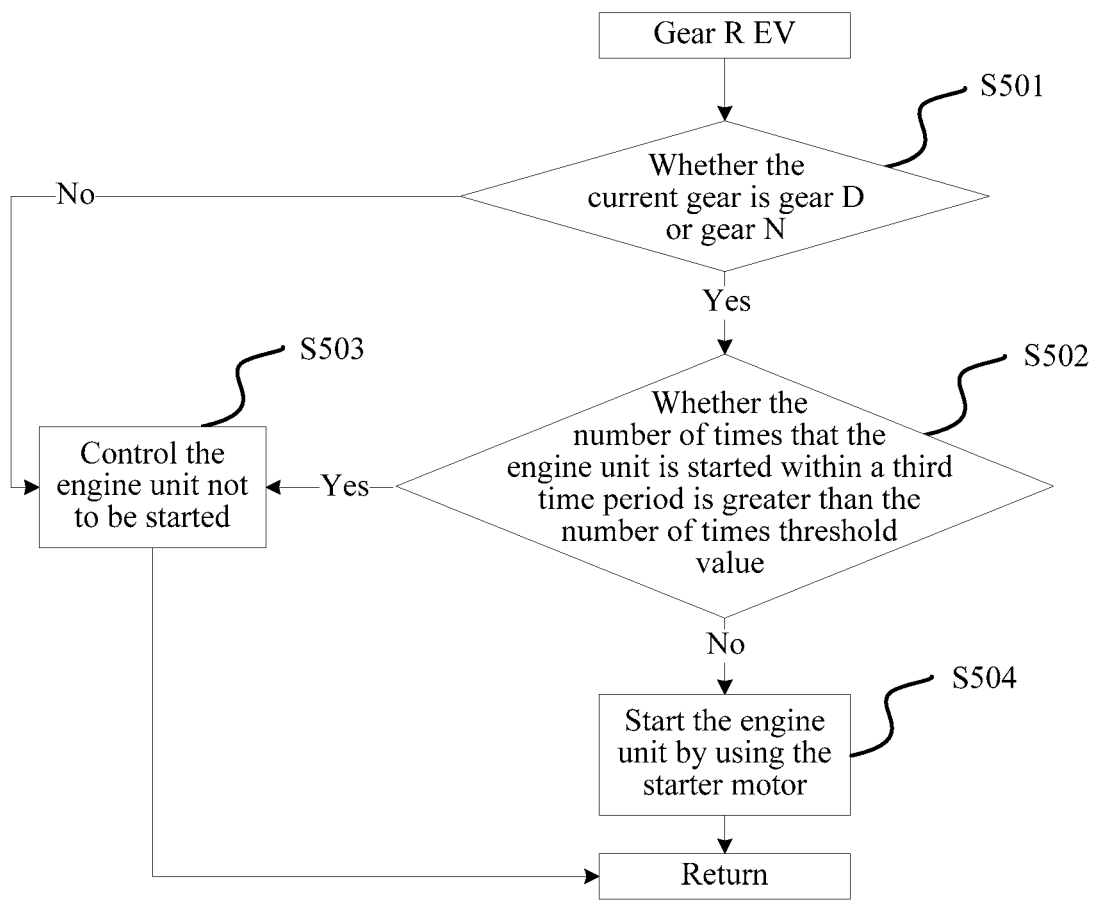
FIG. 24 is a flowchart of stopping an engine unit and then starting the engine unit again in gear R in an EV mode according to an embodiment of the present invention.

FIG. 24 is a flowchart of stopping an engine unit and then starting the engine unit again in gear R in an EV mode according to an embodiment of the present invention.

As shown in FIG. 24, the stopping the engine unit and then starting the engine unit again includes:

S501: Determine whether the current gear is gear D or gear N.

If yes, perform S502; or if not, perform S503.

S502: Determine whether the number of times that the engine unit is started within a third time period is greater than the number of times threshold value.

If yes, perform S503; or if not, perform S504.

S503: Control the engine unit not to be started.

S504: Start the engine unit by using the starter motor.

When the vehicle is switched from gear R to gear D or gear N or the number of times that the engine unit is started within the third time period is not greater than the number of times threshold value, the engine unit is started by using the starter motor. That is, when a user does not have a requirement to stop the vehicle, a requirement of the user to drive immediately in gear D is met.

In embodiments of the present invention, when the vehicle is in the hybrid electric vehicle economy mode or the hybrid electric vehicle sport mode, if the slope of the road where the vehicle is located is less than or equal to the third slope threshold value, the speed of the vehicle is less than the fourth speed threshold value, and the vehicle is in gear P, the engine unit is controlled to perform idle stop. The idle stop refers to stopping of the engine unit when the gear of the vehicle is gear P.

Figure 25:
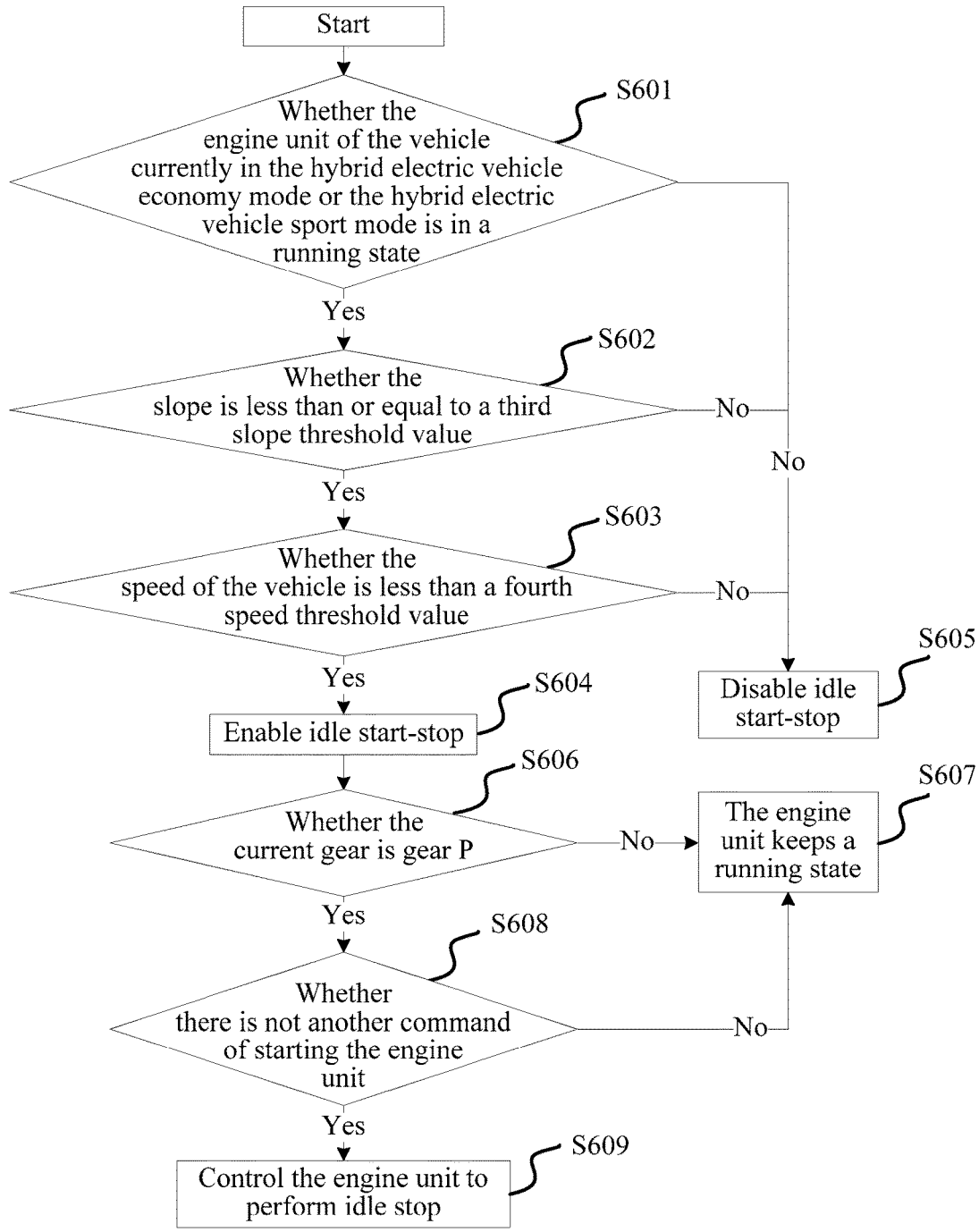
FIG. 25 is a flowchart of controlling an engine unit to stop in gear P according to an embodiment of the present invention.

FIG. 25 is a flowchart of controlling an engine unit to stop in gear P according to an embodiment of the present invention.

As shown in FIG. 25, the controlling an engine unit to stop in gear P includes:

S601: Determine whether the engine unit of the vehicle currently in the hybrid electric vehicle economy mode or the hybrid electric vehicle sport mode is in a running state.

If yes, perform S602; or if not, perform S605.

S602: Determine whether the slope of the road where the vehicle is located is less than or equal to a third slope threshold value.

If yes, perform S603; or if not, perform S605.

S603: Determine whether the speed of the vehicle is less than a fourth speed threshold value.

If yes, perform S604; or if not, perform S605.

S604: Enable idle start-stop.

The enabling idle start-stop may implement start and stop of the engine unit when the vehicle is idle. When idle start-stop is not enabled, the engine unit cannot be controlled to perform idle start-stop.

S605: Disable idle start-stop.

S606: Determine whether the current gear is gear P.

If yes, perform S608; or if not, perform S607.

S607: The engine unit keeps a running state.

S608: Determine whether there is not another command of starting the engine unit.

If yes, perform S609; or if not, perform S607.

S609: Control the engine unit to perform idle stop.

Figure 26:
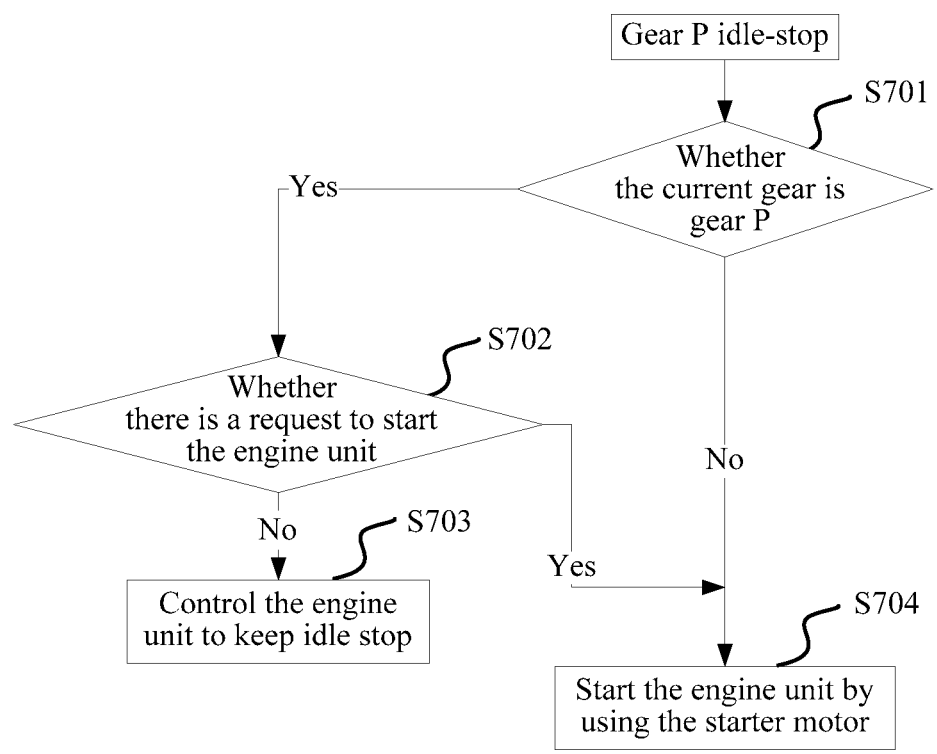
FIG. 26 is a flowchart of an engine unit coming to an idle stop and is started again in gear P according to an embodiment of the present invention.

FIG. 26 is a flowchart of performing idle stop on the engine unit and then starting the engine unit again in gear P according to an embodiment of the present invention.

As shown in FIG. 26, the performing idle stop on the engine unit and then starting the engine unit again in gear P includes:

S701: Determine whether the current gear is gear P.

If yes, perform S702; or if not, perform S704.

S702: Determine whether there is a request to start the engine unit.

If yes, perform S704; or if not, perform S703.

S703: Control the engine unit to keep idle stop.

S704: Start the engine unit by using the starter motor.

In embodiments of the present invention, when the vehicle is in the hybrid electric vehicle economy mode or the hybrid electric vehicle sport mode, if the slope of the road where the vehicle is located is less than or equal to the fourth slope threshold value, and the electric quantity of the power battery is greater than the second electric quantity threshold value, and the vehicle is switched from the hybrid electric vehicle economy mode or the hybrid electric vehicle sport mode to the electric vehicle economy mode or the electric vehicle sport mode, the engine unit is controlled to stop.

Figure 27:
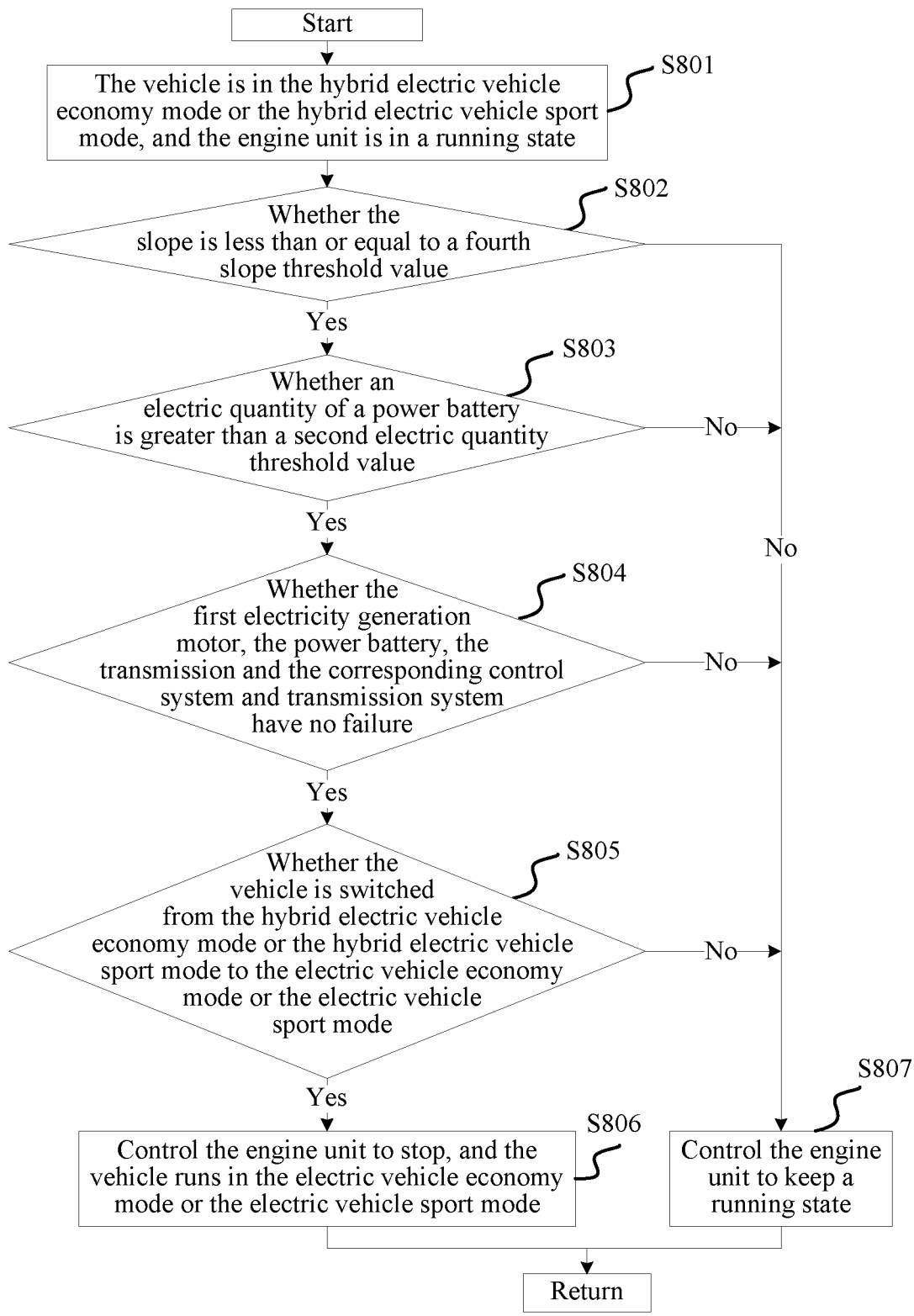
FIG. 27 is a flowchart of stopping an engine unit during switching of operating modes according to an embodiment of the present invention.

FIG. 27 is a flowchart of stopping an engine unit during switching of operating modes according to an embodiment of the present invention.

As shown in FIG. 27, the stopping the engine unit and then starting the engine unit again in gear P includes:

S801: The vehicle is in the hybrid electric vehicle economy mode or the hybrid electric vehicle sport mode, and the engine unit is in a running state.

S802: Determine whether the slope of the road where the vehicle is located is less than or equal to a fourth slope threshold value.

If yes, perform S803; or if not, perform S807.

S803: Determine whether an electric quantity of a power battery is greater than a second electric quantity threshold value.

If yes, perform S804; or if not, perform S807.

S804: Determine whether the first electricity generation motor, the power battery, the transmission, and the corresponding control system and transmission system have no failure.

If yes, perform S805; or if not, perform S807.

S805: Determine whether the vehicle is switched from the hybrid electric vehicle economy mode or the hybrid electric vehicle sport mode to the electric vehicle economy mode or the electric vehicle sport mode.

If yes, perform S806; or if not, perform S807.

S806: Control the engine unit to stop, and the vehicle runs in the electric vehicle economy mode or the electric vehicle sport mode.

S807: Control the engine unit to keep a running state.

In embodiments of the present invention, when the vehicle is switched from the hybrid electric vehicle economy mode or the hybrid electric vehicle sport mode to the electric vehicle economy mode or the electric vehicle sport mode, and is switched from the electric vehicle economy mode or the electric vehicle sport mode to the hybrid electric vehicle economy mode or hybrid electric vehicle sport mode again, the preset reverse drive condition further includes that the vehicle is in the hybrid electric vehicle economy mode.

Figure 28:
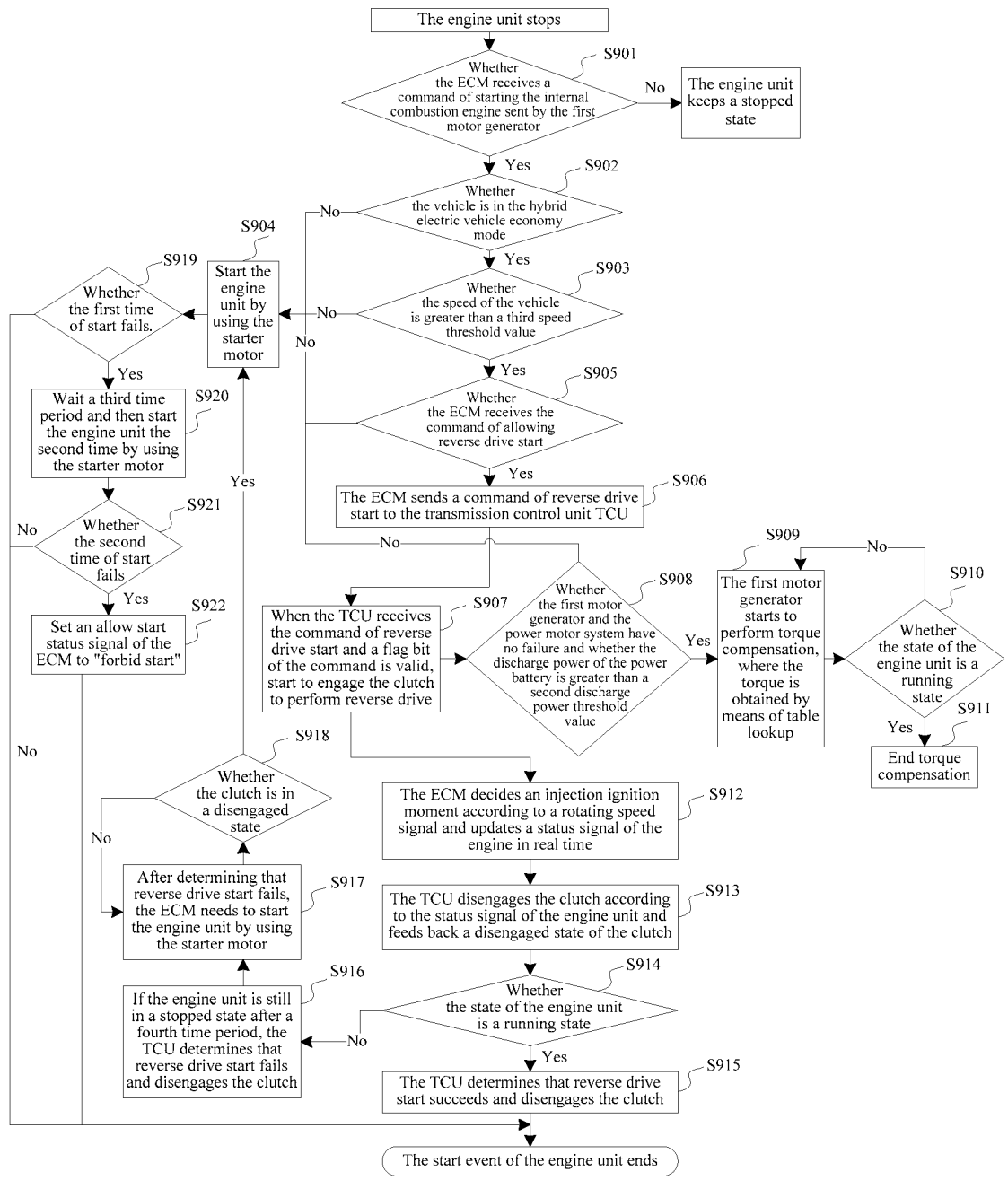
FIG. 28 is a flowchart of starting an engine unit during switching of operating modes according to an embodiment of the present invention.

FIG. 28 is a flowchart of starting an engine unit during switching of operating modes according to an embodiment of the present invention.

As shown in FIG. 28, when the vehicle is switched from the hybrid electric vehicle economy mode or the hybrid electric vehicle sport mode to the electric vehicle economy mode or the electric vehicle sport mode, and is switched from the electric vehicle economy mode or the electric vehicle sport mode to the hybrid electric vehicle economy mode or hybrid electric vehicle sport mode again, the starting an engine unit during switching of operating modes includes:

S901: Determine whether the first motor generator sends a command of starting the engine unit.

If yes, perform S902; or if not, control the engine unit keep a stopped state.

S902: Determine whether the vehicle is in the hybrid electric vehicle economy mode.

If yes, perform S903; or if not, perform S904.

S903: Determine whether the speed of the vehicle is greater than a third speed threshold value.

If yes, perform S905; or if not, perform S904.

S904: Start the engine unit by using the starter motor.

Perform S919 after S904.

S905: Determine whether the ECM receives the command of allowing reverse drive start.

If yes, perform S906; or if not, perform S904.

S906: The ECM sends a command of reverse drive start to the TCU.

S907: When the TCU receives the command of reverse drive start and a flag bit of the command is valid, start to engage the clutch to perform reverse drive.

S908: Determine whether the first motor generator and the power motor system have no failure and whether the discharge power of the power battery is greater than a second discharge power threshold value.

If the first motor generator and the power motor system have no failure and the discharge power of the power battery >p2 (the second discharge power threshold value), perform S909; or otherwise, perform S904.

S909: The first motor generator starts to perform torque compensation, where the torque is obtained by means of table lookup.

S910: Determine whether the state of the engine unit is a running state.

If yes, perform S911; or if not, perform S909.

S911: End torque compensation.

S912: The TCU receives the command of reverse drive start and a flag bit of the command is valid, start to engage the clutch to perform reverse drive, and the ECM decides an injection ignition moment according to a rotating speed signal and updates a status signal of the engine in real time.

S913: The TCU disengages the clutch according to the status signal of the engine unit and feeds back a disengaged state of the clutch.

S914: Determine whether the state of the engine unit is a running state.

If yes, perform S915; or if not, perform S916.

S915: The TCU determines that reverse drive start succeeds and disengages the clutch.

The TCU determines that reverse drive start succeeds and disengages the clutch, so that a start event of the engine unit ends.

S916: If the engine unit is still in a stopped state after a fourth time period, the TCU determines that reverse drive start fails and disengages the clutch.

S917: After determining that reverse drive start fails, the ECM needs to start the engine unit by using the starter motor.

S918: Determine whether the clutch is in a disengaged state.

If yes, perform S904; or if not, perform S917.

S919: Determine whether the first time of start fails.

If yes, perform S920; or if not, the start event of the engine unit ends.

S920: Wait a third time period and then start the engine unit the second time by using the starter motor.

S921: Determine whether the second time of start fails.

If yes, perform S922; or if not, the start event of the engine unit ends.

S922: Set an allow start status signal of the ECM to "forbid start", and the start event of the engine unit ends.

In embodiments of the present invention, when the vehicle is in the hybrid electric vehicle economy mode, and when the speed of the vehicle is greater than or equal to the fifth speed threshold value, the engine unit is controlled to start. When the speed of the vehicle is less than or equal to the sixth speed threshold value, the engine unit is controlled to stop.

Figure 29:
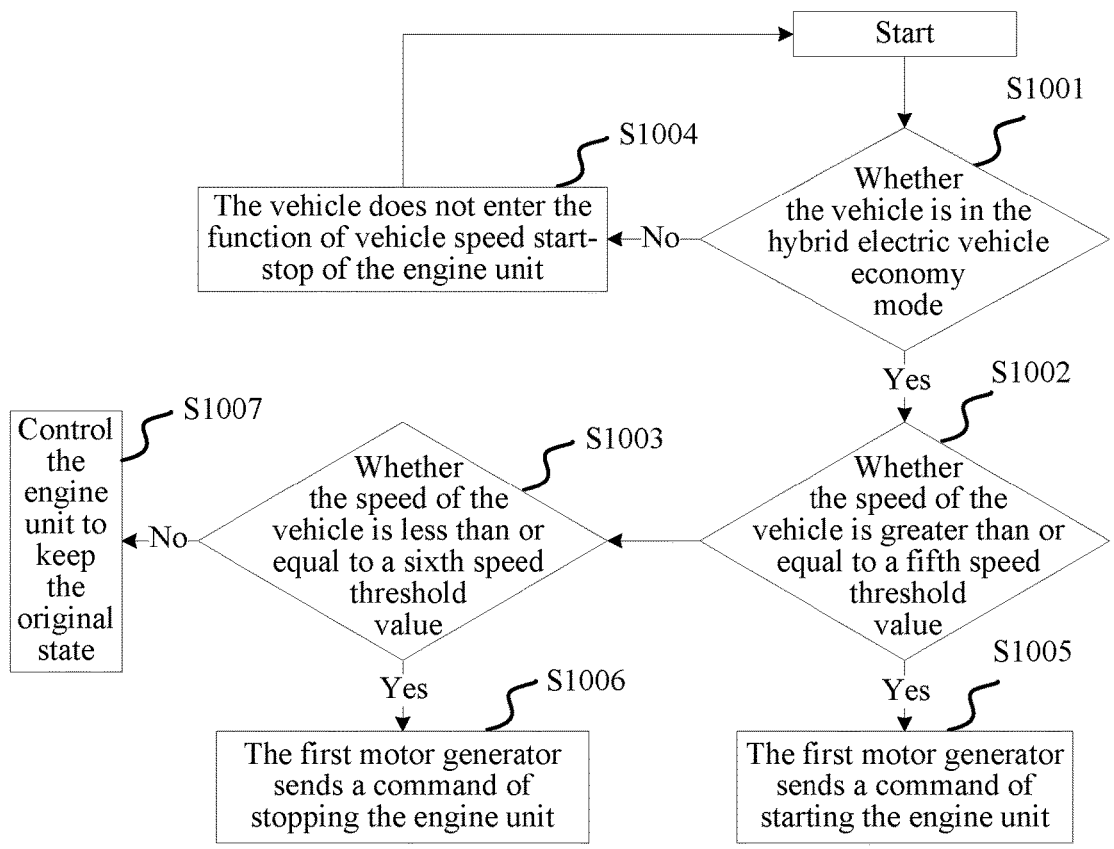
FIG. 29 is a flowchart of vehicle speed start-stop enable in a hybrid electric vehicle economy mode according to an embodiment of the present invention.

FIG. 29 is a flowchart of vehicle speed start-stop enable in a hybrid electric vehicle economy mode according to an embodiment of the present invention.

As shown in FIG. 29, the vehicle speed start-stop enable in the hybrid electric vehicle economy mode includes:

S1001: Determine whether the vehicle is in the hybrid electric vehicle economy mode.

If yes, perform S1002; or if not, perform S1004.

S1002: Determine whether the speed of the vehicle is greater than or equal to a fifth speed threshold value.

If yes, perform S1005; or if not, perform S1003.

S1003: Determine whether the speed of the vehicle is less than or equal to a sixth speed threshold value.

If yes, perform S1006; or if not, perform S1007.

S1004: The vehicle does not enter the function of vehicle speed start-stop of the engine unit.

S1005: The first motor generator sends a command of starting the engine unit.

S1006: The first motor generator sends a command of stopping the engine unit.

S1007: Control the engine unit to keep the original state.

Figure 30:
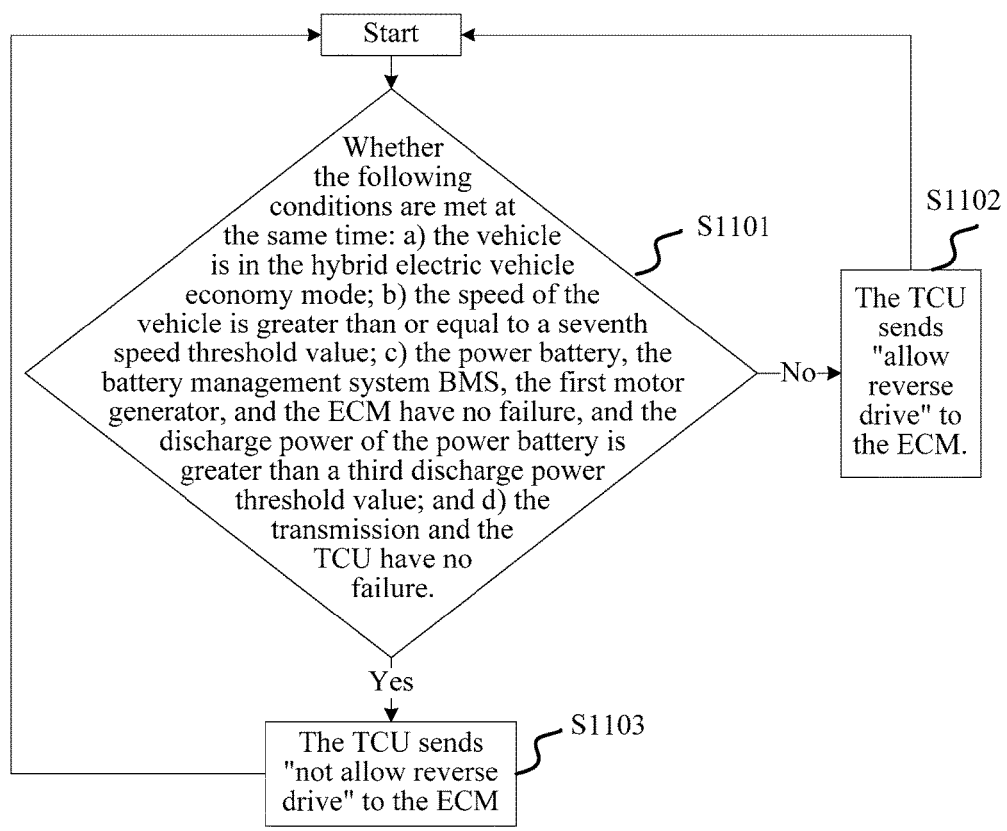
FIG. 30 is a flowchart of enabling reverse drive in a hybrid electric vehicle economy mode according to an embodiment of the present invention.

FIG. 30 is a flowchart of enabling reverse drive in a hybrid electric vehicle economy mode according to an embodiment of the present invention.

As shown in FIG. 30, the enabling reverse drive in a hybrid electric vehicle economy mode includes:

S1101: Determine whether the following conditions are met at the same time: a) the vehicle is in the hybrid electric vehicle economy mode; b) the speed of the vehicle is greater than or equal to a seventh speed threshold value; c) the power battery, the BMS, the first motor generator, and the ECM have no failure, and the discharge power of the power battery is greater than a third discharge power threshold value; and d) the transmission and the TCU have no failure.

If yes, perform S1102; or if not, perform S1103.

S1102: The TCU sends "allow reverse drive" to the ECM.

S1103: The TCU sends "not allow reverse drive" to the ECM.

Figure 31:
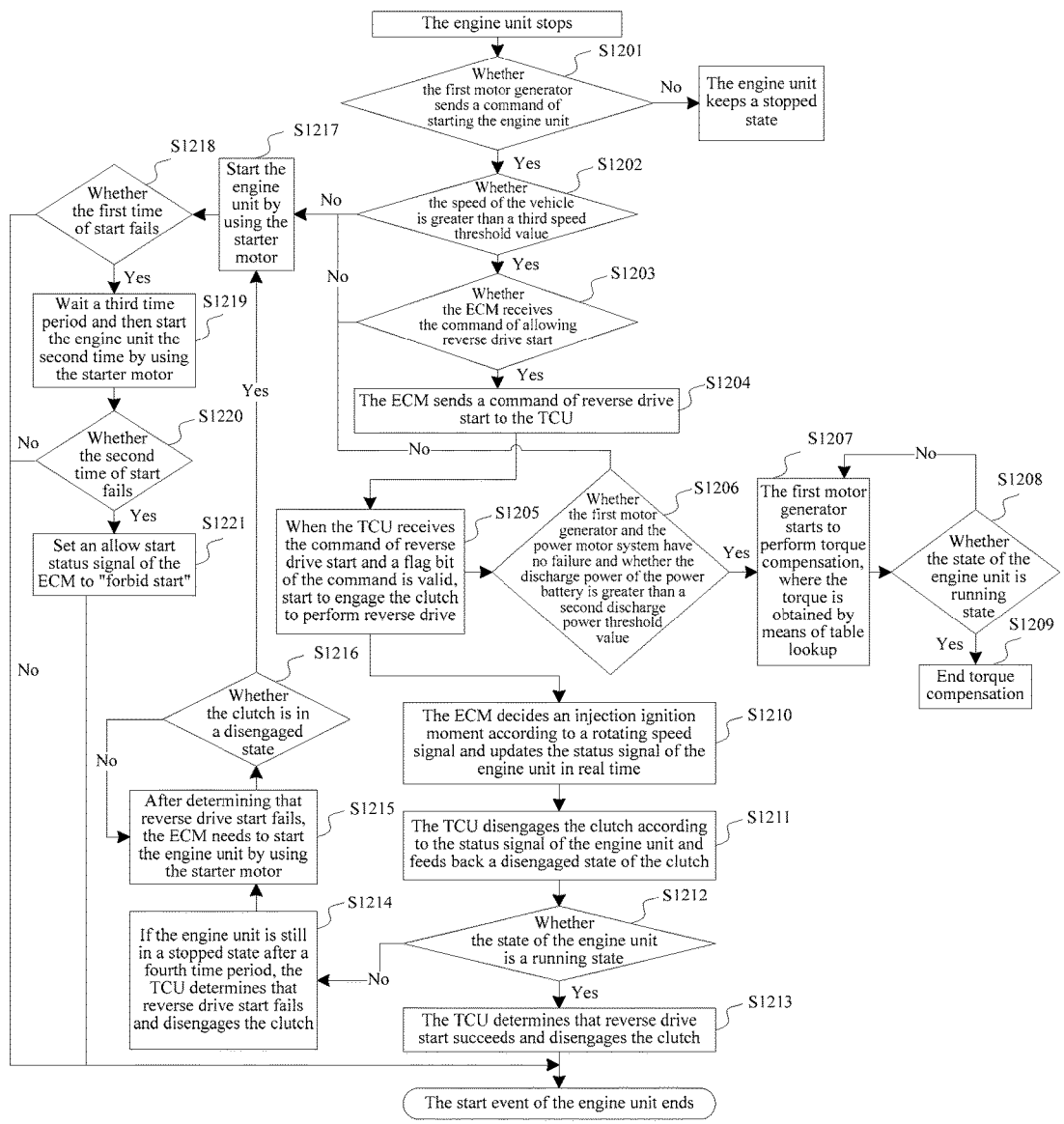
FIG. 31 is a flowchart of starting an engine unit by using a vehicle speed in a hybrid electric vehicle economy mode according to an embodiment of the present invention.

FIG. 31 is a flowchart of starting an engine unit by using a vehicle speed in a hybrid electric vehicle economy mode according to an embodiment of the present invention. A starting state of the procedure is that the engine unit is in a stopped state.

As shown in FIG. 31, the starting an engine unit by using a vehicle speed in a hybrid electric vehicle economy mode includes:

S1201: Determine whether the first motor generator sends a command of starting the engine unit.

If yes, perform S1202; or if not, the engine unit is controlled to keep a stopped state.

S1202: Determine whether the speed of the vehicle is greater than a third speed threshold value.

If yes, perform S1203; or if not, the process turns to S1217.

S1203: Determine whether the ECM receives the command of allowing reverse drive start.

If yes, perform S1204; or if not, the process turns to S1217.

S1204: The ECM sends a command of reverse drive start to the TCU.

S1205: When the TCU receives the command of reverse drive start and a flag bit of the command is valid, start to engage the clutch to perform reverse drive.

S1206: Determine whether the first motor generator and the power motor system have no failure and whether the discharge power of the power battery is greater than a second discharge power threshold value.

If the first motor generator and the power motor system have no failure and the discharge power of the power battery >p2 (the second discharge power threshold value), perform S1207; or if not, the process turns to S1217.

S1207: The first motor generator starts to perform torque compensation, where the torque is obtained by means of table lookup.

S1208: Determine whether the state of the engine unit is running state.

If yes, perform S1209; or if not, perform S1207.

S1209: End torque compensation.

S1210: The TCU receives the command of reverse drive start and a flag bit of the command is valid, start to engage the clutch to perform reverse drive, and the ECM decides an injection ignition moment according to a rotating speed signal and updates the status signal of the engine unit in real time.

S1211: The TCU disengages the clutch according to the status signal of the engine unit and feeds back a disengaged state of the clutch.

S1212: Determine whether the state of the engine unit is a running state.

If yes, perform S1213; or if not, perform S1214.

S1213: The TCU determines that reverse drive start succeeds and disengages the clutch.

The TCU determines that reverse drive start succeeds and disengages the clutch, and the start event of the engine unit ends.

S1214: If the engine unit is still in a stopped state after a fourth time period, the TCU determines that reverse drive start fails and disengages the clutch.

S1215: After determining that reverse drive start fails, the ECM needs to start the engine unit by using the starter motor.

S1216: Determine whether the clutch is in a disengaged state.

If yes, perform S1217; or if not, perform S1215.

S1217: When the clutch is in a disengaged state, start the engine unit by using the starter motor.

S1218: Determine whether the first time of start fails.

If yes, perform S1219; or if not, the start event of the engine unit ends.

S1219: Wait a third time period and then start the engine unit the second time by using the starter motor.

S1220: Determine whether the second time of start fails.

If yes, perform S1221; or if not, the start event of the engine unit ends.

S1221: Set an allow start status signal of the ECM to "forbid start", and the start event of the engine unit ends.

To implement the foregoing embodiments, the present invention further provides a vehicle.

Figure 32:
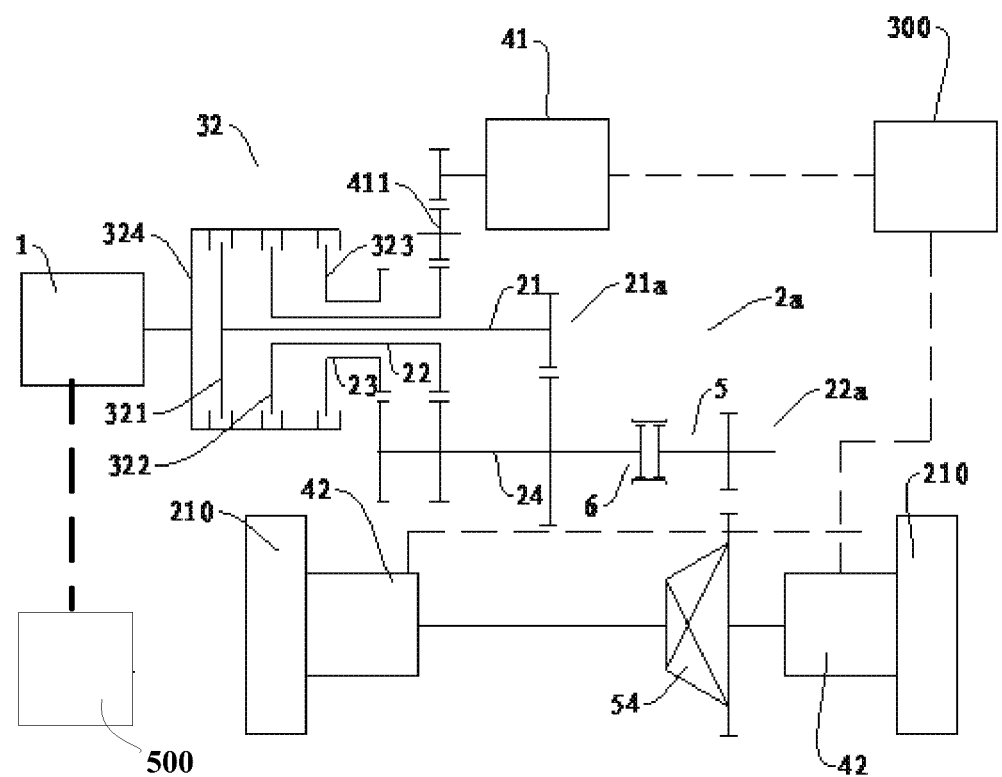
FIG. 32 is a schematic view of a vehicle according to an embodiment of the present invention.

FIG. 32 is a schematic view of a vehicle according to an embodiment of the present invention. As shown in FIG. 32, the vehicle includes: an engine unit 1, a transmission unit 2a, a first motor generator 41, an output unit 5, a power switching device (e.g., a synchronizer 6), a second motor generator 42, a power battery 300, and a controller 500. In addition, for other components shown in FIG. 32, please refer to the description in the embodiment corresponding to FIG. 8.

The transmission unit 2a is adapted to selectively be coupled with the engine unit 1. The first motor generator 41 is coupled with the transmission unit 2a. The output unit 5 is configured to transmit the power transmitted by the transmission unit 2a to at least one of front and rear wheels of the vehicle. The power switching device (e.g., the synchronizer 6) is adapted to enable or interrupt power transmission between the transmission unit 2a and the output unit 5. The second motor generator 42 is configured to drive at least one of the front and rear wheels. The power battery 300 is respectively connected to the first motor generator 41 and the second motor generator 42. The controller 500 acquires an operating mode of the vehicle and an operating parameter of the vehicle, and controls the engine unit 1 according to the operating parameter and the operating mode to start or stop.

For the vehicle in embodiments of the present invention, an engine unit may be controlled according to an operating parameter and an operating mode to start or stop, thus reducing the energy consumption, reducing the frequency of using a starter motor, and extending the service life of the starter motor, such that user experience is improved. Meanwhile, in embodiments of the present invention, power output by the engine unit and/or a first motor generator may be output to an output unit via a power switching device, and the output unit then outputs the power to at least one of front and rear wheels of the vehicle. Further, because of the provision of a second motor generator, the second motor generator may compensate for a torque for the front wheels or rear wheels, and may also cooperate with the engine unit and the first motor generator to drive the vehicle, thus increasing the number of operation modes of the vehicle, so that the vehicle may be better adapted to different operating conditions, thus achieving better fuel economic efficiency while reducing the emission of harmful gases.

In embodiments of the present invention, as shown in FIG. 32, the power switching device is configured as a synchronizer 6, and the synchronizer 6 is adapted to selectively synchronize between the output unit 5 and the transmission unit 2a.

In embodiments of the present invention, the operating mode of the vehicle includes an electric vehicle economy mode, an electric vehicle sport mode, a hybrid electric vehicle economy mode and a hybrid electric vehicle sport mode.

In embodiments of the present invention, the operating parameter of the vehicle includes one or more of an electric quantity of the power battery 300, a discharge power of the power battery 300, the speed of the vehicle, the slope of a road where the vehicle is located, an accelerator depth of the vehicle, gear information of the vehicle.

In embodiments of the present invention, the controller 500 is configured to: when the vehicle is in the hybrid electric vehicle economy mode, if the discharge power of the power battery 300 is greater than a first discharge power threshold value, the speed of the vehicle is greater than or equal to a first speed threshold value and is less than a second speed threshold value, the slope of the road where the vehicle is located is less than a first slope threshold value, and an accelerator depth of the vehicle is less than a depth threshold value, control the engine unit 1 to stop.

In embodiments of the present invention, before the controller 500 controls the engine unit 1 to stop, the controller 500 is further configured to: determine whether the number of times that the engine unit 1 stops within a first time period is greater than the number of times threshold value; and if it is determined that the number of times that the engine unit 1 stops within a first time period is not greater than the number of times threshold value, further control the engine unit 1 to stop; or if it is determined that the number of times that the engine unit 1 stops within a first time period is greater than the number of times threshold value, pause for a second time period.

In embodiments of the present invention, after the controller 500 controls the engine unit 1 to stop, the controller 500 is further configured to: determine whether a preset reverse drive condition is met; and if it is determined that the preset reverse drive condition is met, preferentially control the first motor generator 41 to perform reverse drive on the engine unit 1, so as to start the engine unit 1; or if it is determined that the preset reverse drive condition is not met, control the starter motor to start the engine unit 1.

In embodiments of the present invention, the meeting the preset reverse drive condition includes meeting the following conditions: the speed of the vehicle is greater than a third speed threshold value; an ECM of the vehicle receives the command of allowing reverse drive start; the first motor generator 41 has no failure; and the discharge power of the power battery 300 is greater than a second discharge power threshold value.

In embodiments of the present invention, when the vehicle is switched from the hybrid electric vehicle economy mode or the hybrid electric vehicle sport mode to the electric vehicle economy mode or the electric vehicle sport mode, and is switched from the electric vehicle economy mode or the electric vehicle sport mode to the hybrid electric vehicle economy mode or hybrid electric vehicle sport mode again, the preset reverse drive condition further includes that the vehicle is in the hybrid electric vehicle economy mode.

In embodiments of the present invention, the controller 500 is further configured to: when the vehicle is in the hybrid electric vehicle economy mode, if the slope of the road where the vehicle is located is less than or equal to the second slope threshold value, the electric quantity of the power battery 300 is greater than the first electric quantity threshold value, and the vehicle is in gear R, control the engine unit 1 to stop, and control the vehicle to enter the electric vehicle economy mode or the electric vehicle sport mode.

In embodiments of the present invention, the controller 500 is further configured to: when the vehicle is in the electric vehicle economy mode or the electric vehicle sport mode, if the vehicle is switched from gear R to gear D or gear N, or the number of times that the engine unit 1 is started within a third time period is greater than the number of times threshold value, control the starter motor to start the engine unit 1.

In embodiments of the present invention, the controller 500 is further configured to: when the vehicle is in the hybrid electric vehicle economy mode or the hybrid electric vehicle sport mode, if the slope of the road where the vehicle is located is less than or equal to the third slope threshold value, the speed of the vehicle is less than a fourth speed threshold value, and the vehicle is in gear P, control the engine unit 1 to perform idle stop.

In embodiments of the present invention, the controller 500 is further configured to: when the vehicle is in the hybrid electric vehicle economy mode or the hybrid electric vehicle sport mode, if the slope of the road where the vehicle is located is less than or equal to a fourth slope threshold value, the electric quantity of the power battery 300 is greater than a second electric quantity threshold value, and the vehicle is switched from the hybrid electric vehicle economy mode or the hybrid electric vehicle sport mode to the electric vehicle economy mode or the electric vehicle sport mode, control the engine unit 1 to stop.

In embodiments of the present invention, the controller 500 is further configured to: when the vehicle is in the hybrid electric vehicle economy mode, when the speed of the vehicle is greater than or equal to a fifth speed threshold value, control the engine unit 1 to start, and when the speed of the vehicle is less than or equal to a sixth speed threshold value, control the engine unit 1 to stop.

In the description of the present invention, it should be understood that locations or position relationships indicated by the terms "central", "longitudinal", "transverse", "length", "width", "thickness", "on", "under", "front", "rear", "left", "right", "vertical", "horizontal", "top", "bottom", "inside", "outside", "clockwise", "counterclockwise", "axial direction", "radial", "circumferential", and the like are locations or position relationships based on what is shown in the accompanying drawings, and are only used to facilitate description of the present invention and simplify the description, rather than to indicate or imply that the devices or components must be at specific locations or disposed and operated at specific locations, and therefore cannot be understood as a limitation on the present invention.

In addition, the terms "first" and "second" are only used to describe the objectives and cannot be understood to indicate or imply relative importance or implicitly indicate the quantity of technical features. Therefore, features that are defined by "first" and "second" may explicitly or implicitly include one or more features. In the description of the present invention, the meaning of "a plurality of" is two or more, unless otherwise clearly and specifically limited.

In the present invention, unless clearly specified or limited otherwise, the terms "mounted," "connected," "coupled", and "fixed" are used broadly and encompass such as fixed or detachable or integral connections, mechanical or electrical connections, also can be direct connections and indirect connections by using an intermediate medium, and can also be inner connections of two components or mutual effect relationships of two components. The specific meanings of the foregoing terms in the present invention can be understood by those skilled in the art according to the specific cases.

In the present invention, unless clearly specified or limited otherwise, when a first feature is "on" or "under" a second feature, the first and second features are in direct contact, or the first and second features are in indirect contact by using an intermediate medium. Moreover, when the first feature is "on" or "above" the second feature, the first feature may be right above the second feature or obliquely above the second feature, or it merely represents that the first feature is horizontally higher than the second feature. When the first feature is "under" or "below" the second feature, the first feature may be right below the second feature or obliquely below the second feature, or it merely represents that the first feature is horizontally lower than second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present invention. Thus, the appearances of the phrases such as "in an embodiment," "in some embodiments", "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although embodiments have been shown and described above, it would be appreciated that the above embodiments are exemplary and cannot be construed to limit the present invention, and changes, modifications, replacements, and alternatives can be made to the above embodiments by those skilled in the art without departing from the scope of the present invention.

What is claimed is:

1. A method for controlling an engine unit in a vehicle, wherein the vehicle comprises an engine unit, a transmission unit comprising a first input shaft and a second input shaft, adapted to selectively couple with the engine unit via a dual clutch and configured to transmit the power generated by the engine unit, a first motor generator coupled with the transmission unit, an output unit, a power switching device, a second motor generator configured to drive front wheels and/or rear wheels, and a power battery respectively connected to the first motor generator and the second motor generator, wherein the output unit is configured to transmit the power transmitted by the transmission unit to at least one of the front and rear wheels of the vehicle, the power switching device is adapted to enable or interrupt power transmission between the transmission unit and the output unit, and the method comprises:
   acquiring an operating mode of the vehicle and an operating parameter of the vehicle; and
   controlling the engine unit according to the operating parameter and the operating mode to start or stop;
   wherein before the engine unit is controlled to stop, the method further comprises:
   determining whether the number of times that the engine unit stops within a first time period is greater than a number of times threshold value;
   if it is determined that the number of times that the engine unit stops within the first time period is not greater than the number of times threshold value, controlling the engine unit to stop; or
   if it is determined that the number of times that the engine unit stops within the first time period is greater than the number of times threshold value, exiting and pausing for a second time period.

2. The method according to claim 1, wherein the operating mode of the vehicle comprises an electric vehicle economy mode, an electric vehicle sport mode, a hybrid electric vehicle economy mode, and a hybrid electric vehicle sport mode, wherein the operating parameter of the vehicle comprises one or more of an electric quantity of the power battery, a discharge power of the power battery, the speed of the vehicle, a slope of a road where the vehicle is located, an accelerator depth of the vehicle, and gear information of the vehicle, and
   wherein when the vehicle is in the hybrid electric vehicle economy mode, if the discharge power of the power battery is greater than a first discharge power threshold value, the speed of the vehicle is greater than or equal to a first speed threshold value and is less than a second speed threshold value, and the slope of the road where the vehicle is located is less than a first slope threshold value, and the accelerator depth of the vehicle is less than a depth threshold value, the engine unit is controlled to stop.

3. The method according to claim 2, wherein when the vehicle is in the hybrid electric vehicle sport mode, if the slope of the road where the vehicle is located is less than or equal to a second slope threshold value, the electric quantity of the power battery is greater than a first electric quantity threshold value, and the vehicle is in gear R, the engine unit is controlled to stop, and the vehicle is controlled to enter the electric vehicle economy mode or the electric vehicle sport mode.

4. The method according to claim 2, wherein when the vehicle is in the electric vehicle economy mode or the electric vehicle sport mode, if the vehicle is switched from gear R to gear D or gear N, or the number of times that the engine unit is started within a third time period is greater than a number of times threshold value, the engine unit is started by using a starter motor.

5. The method according to claim 2, wherein when the vehicle is in the hybrid electric vehicle economy mode or the hybrid electric vehicle sport mode, if the slope of the road where the vehicle is located is less than or equal to a third slope threshold value, the speed of the vehicle is less than a fourth speed threshold value, and the vehicle is in gear P, control the engine unit to perform idle stop;
    wherein when the vehicle is in the hybrid electric vehicle economy mode or the hybrid electric vehicle sport mode, if the slope of the road where the vehicle is located is less than or equal to a fourth slope threshold value, and the electric quantity of the power battery is greater than a second electric quantity threshold value, and the vehicle is switched from the hybrid electric vehicle economy mode or the hybrid electric vehicle sport mode to the electric vehicle economy mode or the electric vehicle sport mode, the engine unit is controlled to stop.

6. The method according to claim 2, wherein when the vehicle is in the hybrid electric vehicle economy mode, when the speed of the vehicle is greater than or equal to a fifth speed threshold value, the engine unit is controlled to start, and when the speed of the vehicle is less than or equal to a sixth speed threshold value, the engine unit is controlled to stop.

7. The method according to claim 1, after the controlling the engine unit according to the operating parameter and the operating mode to stop, further comprising:
    determining whether a preset reverse drive condition is met; and
        if it is determined that the preset reverse drive condition is met, reversely driving the engine unit by preferentially using the first motor generator to start the engine unit; or
        if it is determined that the preset reverse drive condition is not met, starting the engine unit by using a starter motor.

8. The method according to claim 7, wherein the meeting the preset reverse drive condition comprises meeting the following conditions:
    the speed of the vehicle is greater than a third speed threshold value; and, an engine control module (ECM) of the vehicle receives a command of allowing reverse drive start; and, the first motor generator has no failure; and, a discharge power of the power battery is greater than a second discharge power threshold value.

9. The method according to claim 7, wherein when the vehicle is switched from a hybrid electric vehicle economy mode or a hybrid electric vehicle sport mode to an electric vehicle economy mode or an electric vehicle sport mode, and is switched from the electric vehicle economy mode or the electric vehicle sport mode to the hybrid electric vehicle economy mode or the hybrid electric vehicle sport mode again, the preset reverse drive condition further comprises that the vehicle is in the hybrid electric vehicle economy mode.

10. A vehicle, comprising:
    an engine unit;
    a transmission unit comprising a first input shaft and a second input shaft, adapted to selectively couple with the engine unit via a dual clutch and also configured to transmit the power generated by the engine unit;
    a first motor generator coupled with the transmission unit;
    an output unit configured to transmit the power transmitted by the transmission unit to at least one of front and rear wheels of the vehicle;
    a power switching device adapted to enable or interrupt power transmission between the transmission unit and the output unit; and
    a second motor generator configured to drive at least one of the front and rear wheels;
    a power battery respectively connected to the first motor generator and the second motor generator; and
    a controller, wherein the controller acquires an operating mode of the vehicle and an operating parameter of the vehicle, and controls the engine unit according to the operating parameter and the operating mode to start or stop, wherein before the controller controls the engine unit to stop, the controller is further configured to:
    determine whether the number of times that the engine unit stops within a first time period is greater than a number of times threshold value; and
        if it is determined that the number of times that the engine unit stops within the first time period is not greater than the number of times threshold value, control the engine unit to stop; or
        if it is determined that the number of times that the engine unit stops within the first time period is greater than the number of times threshold value, pause for a second time period.

11. The vehicle according to claim 10, wherein the operating mode of the vehicle comprises an electric vehicle economy mode, an electric vehicle sport mode, a hybrid electric vehicle economy mode and a hybrid electric vehicle sport mode;
    wherein the operating parameter of the vehicle comprises one or more of an electric quantity of the power battery, a discharge power of the power battery, the speed of the vehicle, the slope of a road where the vehicle is located, an accelerator depth of the vehicle, and gear information of the vehicle; and
    wherein the controller is configured to:
    when the vehicle is in the hybrid electric vehicle economy mode, if the discharge power of the power battery is greater than a first discharge power threshold value, the speed of the vehicle is greater than or equal to a first speed threshold value and is less than a second speed threshold value, the slope of the road where the vehicle is located is less than a first slope threshold value, and the accelerator depth of the vehicle is less than a depth threshold value, control the engine unit to stop.

12. The vehicle according to claim 11, wherein the controller is further configured to:
    when the vehicle is in the hybrid electric vehicle economy mode, if the slope of the road where the vehicle is located is less than or equal to a second slope threshold value, and the electric quantity of the power battery is greater than the first electric quantity threshold value, and the vehicle is in gear R, control the engine unit to stop, and control the vehicle to enter the electric vehicle economy mode or the electric vehicle sport mode.

13. The vehicle according to claim 11, wherein the controller is further configured to:
    when the vehicle is in the electric vehicle economy mode or the electric vehicle sport mode, if the vehicle is switched from gear R to gear D or gear N, or the number of times that the engine unit is started within a third time period is greater than a number of times threshold value, control a starter motor to start the engine unit.

14. The vehicle according to claim 11, wherein the controller is further configured to:
    when the vehicle is in the hybrid electric vehicle economy mode or the hybrid electric vehicle sport mode, if the slope of the road where the vehicle is located is less than or equal to a third slope threshold value, the speed of the vehicle is less than a fourth speed threshold value, and the vehicle is in gear P, control the engine unit to perform idle stop;

wherein the controller is further configured to:

when the vehicle is in the hybrid electric vehicle economy mode or the hybrid electric vehicle sport mode, if the slope of the road where the vehicle is located is less than or equal to a fourth slope threshold value, and the electric quantity of the power battery is greater than a second electric quantity threshold value, and the vehicle is switched from the hybrid electric. vehicle economy mode or the hybrid electric vehicle sport mode to the electric vehicle economy mode or the electric vehicle sport mode, control the engine unit to stop.

15. The vehicle according to claim 11, wherein the controller is further configured to:

when the vehicle is in the hybrid electric vehicle economy mode, when the speed of the vehicle is greater than or equal to a fifth speed threshold value, control the engine unit to start, and when the speed of the vehicle is less than or equal to a sixth speed threshold value, control the engine unit to stop.

16. The vehicle according to claim 10, wherein after the controller controls the engine unit to stop, the controller is further configured to:

determine whether a preset reverse drive condition is met;

if it is determined that the preset reverse drive condition is met, reversely drive the engine unit by preferentially controlling the first motor generator to start the engine unit; or if it is determined that the preset reverse drive condition is not met, control a starter motor to start the engine unit.

17. The vehicle according to claim 16, wherein the meeting the preset reverse drive condition comprises meeting the following conditions:

the speed of the vehicle is greater than a third speed threshold value;

and, an engine control module (ECM) of the vehicle receives a command of allowing reverse drive start;

and, the first motor generator has no failure;

and, a discharge power of the power battery is greater than a second discharge power threshold value.

18. The vehicle according to claim 16, wherein when the vehicle is switched from a hybrid electric vehicle economy mode or a hybrid electric vehicle sport mode to an electric vehicle economy mode or an electric vehicle sport mode, and is switched from the electric vehicle economy mode or the electric vehicle sport mode to the hybrid electric vehicle economy mode or the hybrid electric vehicle sport mode again, the preset reverse drive condition further comprises that the vehicle is in the hybrid electric vehicle economy mode.

* * * * *